(12) United States Patent
Park

(10) Patent No.: US 7,831,660 B2
(45) Date of Patent: Nov. 9, 2010

(54) SYSTEM AND METHOD FOR CONTENTS UPLOAD USING A MOBILE TERMINAL

(75) Inventor: Se Jin Park, Seoul (KR)

(73) Assignee: Mtome Co., Ltd., Seoul (KR)

( * ) Notice: Subject to any disclaimer, the term of this patent is extended or adjusted under 35 U.S.C. 154(b) by 245 days.

(21) Appl. No.: 12/280,977

(22) PCT Filed: Mar. 2, 2007

(86) PCT No.: PCT/KR2007/001054

§ 371 (c)(1),
(2), (4) Date: Aug. 27, 2008

(87) PCT Pub. No.: WO2007/100228

PCT Pub. Date: Sep. 7, 2007

(65) Prior Publication Data

US 2008/0320107 A1    Dec. 25, 2008

(30) Foreign Application Priority Data

Mar. 2, 2006   (KR) .................. 10-2006-0019997
Aug. 4, 2006   (KR) .................. 10-2006-0073634

(51) Int. Cl.
G06F 15/16   (2006.01)

(52) U.S. Cl. .................. 709/203; 709/219; 709/221; 709/246; 712/242; 715/704

(58) Field of Classification Search .................. 709/203, 709/217, 219, 221, 246; 712/242; 715/704
See application file for complete search history.

(56) References Cited

U.S. PATENT DOCUMENTS 6,779,153 B1 * 8/2004 Kagle .................. 715/235
7,024,256 B2 * 4/2006 Krzyzanowski et al. ....... 700/65
7,283,904 B2 * 10/2007 Benjamin et al. ........... 701/117
2002/0059345 A1 * 5/2002 Wang et al. .................. 707/513
2003/0103088 A1 * 6/2003 Dresti et al. ................. 345/835
2006/0161865 A1 * 7/2006 Scott et al. .................. 715/810
2007/0100595 A1 * 5/2007 Earles et al. .................. 703/13
2009/0254778 A1 * 10/2009 Huang et al. .................. 714/38

FOREIGN PATENT DOCUMENTS

| EP | 1126657 | 8/2001 |
| JP | 2001-216211 | 8/2001 |
| JP | 2002-312278 | 10/2002 |
| KR | 1020050068322 | 7/2005 |

* cited by examiner

*Primary Examiner*—Michael Won
(74) *Attorney, Agent, or Firm*—IPLA P.A.; James E. Bame

(57) ABSTRACT

The present invention relates to a network system providing a wireless website and method for providing and connecting the wireless website using the same, the network system including a contents providing system using a mobile terminal including at least one terminal device receiving contents information for the wireless website through a wired means or a wireless means, thereby transmitting the contents information or connecting to the wireless website, a macro server storing the wireless website created by using the contents information inputted from the terminal device, wherein the macro server includes scripts corresponding to the created wireless website, a database for storing information of the wireless website in a table form, and phone page information for displaying the wireless website, and an execution server searching the database so as to provide contents corresponding to each wireless website, in accordance with a connection of the terminal device. Herein, by creating and providing the wireless website including scripts, database, and phone page information, a wireless website user may use the contents more easily and may also move to different wireless websites with more simplicity.

17 Claims, 48 Drawing Sheets

[Fig. 1]
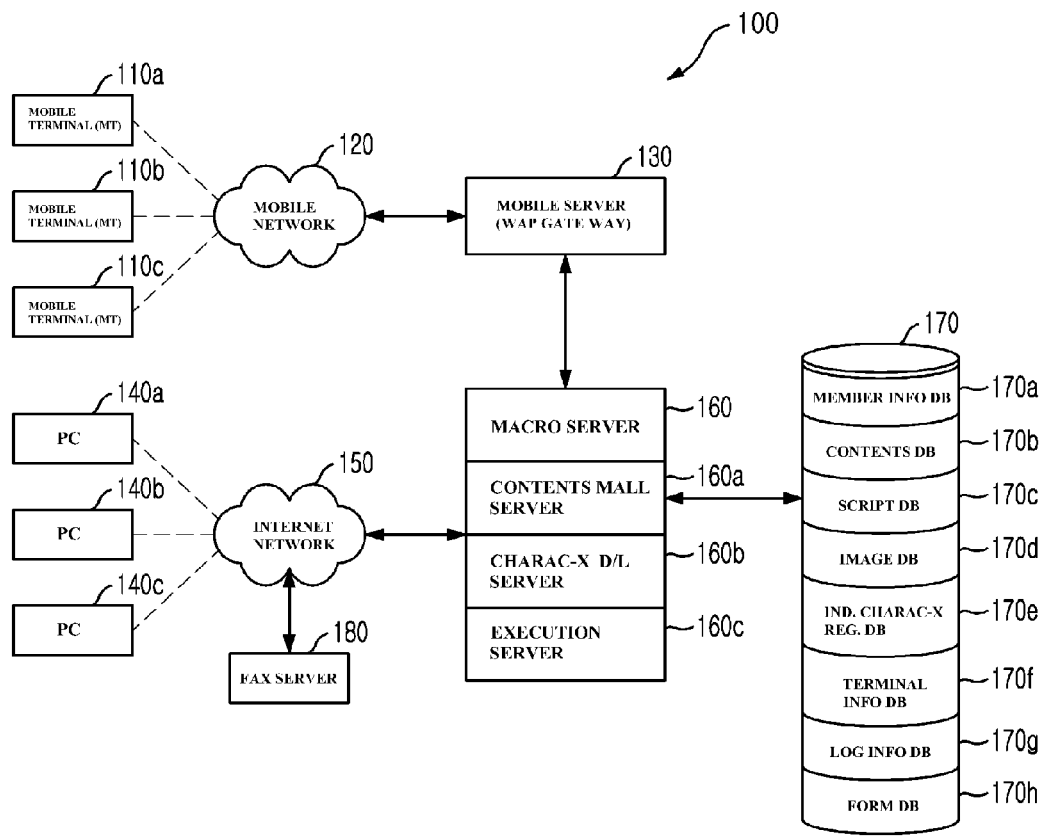
[Fig. 2]
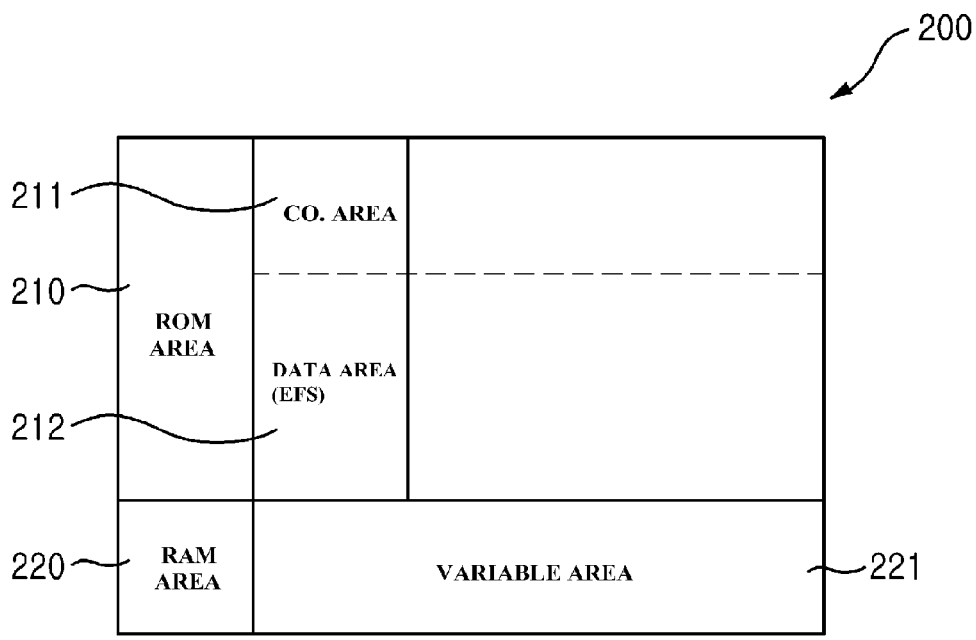

[Fig. 3]
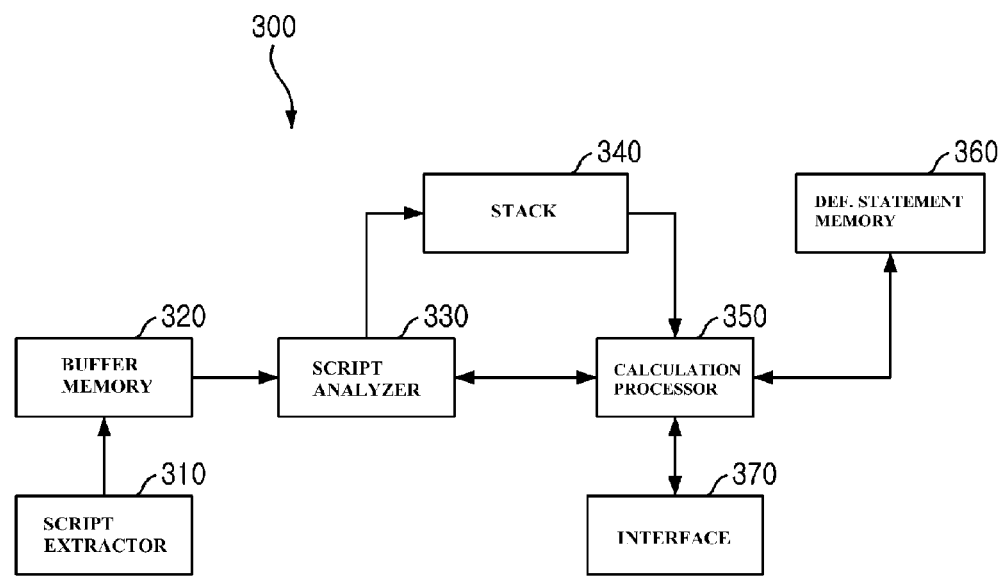

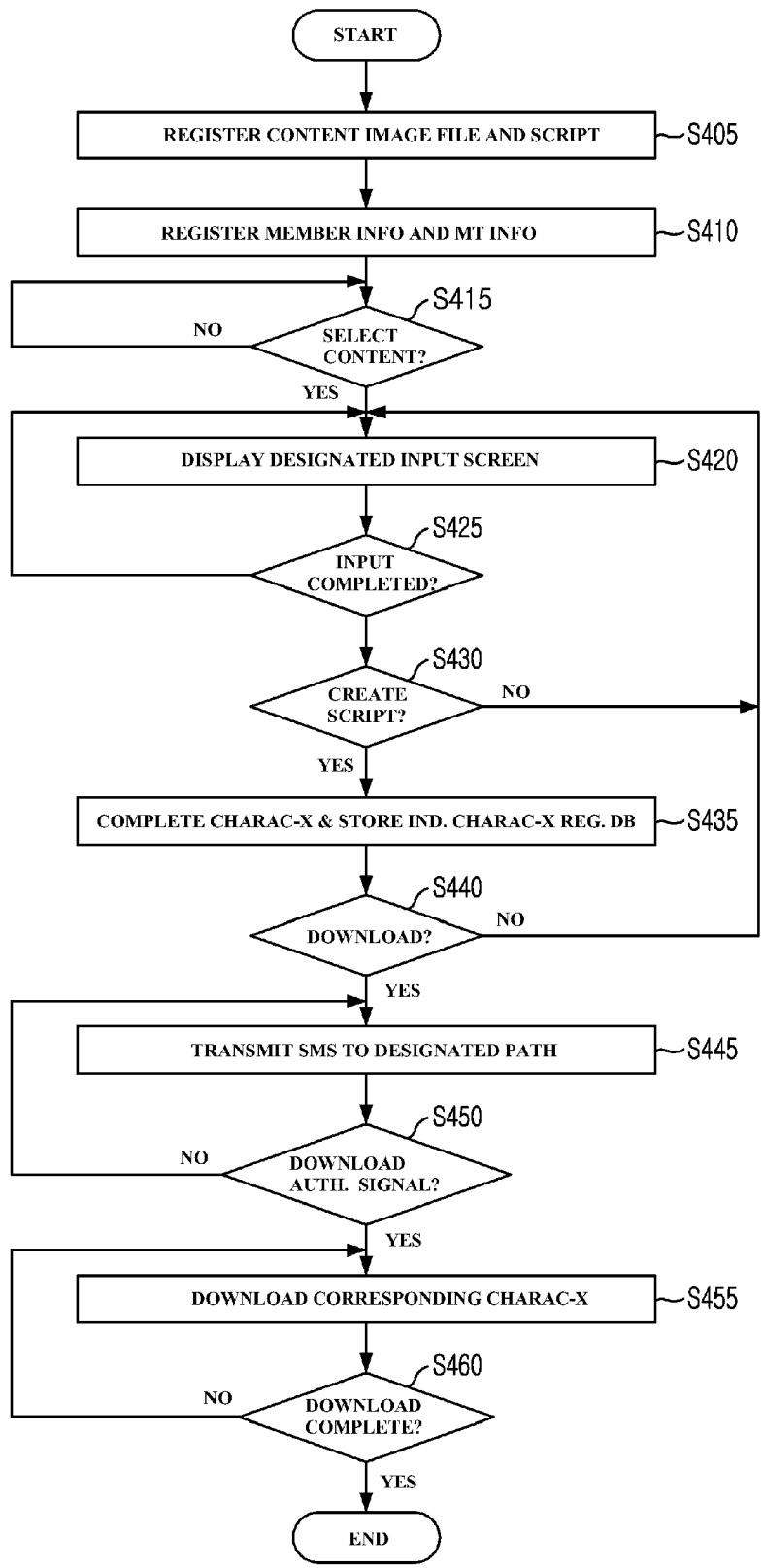
[Fig. 4]

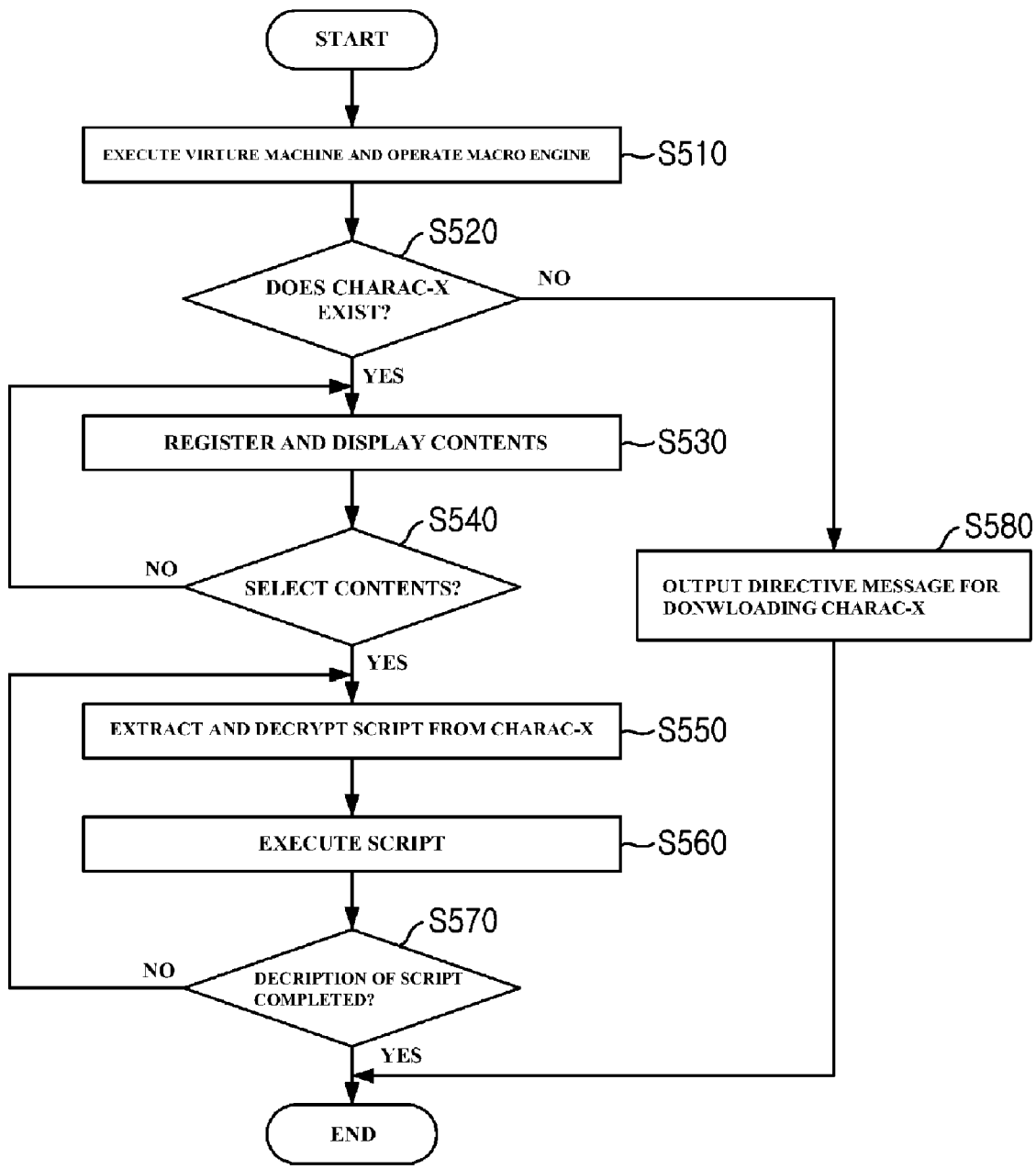
[Fig. 5]

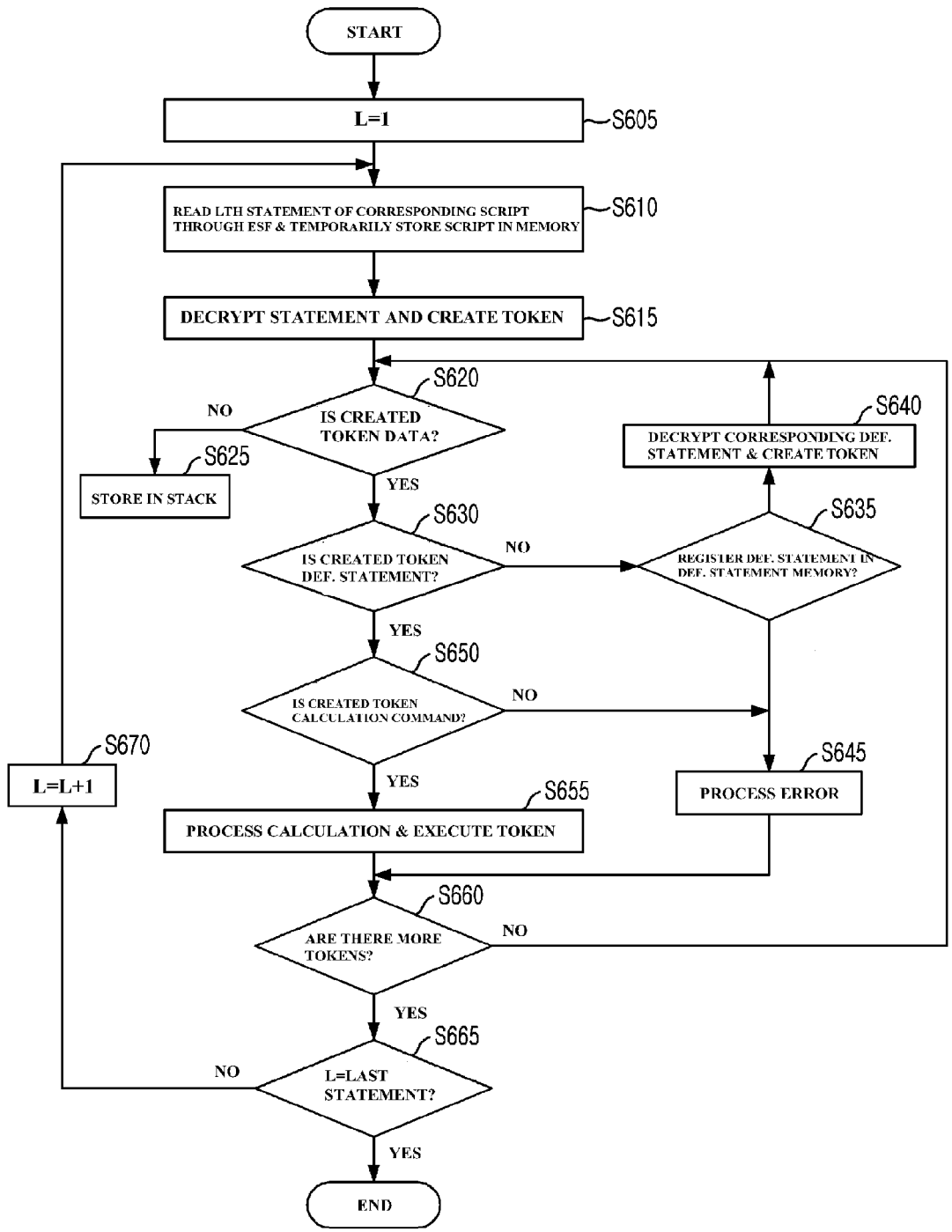
[Fig. 6]

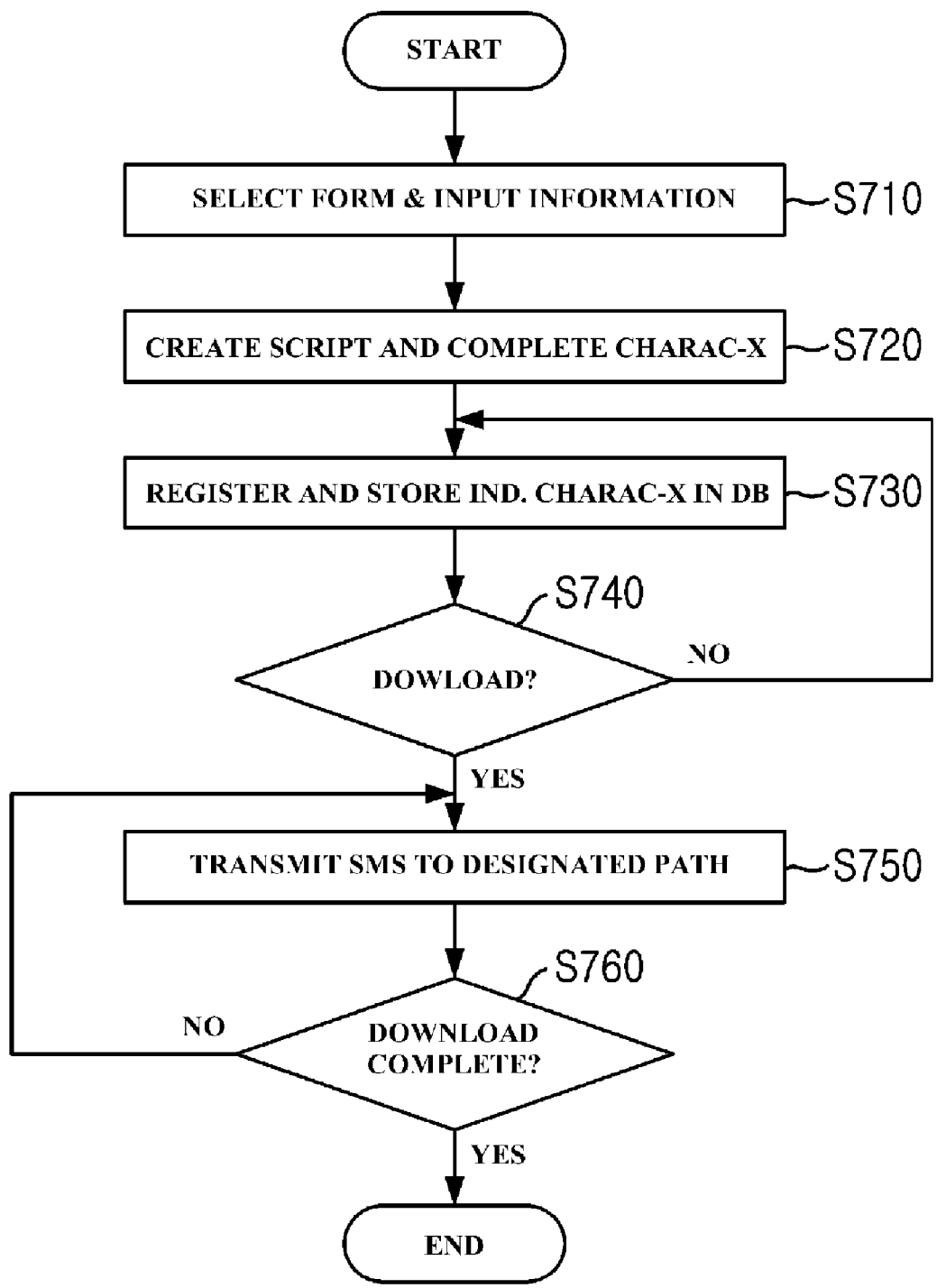
[Fig. 7]

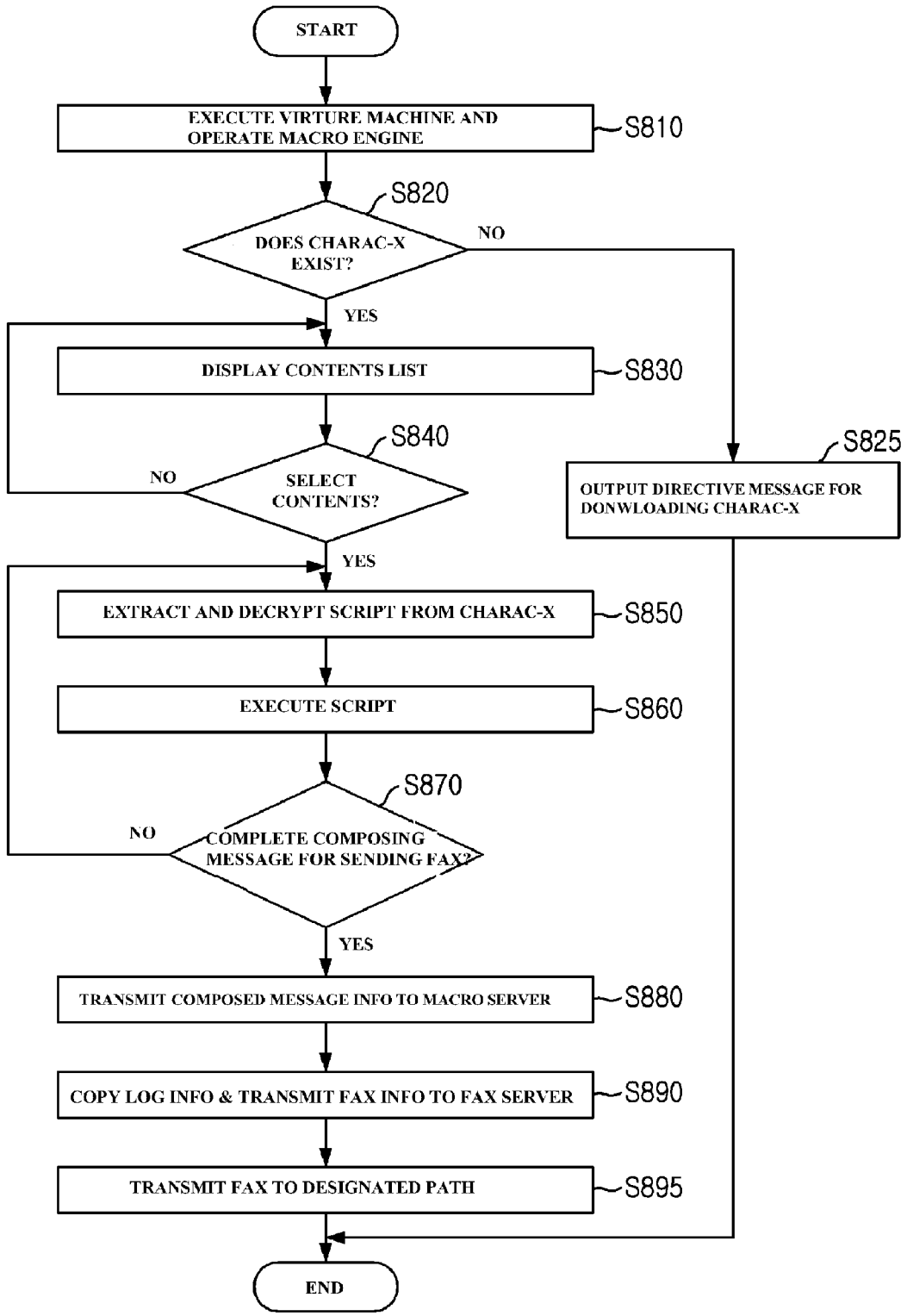
[Fig. 8]

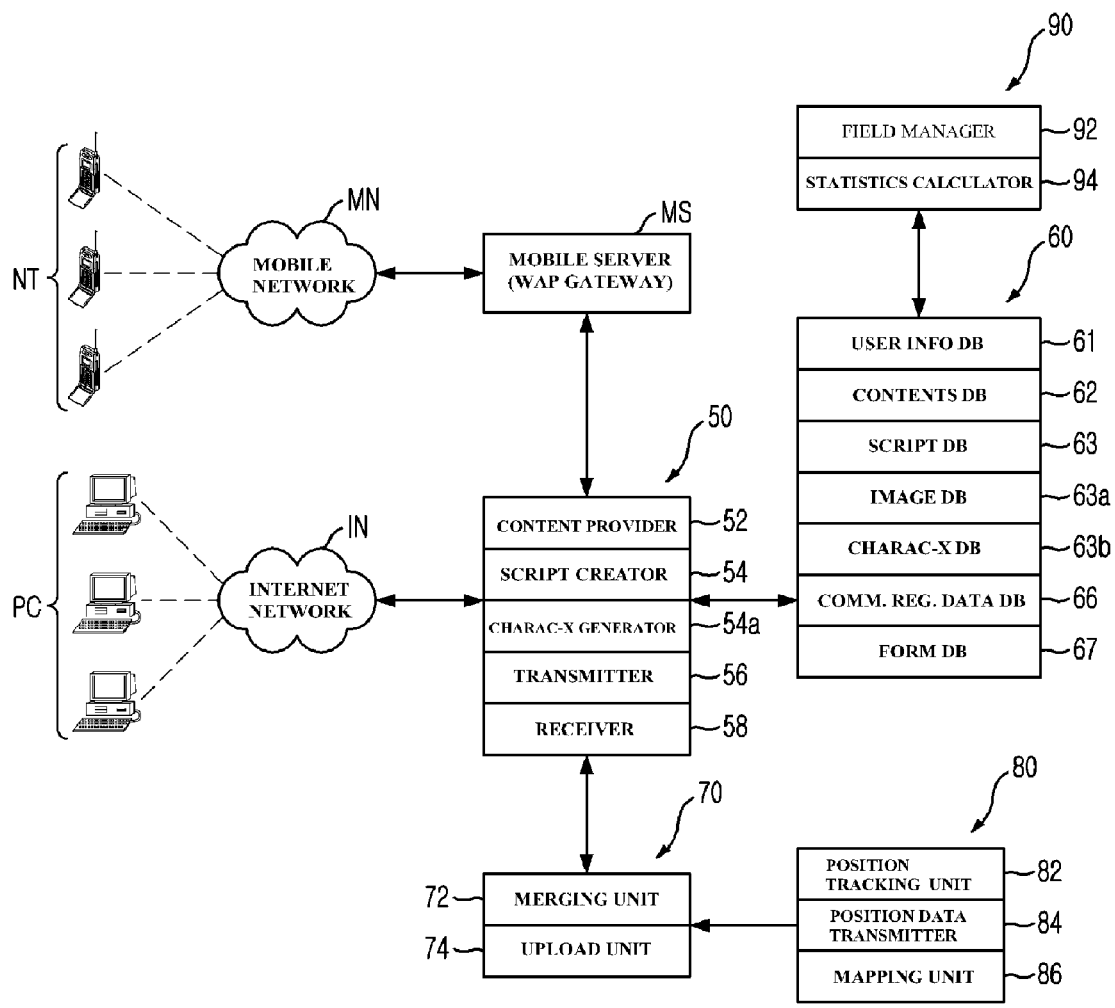
[Fig. 9]

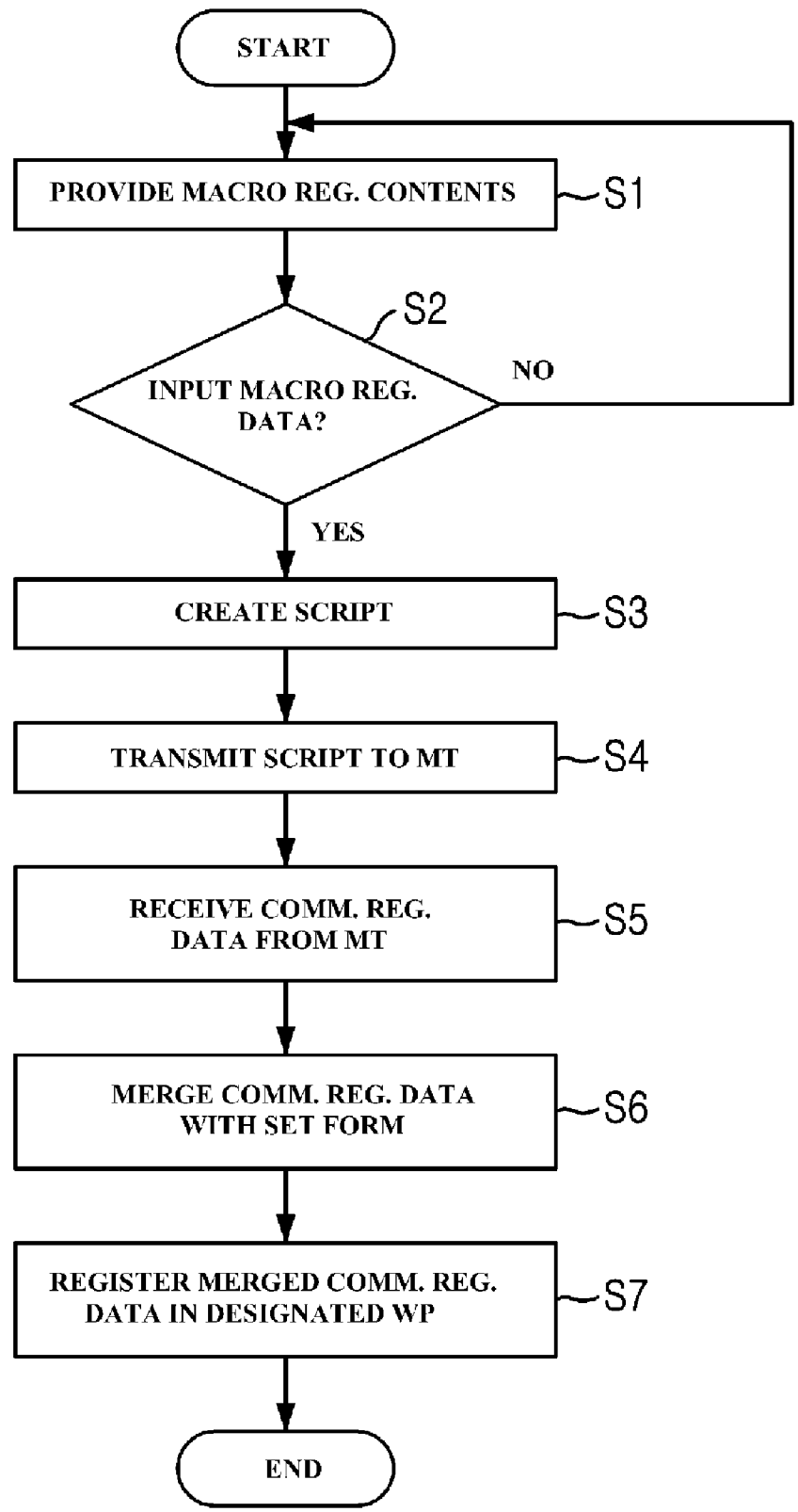
[Fig. 10]

[Fig. 11]
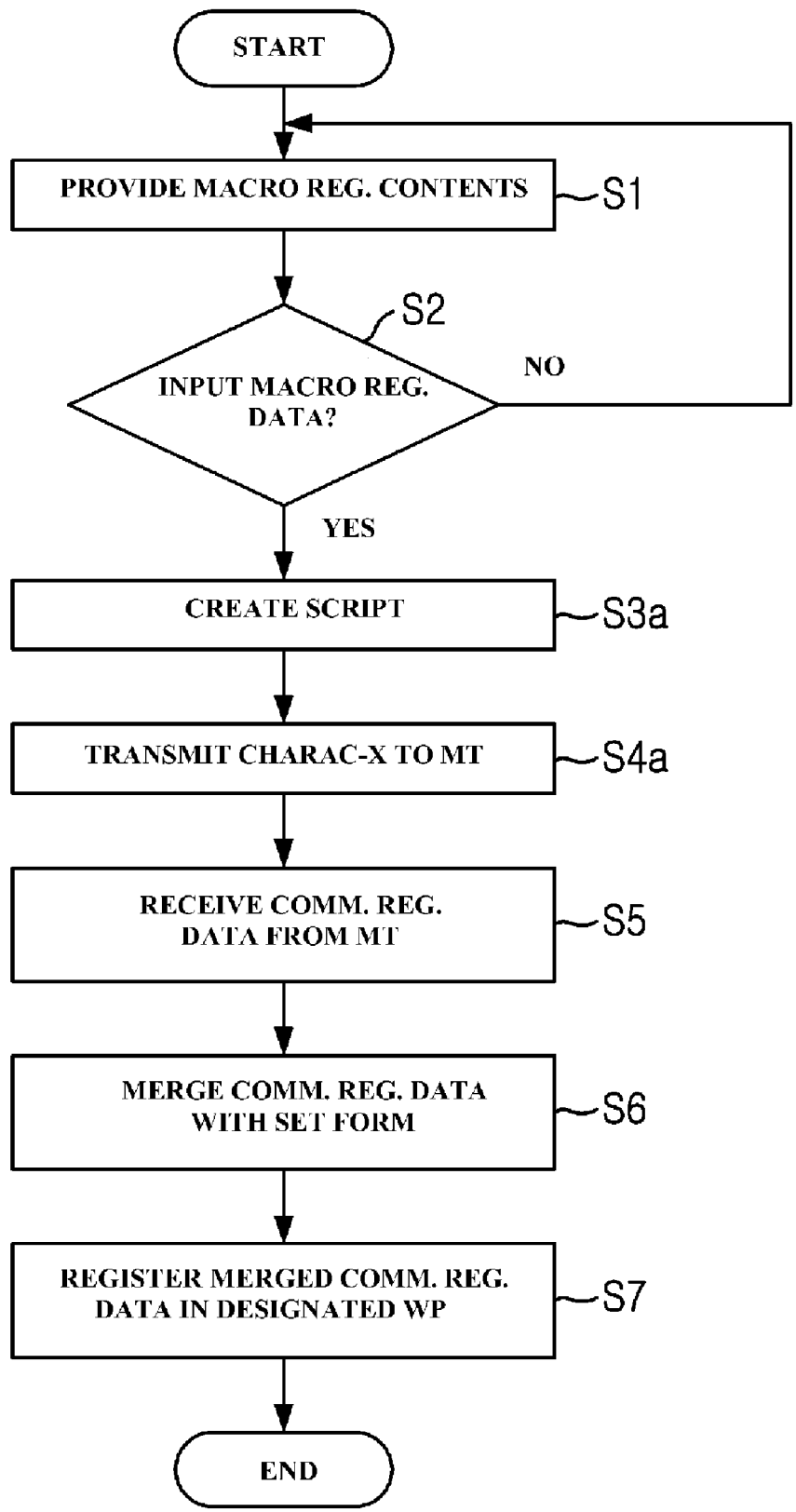

[Fig. 12]

[Fig. 13]

| FISH TYPE | CRUCIAN | INPUT CAPTURED FISH |
|---|---|---|
| | CARP | INPUT CAPTURED FISH |
| | HYANG | 1 CRUCIAN |
| | MANDARIN | 2 CARP |
| | | 3 HYANG |
| | CATFISH | 4 MANDA |
| | | 5 CATFISH |
| | SNAKEHEAD | |
| | EEL | |
| | ETC. | OK |

| DEPTH | 1m OR BELOW | INPUT DEPTH |
|---|---|---|
| | 1m~1.5m | INPUT DEPTH |
| | 2m~2.5m | 1 1m OR BELOW |
| | | 2 1m~1.5m |
| | ABOVE 2.5m | 3 2m~2.5m |
| | | 4 ABOVE 2.5m |
| | | |
| | | |
| | | OK |

[Fig. 14]

| WEATHER | SUNNY | INPUT WEATHER |
| --- | --- | --- |
| | OVERCAST | INPUT WEATHER |
| | RAINY | 1 SUNNY |
| | SUNNY AFTER RAIN | 2 OVERCAST |
| | | 3 RAINY |
| | CLOUDY | 4 SUNNY AFTER RAIN |
| | SNOWY | |
| | ETC. | |
| | | OK |

| BOTTOM TYPE | SANDY LOAM | BOTTOM CONDITION |
| --- | --- | --- |
| | GRAVEL | BOTTOM CONDITION |
| | MUD | 1 SANDY LOAM |
| | ETC. | 2 GRAVEL |
| | | 3 MUD |
| | | 4 ETC. |
| | | |
| | | OK |

| FISHING PLACE TITLE | INPUT NAME OF FISHING PLACE | |

[Fig. 15]

| | |
|---|---|
| REVIEW TITLE | COMMENT |
| RESULT TITLE | FISH FILE RECAP |

| | |
|---|---|
| SERVER INFORMATION | |
| BASIC WORKING DOCUMENT SHEET | fishfile |
| DIRECTORY | www.mobilemacro.com:5000#Myweb#Macro# |
| SAVED IMAGE FILE NAME | Pto |
| INPUT URL | www.phonemacro.co.kr#bbs:ksb |
| INPUT PARAMETER | CELL PHONE&password=0000&subject=FISH FILE |
| TITLE NAME | PHOTO FISH FILE |

Update  Reset  Submit  Print

[Fig. 16]

@PHOTO_FISHING_FILE#3332$Ver0.9'2004.4.20
"FishFile FormStar
"Name {{HONG GIL-DONG}}
"DisplayForPicture {{IMAGE1} PicPreview} ;
DisplayForPicture "Pto3 Capture
"DisplayForPicture {{IMAGE2} PicPreview} ;
DisplayForPicture "Pto4 Capture
"DisplayForPicture {{IMAGE3} PicPreview}
DisplayForPicture "Pto5 Captu
"DisplayForPicture {{IMAGE4} PicPreview}
DisplayForPicture "Pto6 Capture
"Title {(Select Map File (bgmap)}}
"Pto7 GetPho
"Address {{Position Information}}
"Tool {{3.2 units}} ;
"content {{ }} ;
"Crucian {0} ;
"Catfish {0} ;
"Carp {0} ;
"Hyang {0} ;
"Manda {0} ;
"Title {{Input Capture Fish}} ;
"InputMode "3 ;
"Place {Input Name of Fishing Place} Sinput
"Exit {1} ;
"InputMode "2 ;
"X1 {"Crucian {Crucian} input } ;
"X2 {"Carp {Carp }input } ;
"X3 {"Hyang {Hyang}input } ;
"X4 {"Manda {Manda}input } ;
"X5 {"Catfish {Catfish}input } ;
"Z1 {"na {"Crucian } ; } ;
"Z2 {"na {"Carp } ; } ;
"Z3 {"na {"Hyang } ; } ;
"Z4 {"na {"Manda } ; } ;
"Z5 {"na {"Catfish } ; } ;
"T1 {na Crucian ftoa + "na s2macro} ;
"T2 {na Carp ftoa + "na s2macro} ;
"T3 {na Hyang ftoa + "na s2macro} ;
"T4 {na Manda
+ ftoa + "na s2macro} ;
"T5 {na Catfish ftoa + "na s2macro} ;
"K1 {content na + "content s2macro} ;

[Fig. 17]

```
"Y1 {Z1 T1 K1} ;
"Y2 {Z2 T2 K1} ;
"Y3 {Z3 T3 K1} ;
"Y4 {Z4 T4 K1} ;
"Y5 {Z5 T5 K1} ; {Crucian, Carp, Hyang, Manda, Catfish} OrderForm
dup {X1,X2,X3,X4,X5} ongoto
{Y1,Y2,Y3,Y4,Y5} ongoto "2 "Exit ExecUntilTrue
"Title {{Input Depth}} ;
"X1 {{1m or Below}} ;
"X2 {{1m~1.5m}} ;
"X3 {{2m~2.5m}} ;
"X4 {{Above 2.5m }} ;
{1m or Below,1m~1.5m,2~2.5m,Above 2.5m } ListForm
"X1,X2,X3,X4 ongoto
"depth s2macro
"Title {{Bottom Condition}} ;
"X1 {{Sandy Loam}} ;
"X2 {{Gravel}} ;
"X3 {{Mud}} ;
"X4 {{Etc.  }} ;
{Sandy Loam, Gravel, Mud, Etc.} ListForm
"X1,X2,X3,X4 ongoto
"bottom s2macro
"Title {{Input Food Type}} ;
"X1 {{Bait Paste}} ;
"X2 {{Worm}} ;
"X3 {{Corn Kernel}} ;
"X4 {{Soybean}} ;
"X5 {{Gluten}} ;
"X6 {{Shrimp}} ;
{Bait Paste, Worm, Corn Kernel, Soybean, Gluten, Shrimp} ListForm
"X1,X2,X3,X4,X5,X6 ongoto
"food s2macro
"Title {{Input Weather}} ;
"X1 {{Sunny}} ;
"X2 {{Overcast}} ;
"X3 {{Rainy}} ;
"X4 {{Sunny After Rain}} ;
{Sunny, Overcast, Rainy, Sunny After Rain} ListForm
"X1,X2,X3,X4 ongoto
"X8 s2macro
"InputMode "3 ;
"X7 {Comment}Sinput
```

[Fig. 18]

{Fish File Recap}
{Fishing Place;} Place + "; + +
{Depth;}
depth + "; + +
{Bottom;} bottom +"; + + {Food;} food + "; + +
{Rating;} X7 + ";
+ +
{End to Cancel, OK to Send!} +
Lprint
"Sheet {{FishFile}} ;
"Snder {{Cell phone&password=0000&subject=Fishing_File}} ;
Snder "--- + Place +
"Snder
s2macro
Snder "--- + Name +
"Snder
s2macro
"X
{{www.mobilemacro.com:5000#Myweb#Macro#}} ;
"text2 {{Pto}}
getGPS "gps
s2macro
X {;} + text2 +
{} + content +
{} + Place +
{} + depth +
{} + bottom +
{} + food +
{} + X7 +
{} + X8 +
{} +
Date +
{} + Time +
{} + gps +
{} + Name +
{} + Tool +
{} +
"X
s2macro
"ToMail {{www.phonemacro.co.kr#bbs;kbs}}
Sheet "/ + ToMail + "/ + Snder + "/ + "ToMail s2macro
X ToMail SndUrl
Quit

[Fig. 19]
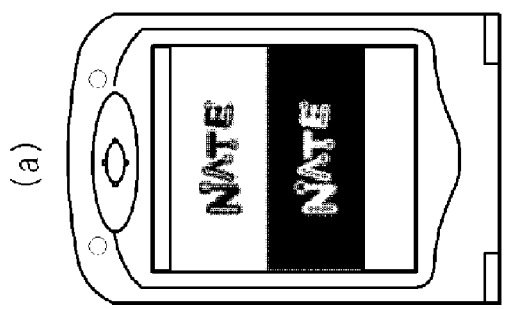
(a)
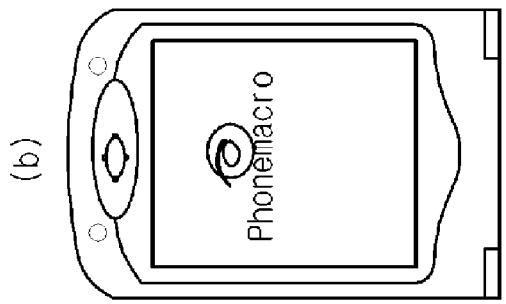
(b)
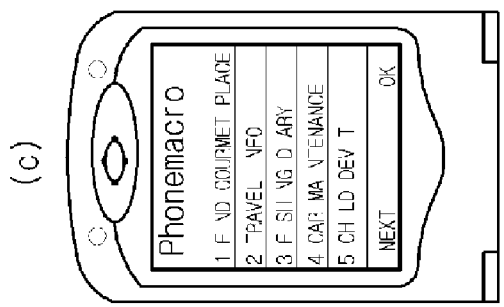
(c)
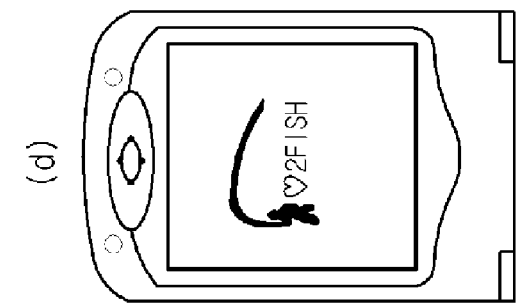
(d)
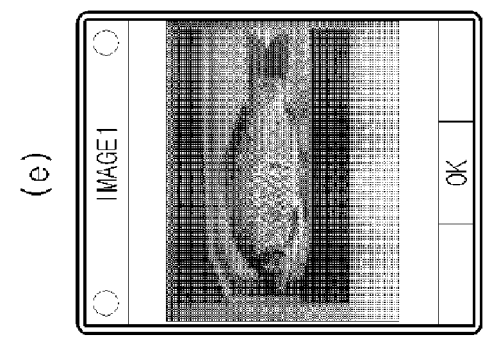
(e)
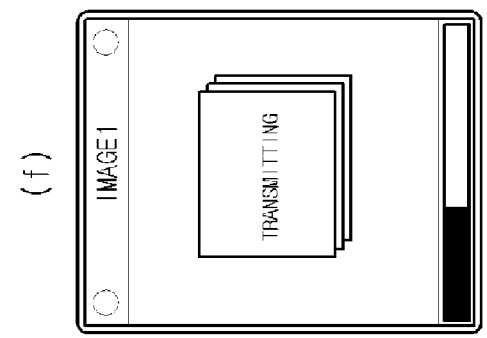
(f)
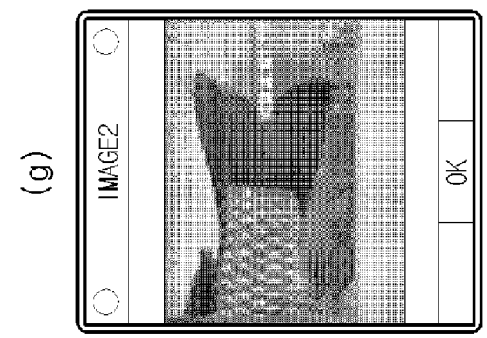
(g)
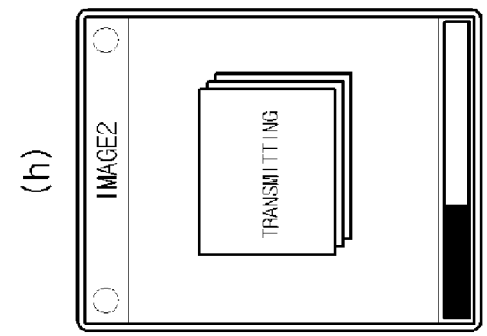
(h)

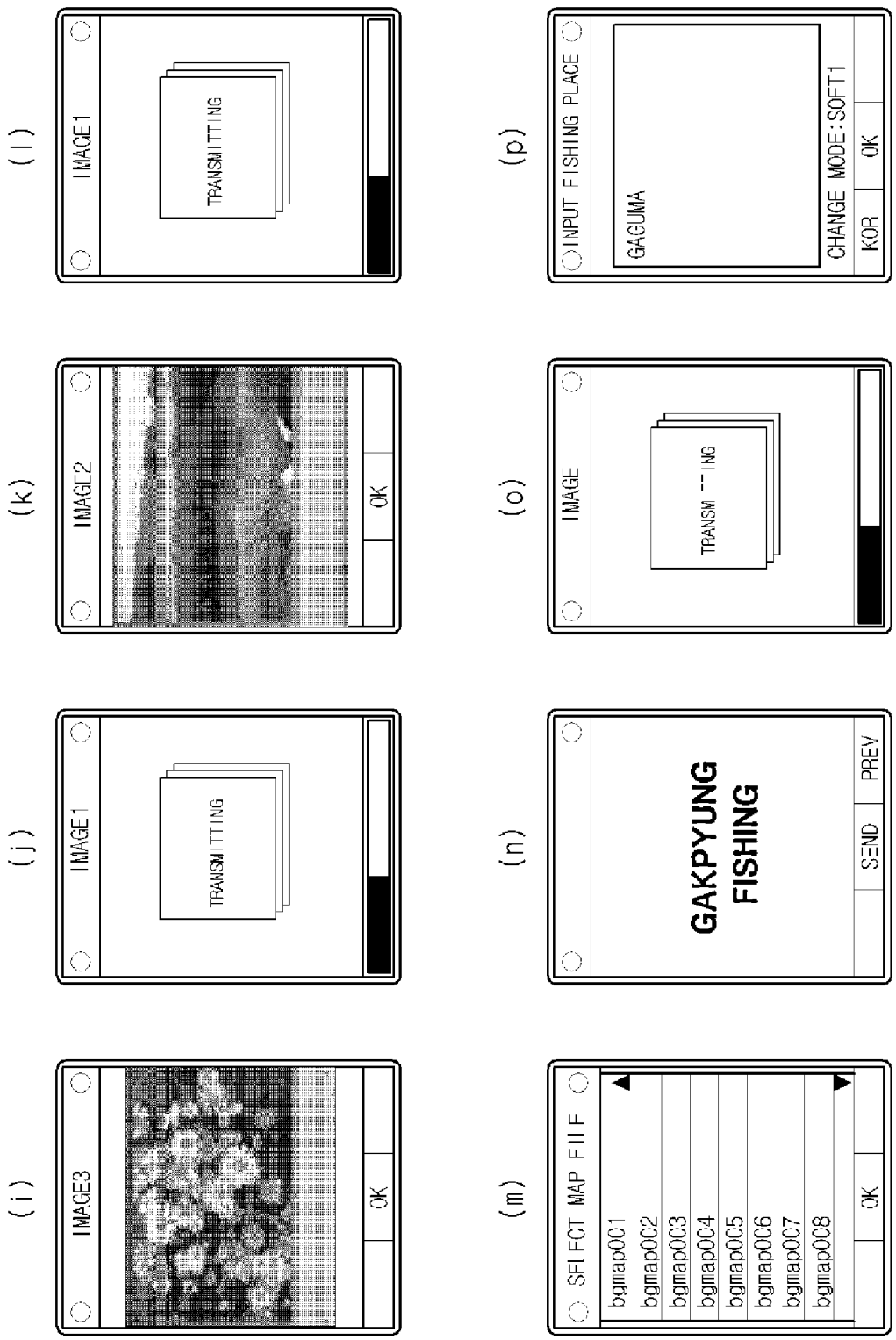
[Fig. 20]

| GAKPYUNG FISHING | PHOTO FISH FILE | | ♡2FISH | |
|---|---|---|---|---|
| \multicolumn{2}{c}{IMAGE1} | | \multicolumn{2}{c}{IMAGE2} | |
| \multicolumn{2}{c}{} | | \multicolumn{2}{c}{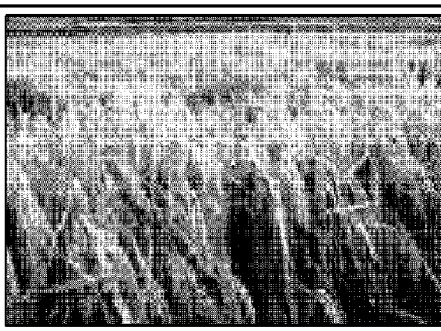} | |
| \multicolumn{2}{c}{IMAGE3} | | \multicolumn{2}{c}{IMAGE4} | |
| \multicolumn{2}{c}{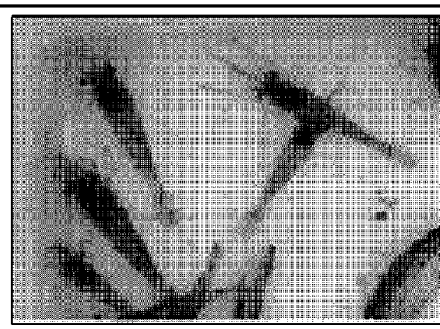} | | \multicolumn{2}{c}{} | |
| RESULT | CARP 3 | | | |
| REVIEW | CAUGHT 1ST WHOPPER OF THE YEAR | | | |
| ADD | ICHANG-MYUN, ICHEON-SI, GYEONGGI-DO | | MAP | |
| PLACE | GAKPYUNG FISHING | WEATHER | SUNNY | |
| DATE | SEPT. 24, 2005 | TIME | 11:30 a.m. |  |
| BOTTOM | SANDY LOAM | TOOL | 15 UNITS | |
| DEPTH | 1m~1.5m | FOOD | WORM | |
| FISHER NAME | KIM SAN-BONG | 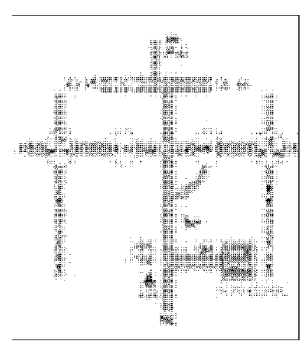 | | |

[Fig. 25]
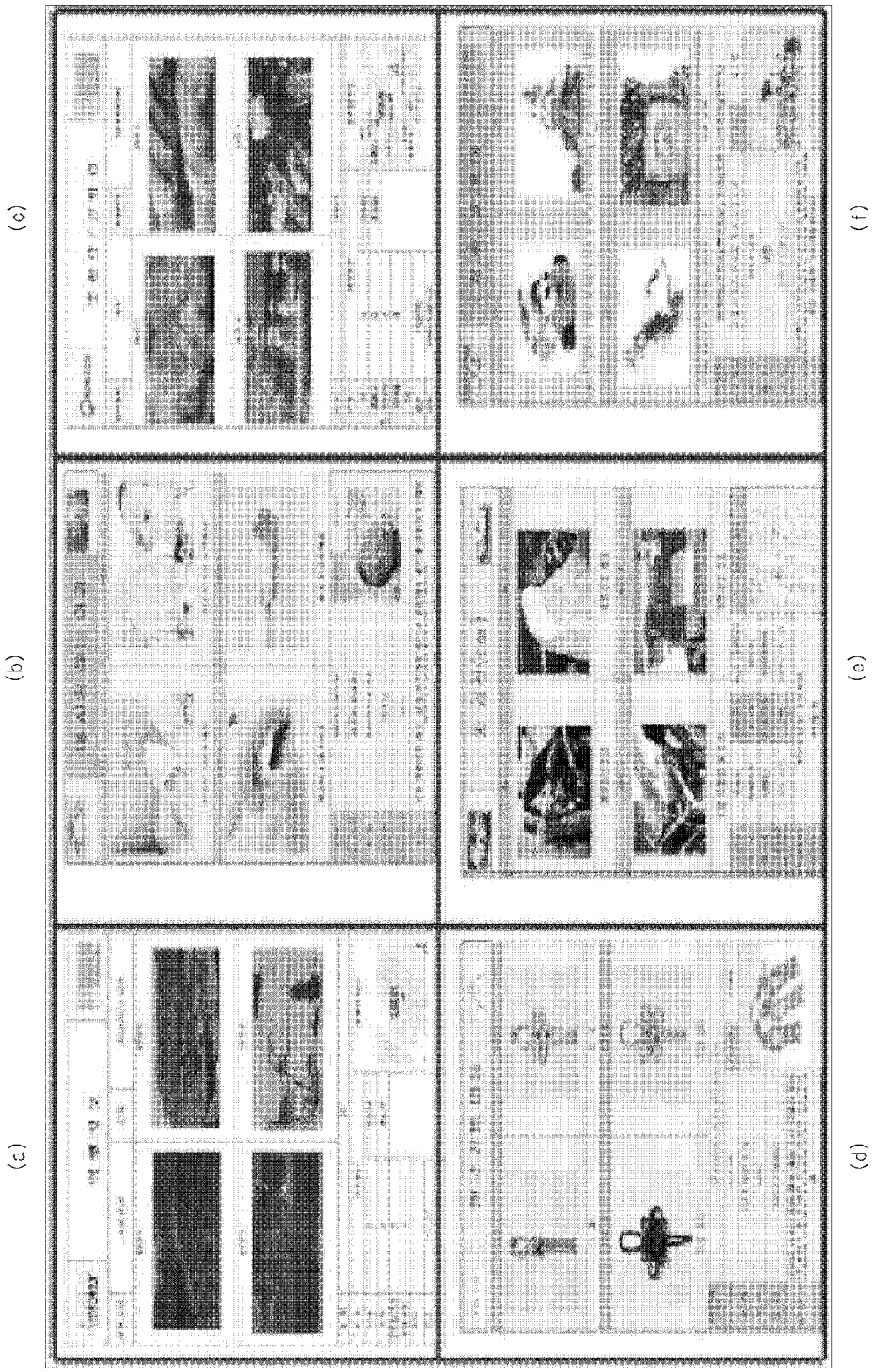

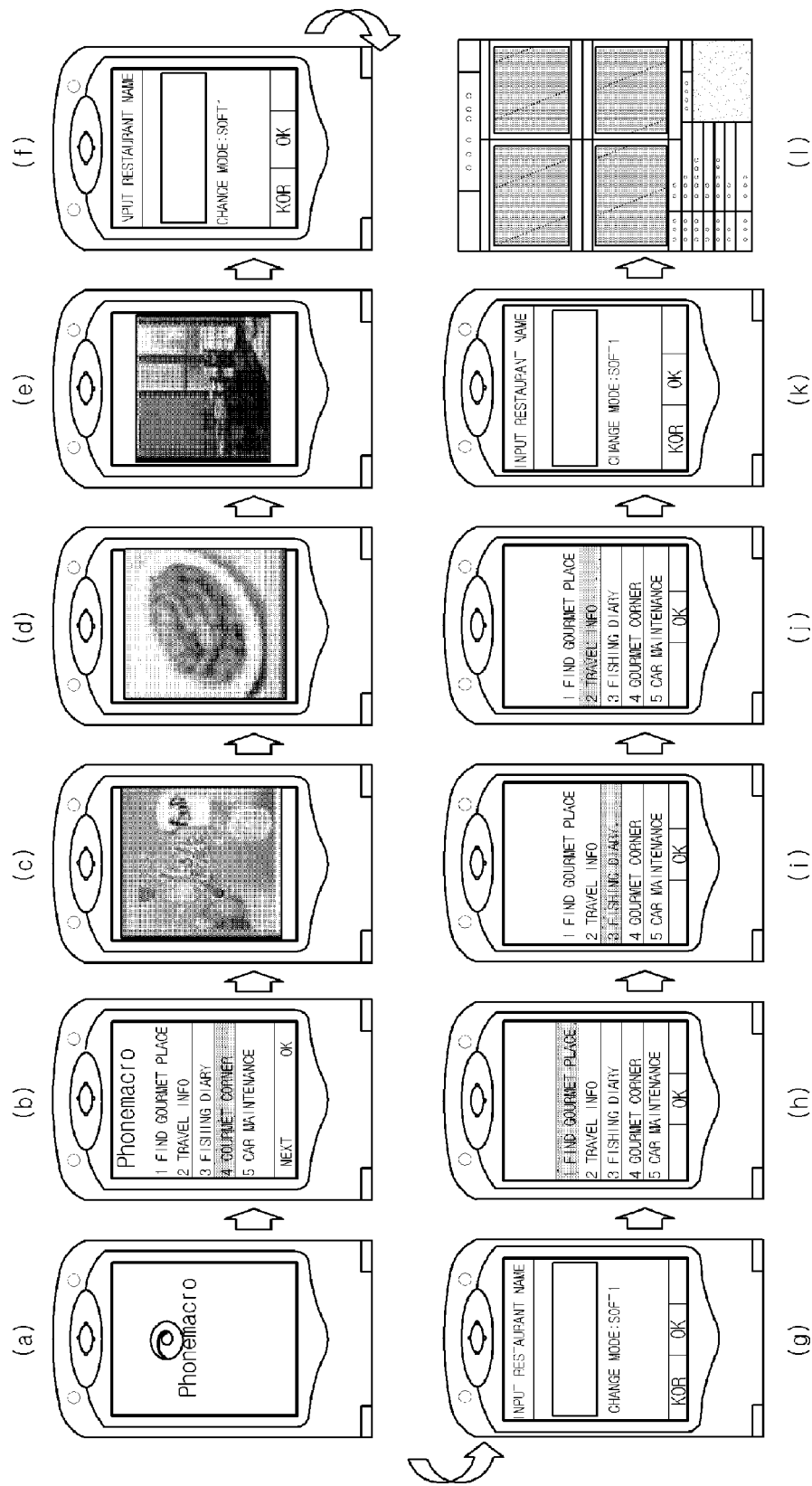
[Fig. 26]

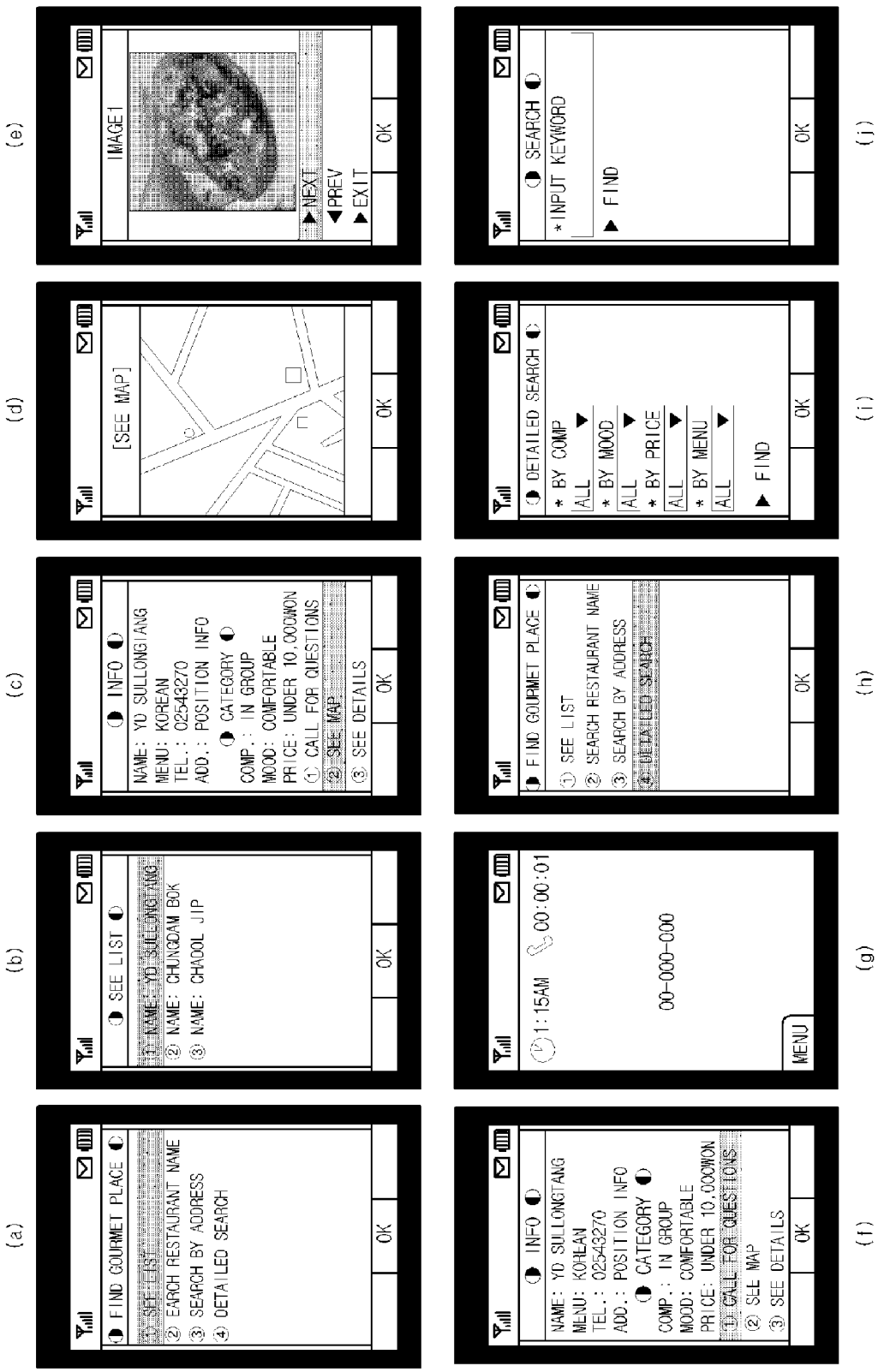
[Fig. 27]

[Fig. 28]

| GAKPYUNG FISHING | PHOTO FISH FILE | ♡2FISH |
|---|---|---|

| IMAGE1 | IMAGE2 |
|---|---|
| | |

| IMAGE3 | IMAGE4 |
|---|---|
| | |

| RESULT | CRUCIAN 2, HYANG 4, CATFISH 1 | | | |
|---|---|---|---|---|
| REVIEW | IT WAS NICE. | | | |
| ADD | POSITION INFO | | | MAP |
| PLACE | GIMCHEON | WEATHER | SUNNY | |
| DATE | JAN. 20, 2006 | TIME | 22:33 p.m. | |
| BOTTOM | SANDY LOAM | TOOL | 3.2 UNITS | |
| DEPTH | 1M ~ 1.5M | FOOD | WORM | |
| FISHER NAME | HONG GIL-DONG | | | |

[Fig. 29]
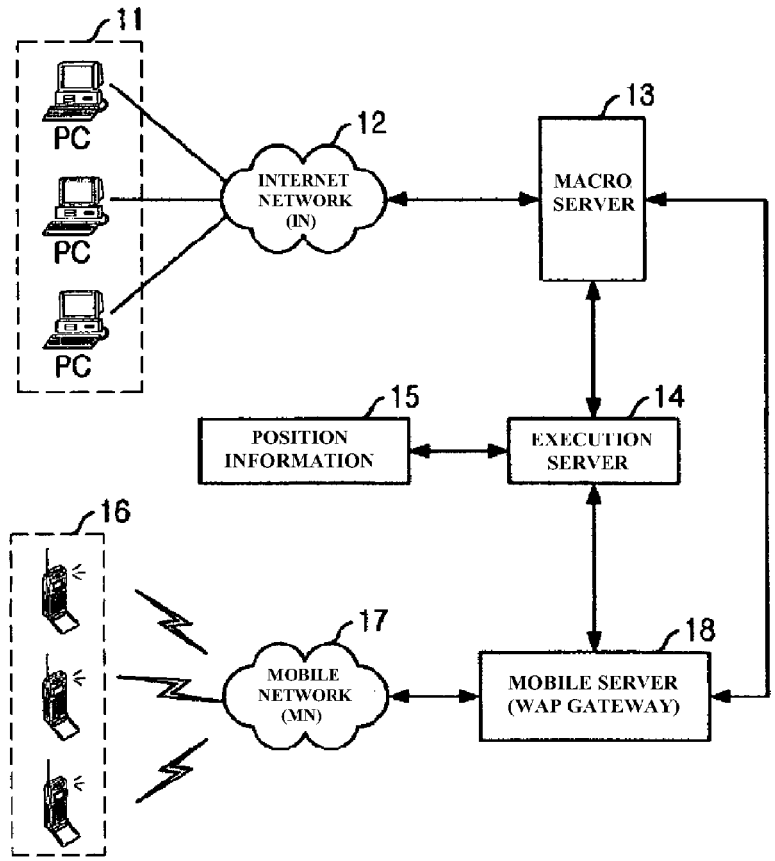
[Fig. 30]
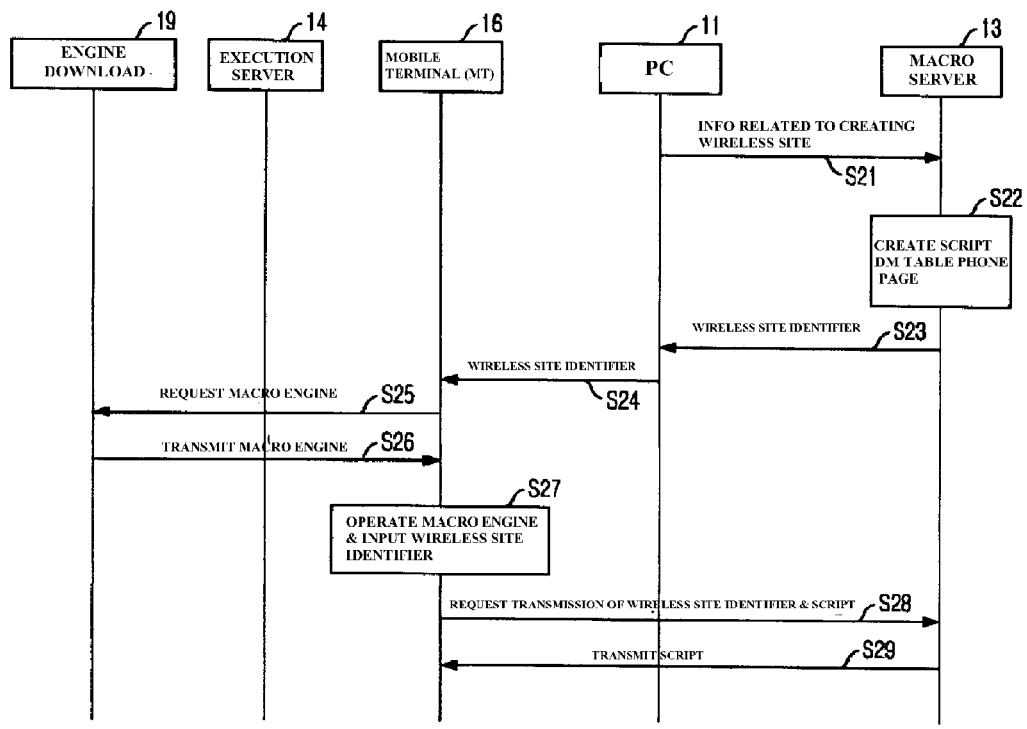

[Fig. 31]
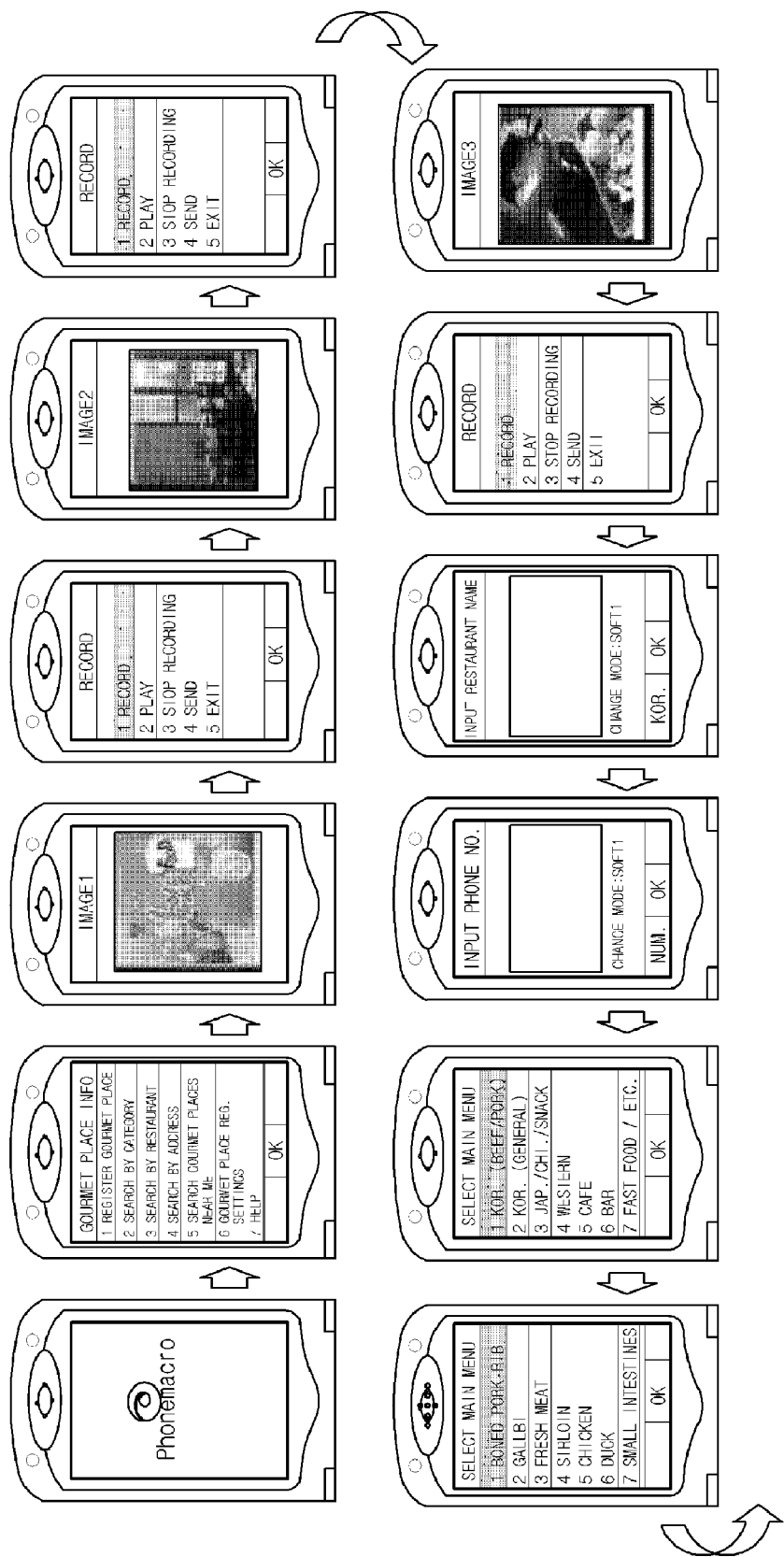

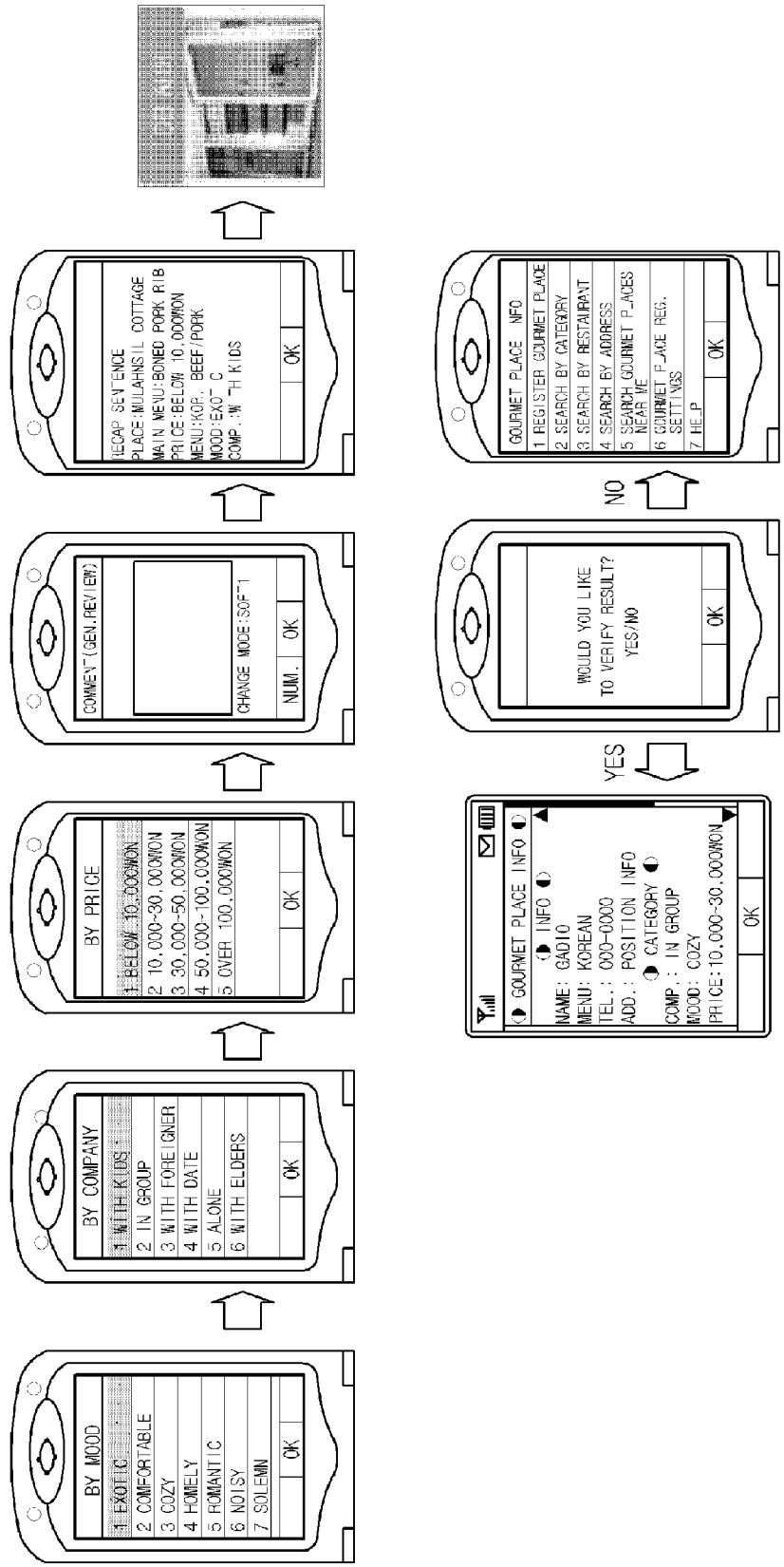
[Fig. 32]

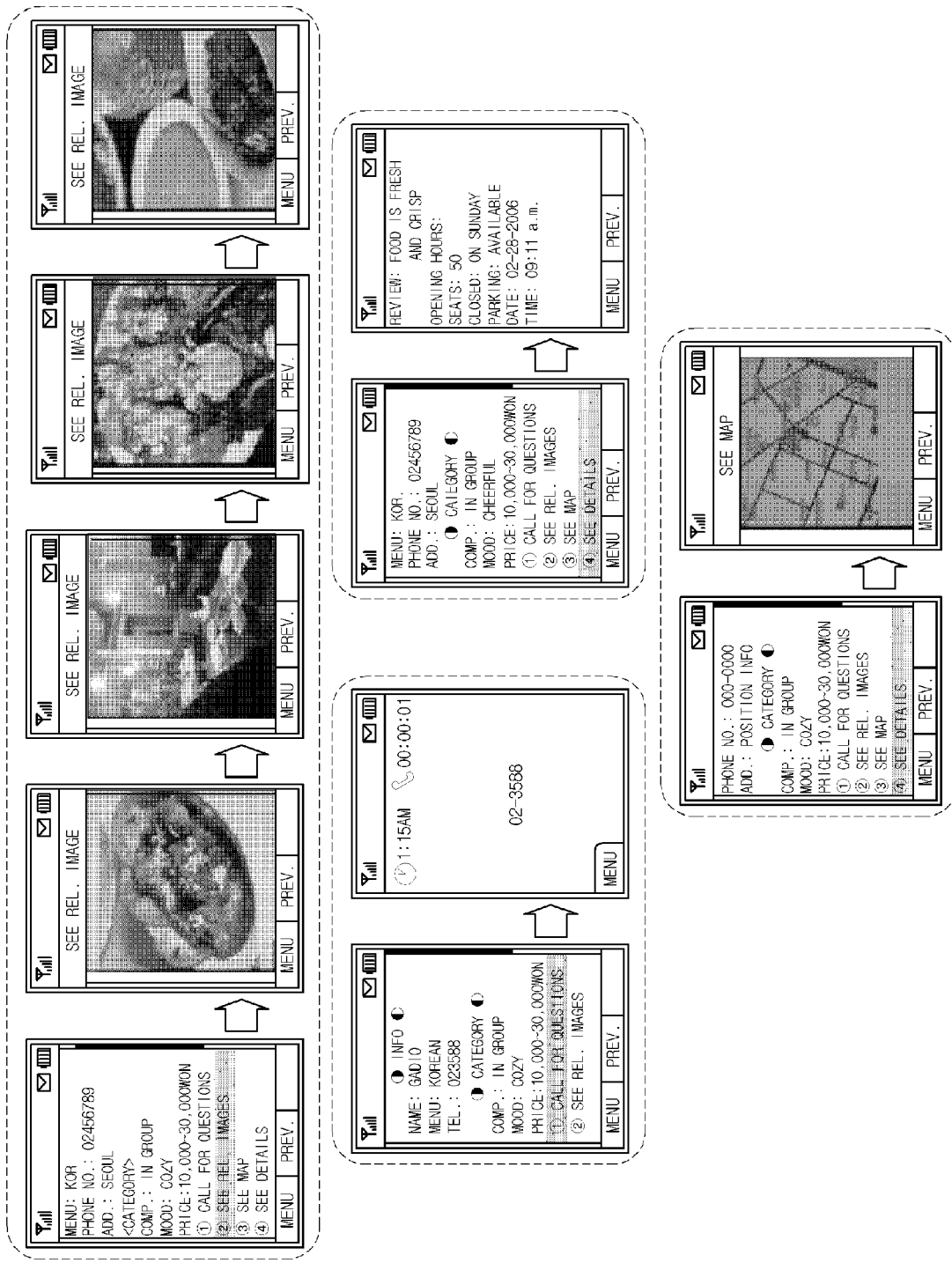
[Fig. 33]

[Fig. 34]
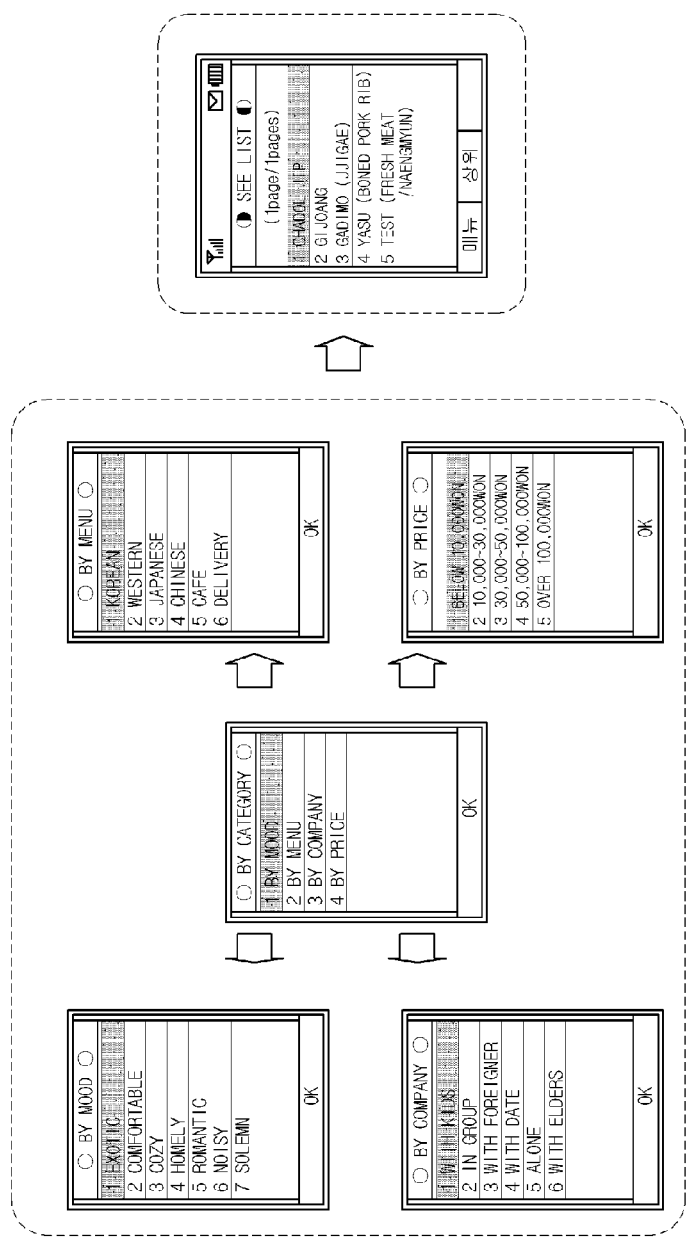
[Fig. 35]
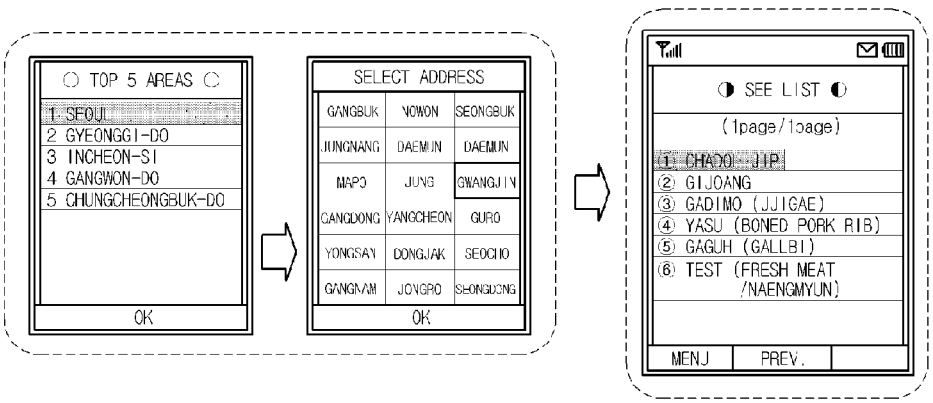

[Fig. 36]

| INPUT SITE CREATION NO.<br>PLEASE INPUT 5 ~ 11 DIGIT NUMBER TO BE USED AS CONTENTS SITE NETWORK. THIS NUMBER IS INPUTTED TO ACTIVATE CONTENTS FROM CELL PHONE | 01198596980 |
|---|---|

| INPUT PHONE NO.<br>PLEASE INPUT ONLY DIGITS OF YOUR CELL PHONE NUMBER TO RECEIVE SMS. WITHOUT "-" SYMBOL | 01198596980 |
|---|---|

| KEYWORD1 | CLASSIFICATION |
|---|---|
| KEYWORD2 | PYEONG |
| KEYWORD3 | PRICE RANGE |
| KEYWORD4 | AREA |

[Fig. 37]

| BY AREA | BANPO-1 DONG |
|---|---|
| | BANPO-2 DONG |
| | BANPO-3 DONG |
| | NONHYEON-DO |
| | BON-DONG |
| | XX-DONG |
| | XY-DONG |

| BY PRICE RANGE | BELOW 50 MILLION WON |
|---|---|
| | BELOW 100 MILLION WON |
| | BELOW 150 MILLION WON |
| | BELOW 200 MILLION WON |
| | BELOW 300 MILLION WON |
| | OVER 300 MILLION WON |

[Fig. 38]

| BY PYEONG | BELOW 10 PYEONG |
| --- | --- |
| | BELOW 20 PYEONG |
| | BELOW 30 PYEONG |
| | BELOW 40 PYEONG |
| | BELOW 50 PYEONG |
| | BELOW 60 PYEONG |
| | BELOW 70 PYEONG |
| | OVER 70 PYEONG |

| BY CLASSIFICATION | FOR SALE |
| --- | --- |
| | PERMANENT RENT |
| | MONTHLY RENT |
| | WITH PREMIUM |
| | FOR URGENT SALE |

[Fig. 39]

| MAIN ITEM ANALYSIS | | |
|---|---|---|
| HOUSEHOLD 1 | APARTMENT | WITH 1 ROOM |
| | APARTMENT & STORES | WITH 2 ROOMS |
| | ROW HOUSE | VILLA |
| | DETACHED HOUSE | HOUSEHOLD ON SHOPPING BLDG. |
| | MULTIPLEX HOUSE | RURAL/SUBURBAN HOUSE |
| HOUSEHOLD 2 | FOR RESIDENCE AND STUDIES | |
| | FOR SLEEPING ONLY | |
| | BOARDING HOME | |
| | OTHER ACCOMMODATION | |
| | | |
| COMMERCIAL 1 | FOOD/SHOPPING | BEAUTY/COSMETICS |
| | GROCERIES/SUPERMARKET | STATIONERY/TOYS |
| | RESTING/BEVERAGE | SPORTS |
| | PAST-TIME/BAR | FLOWER SHOP |
| | PC/KARAOKE | PHARMACY |
| COMMERCIAL 2 | PHOTO STUDIO | MULTI-PURPOSE |

[Fig. 40]

| DISPLAYED ITEM TITLE | INPUT NAME OF REAL ESTATE BROKER | STATEMENT RECAP |
|---|---|---|
| | SEARCH BY RESTAURANT | SELECT MAIN MENU |

| GENERAL REVIEW TITLE | COMMENT (GEN. REVIEW) | |
|---|---|---|

| PHONE NO. | INPUT PHONE NO. | |
|---|---|---|

[Fig. 41]

| WIRED SITE INFO | |
|---|---|
| BASIC WORKING DOCUMENT SHEET | FodDB |
| DIRECTORY | www.mobilemacro.com;5000#Myweb#Macro# |
| TITLE NAME | REAL ESTATE BROKER REGISTRATOR |

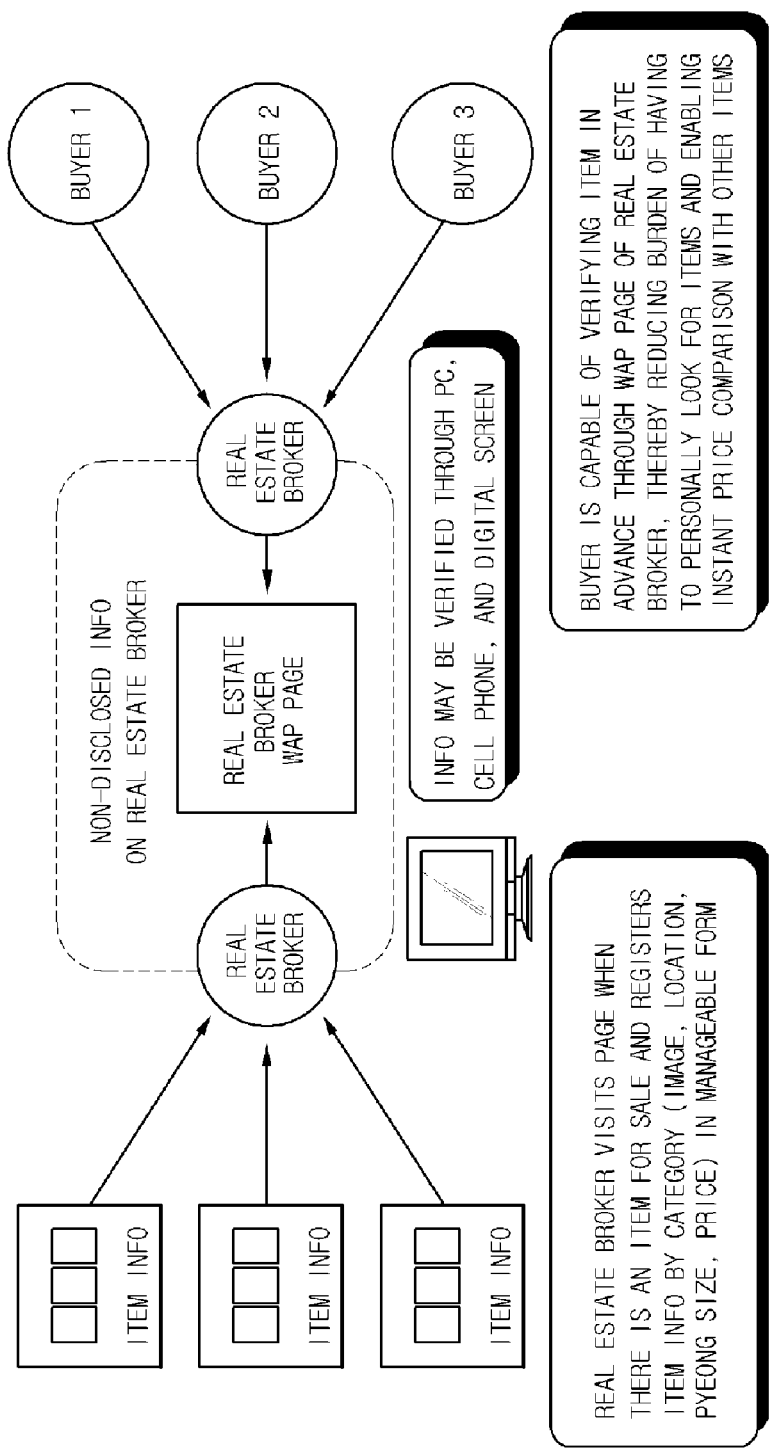
[Fig. 42]

[Fig. 43]
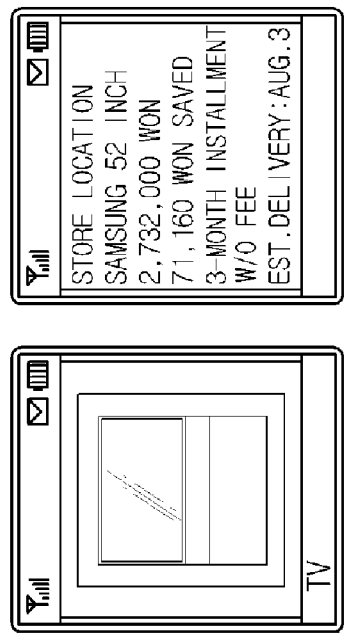
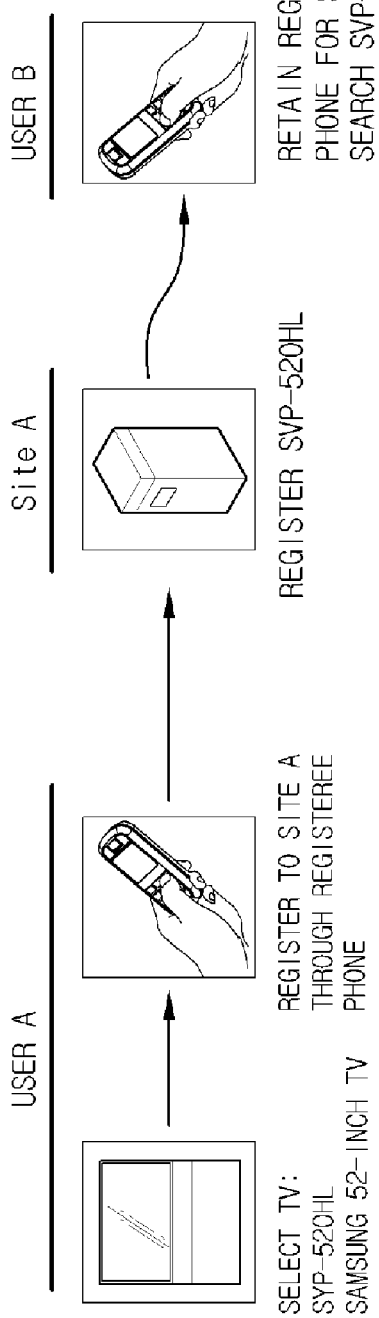

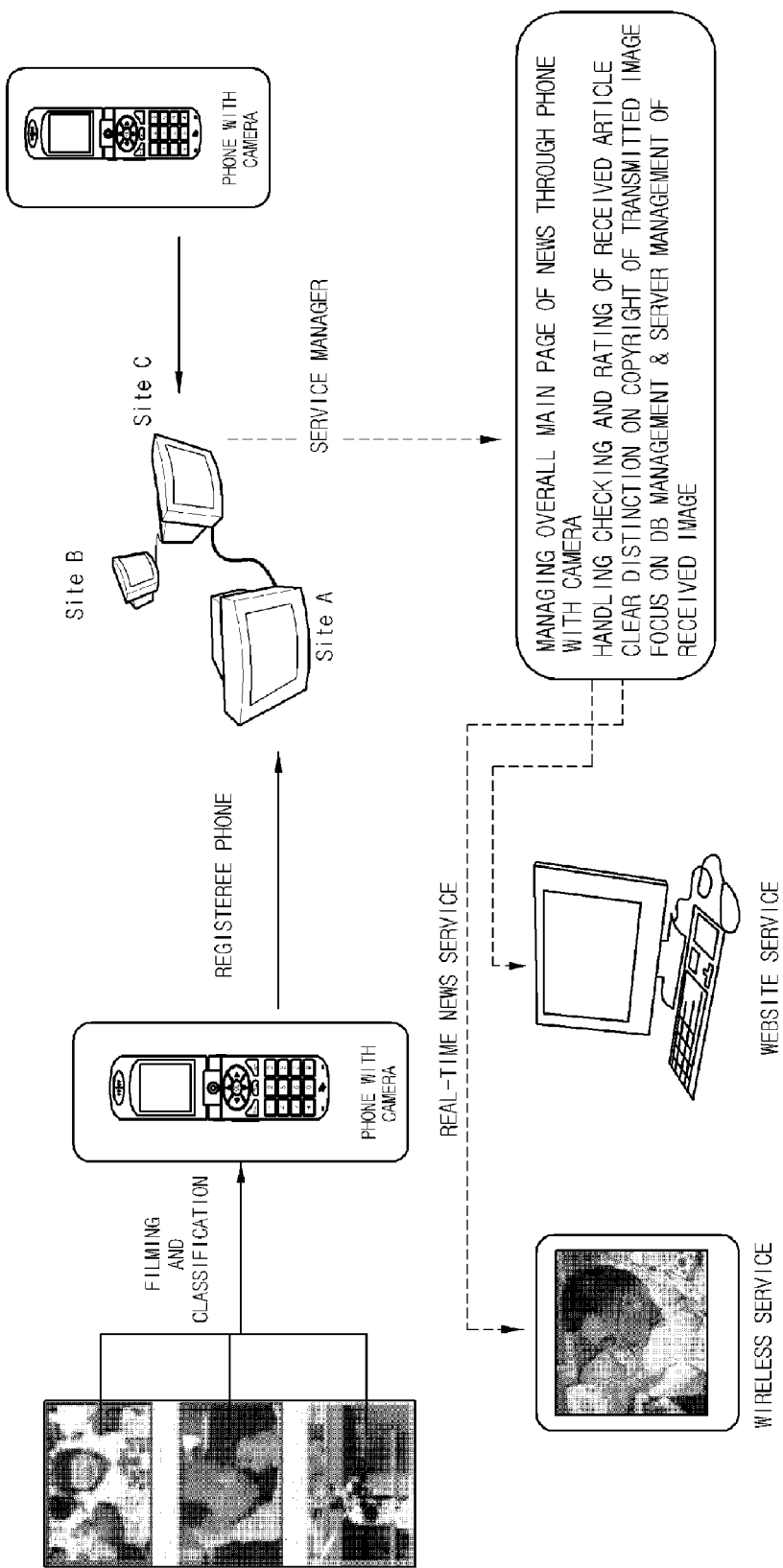
[Fig. 44]

[Fig. 45]
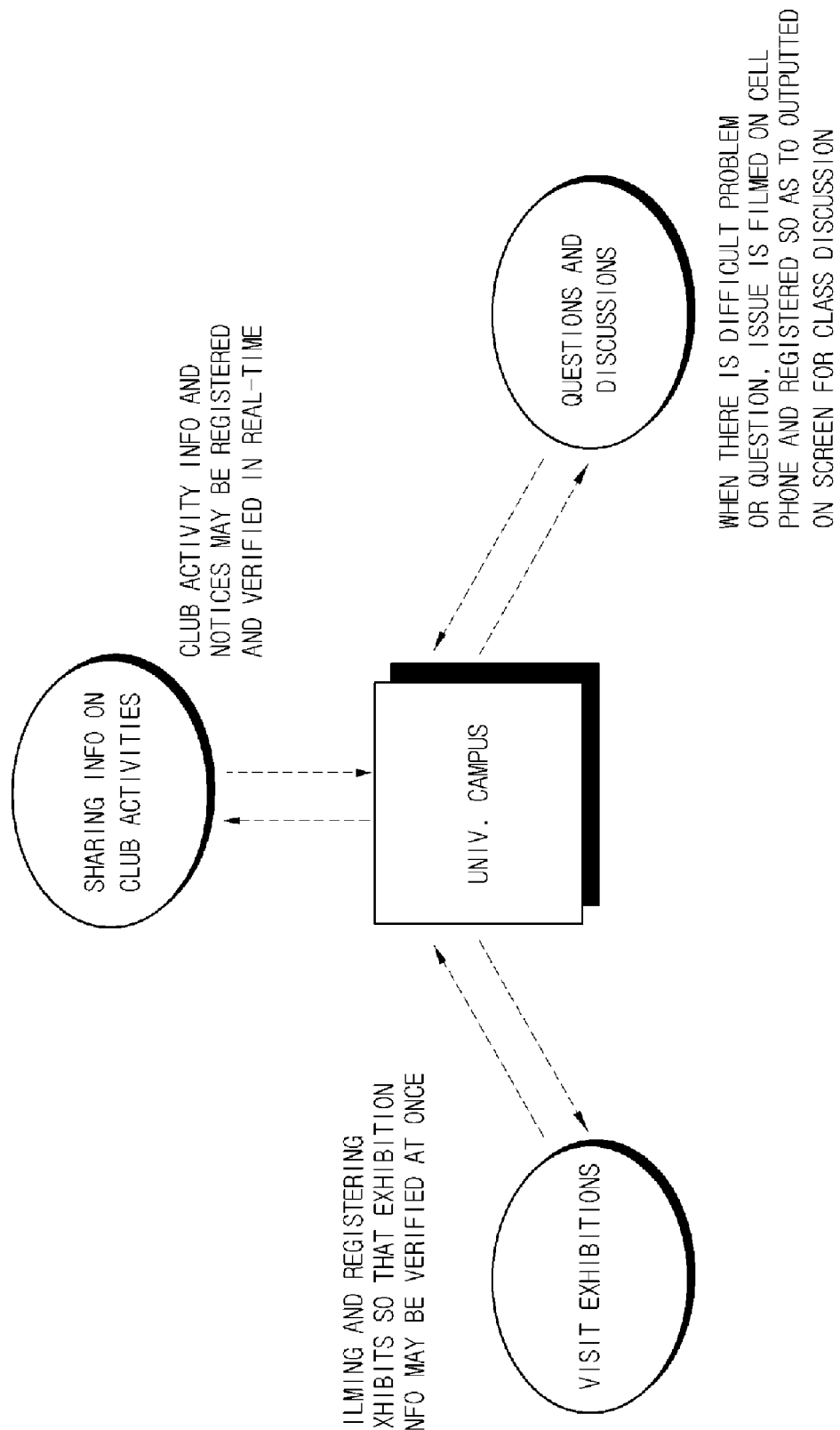

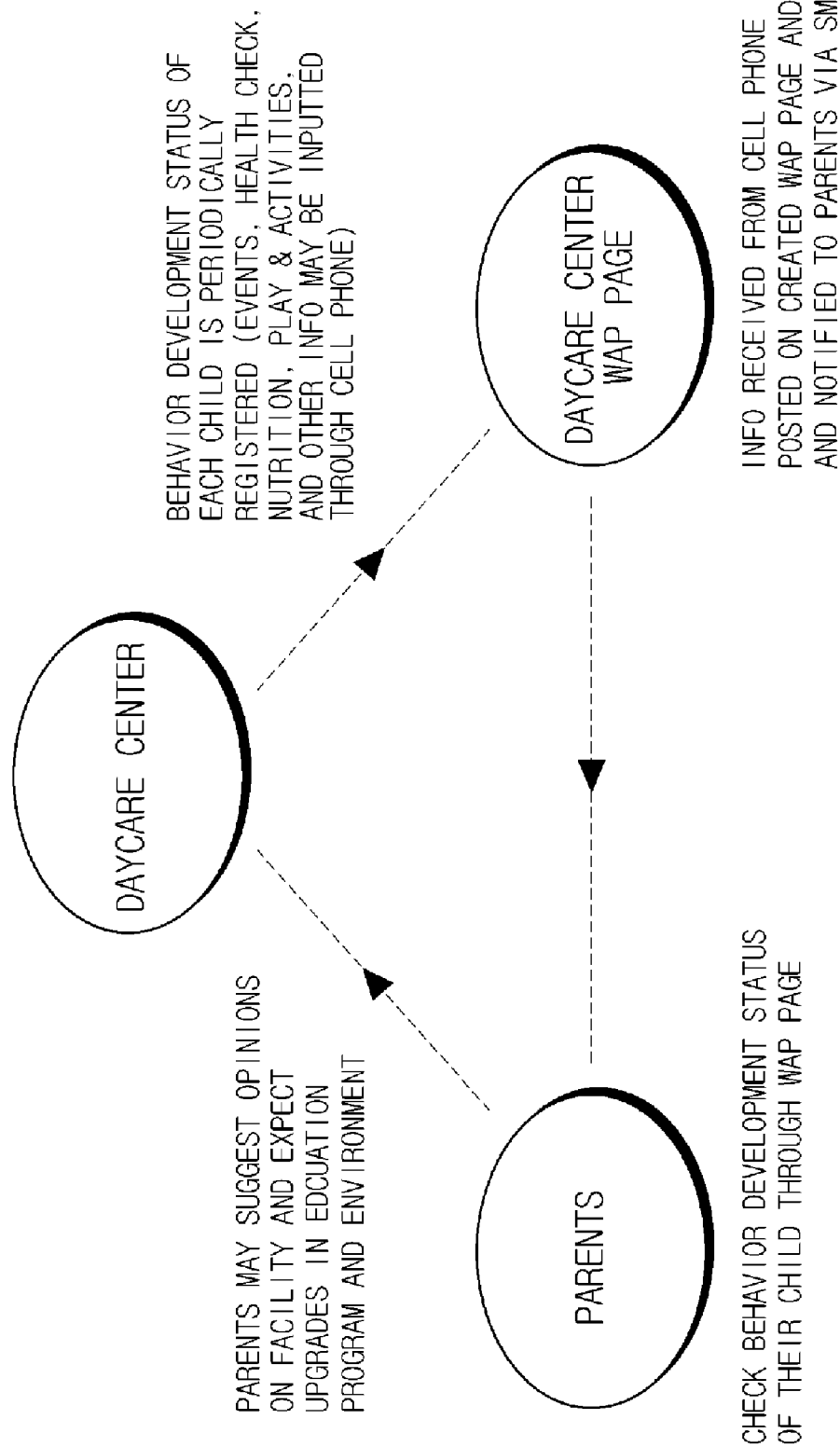
[Fig. 46]

[Fig. 47]
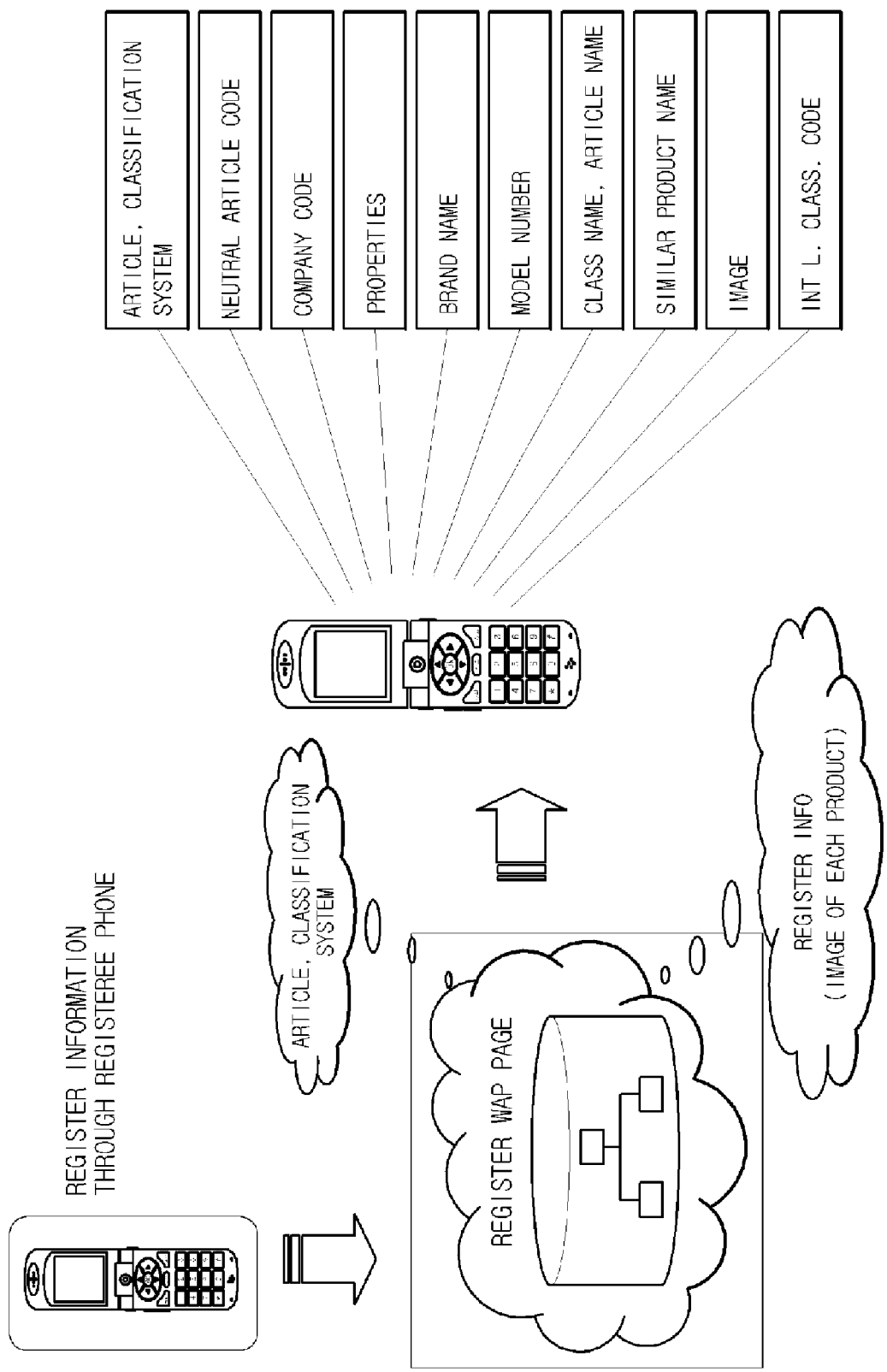

[Fig. 48]
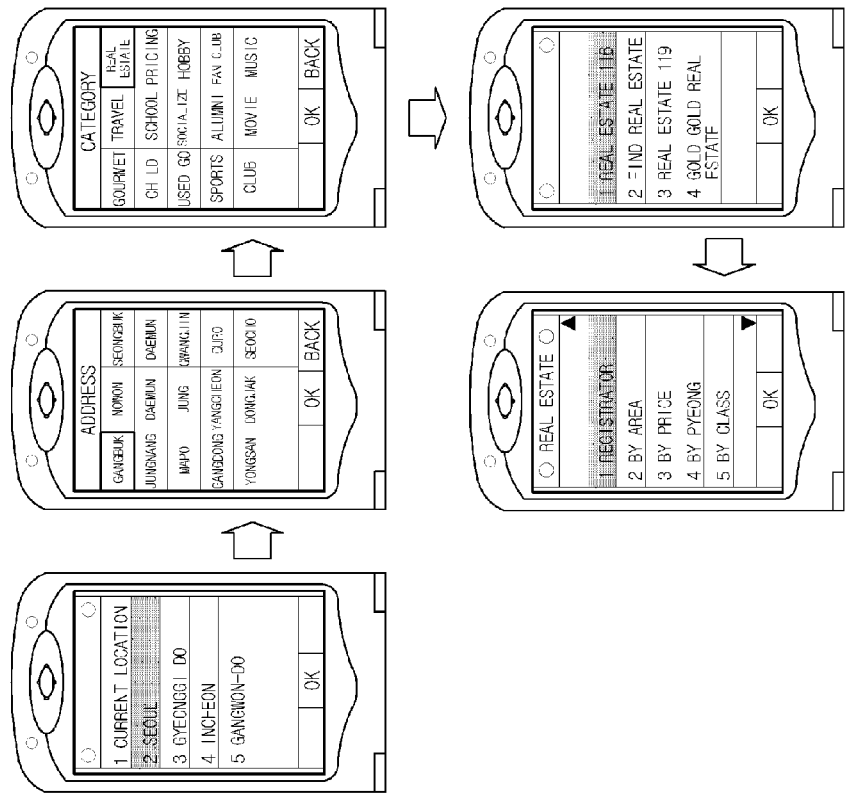
[Fig. 49]
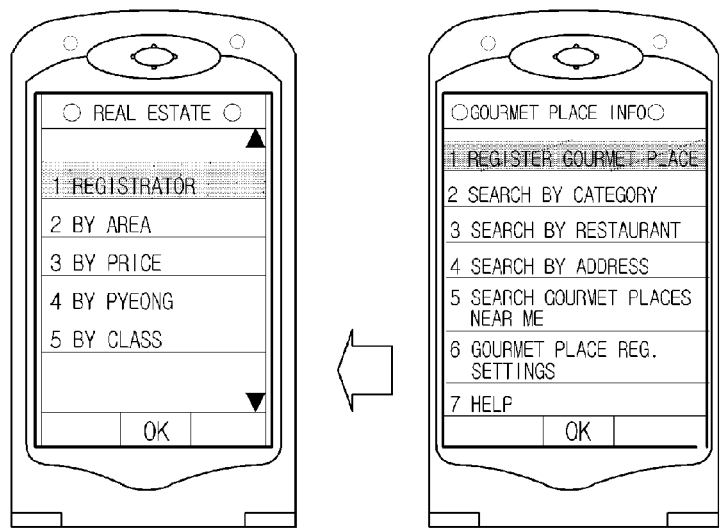

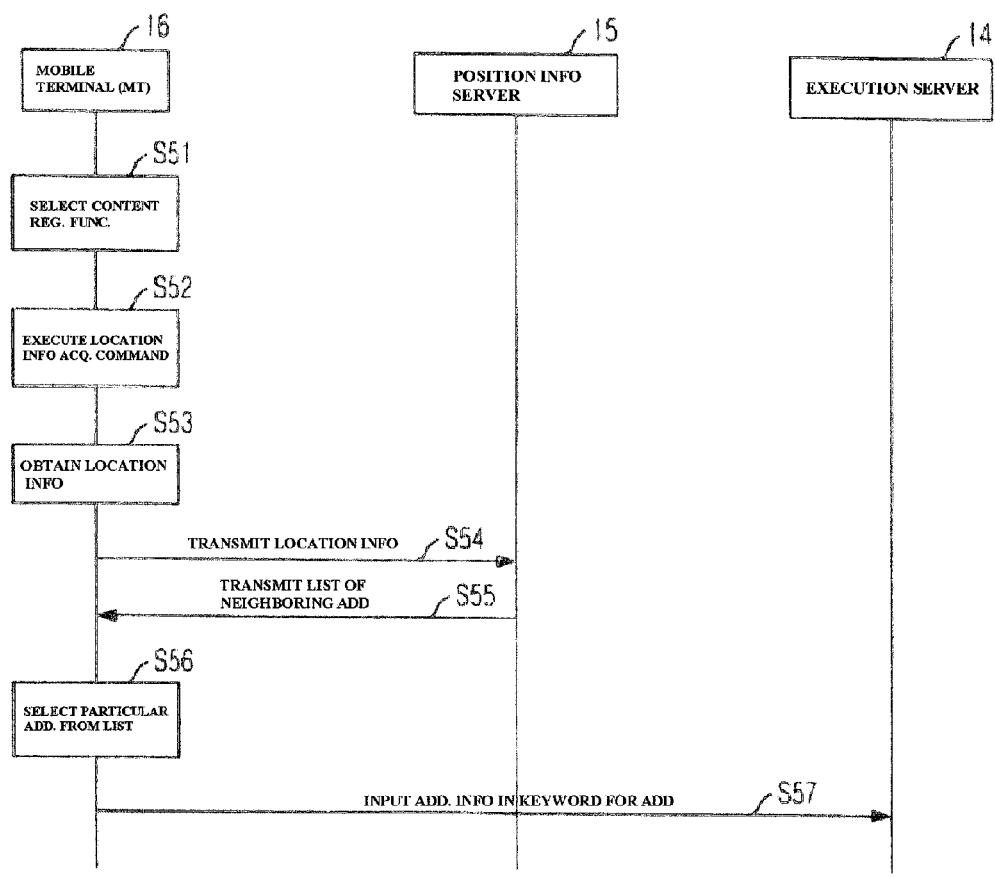
[Fig. 50]

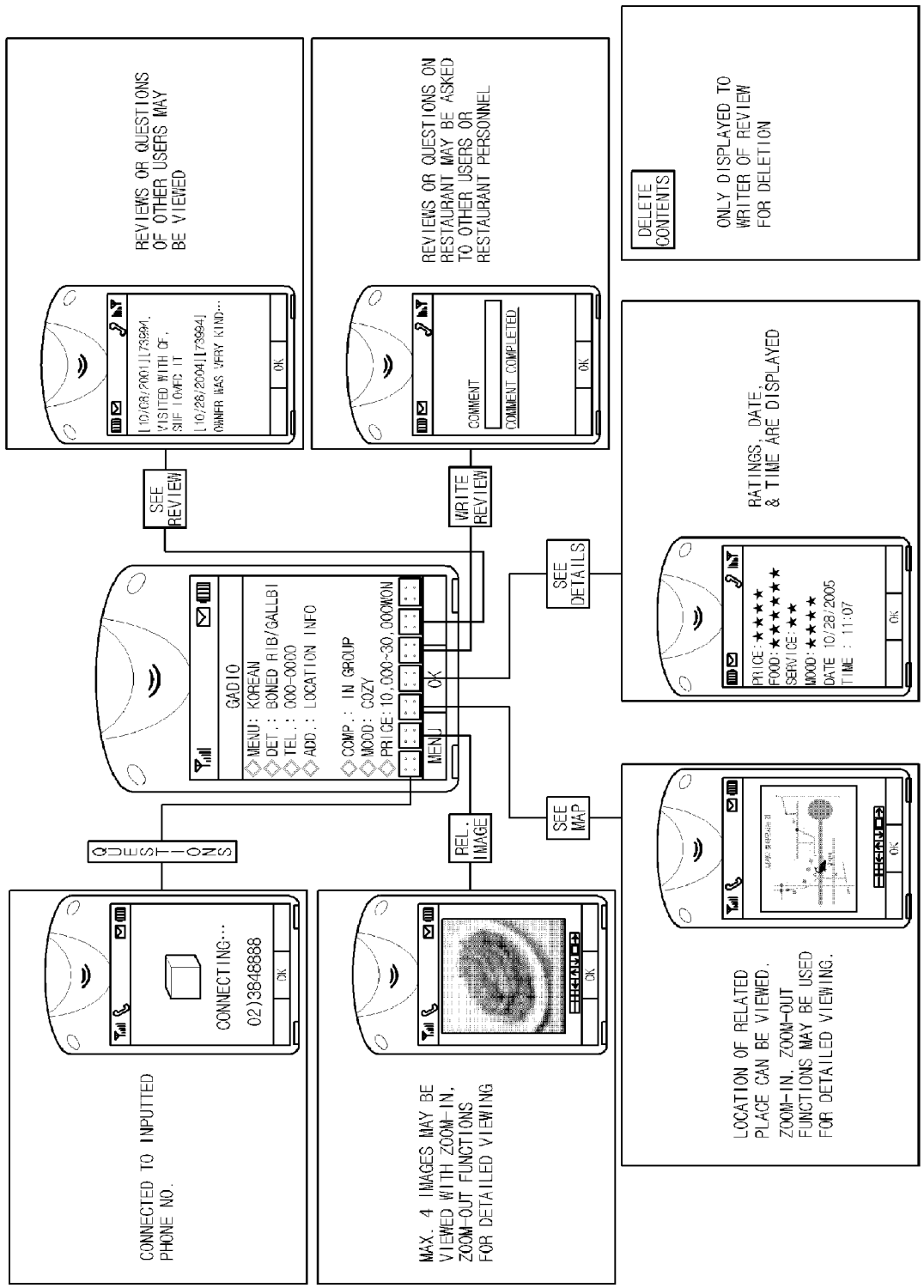
[Fig. 51]

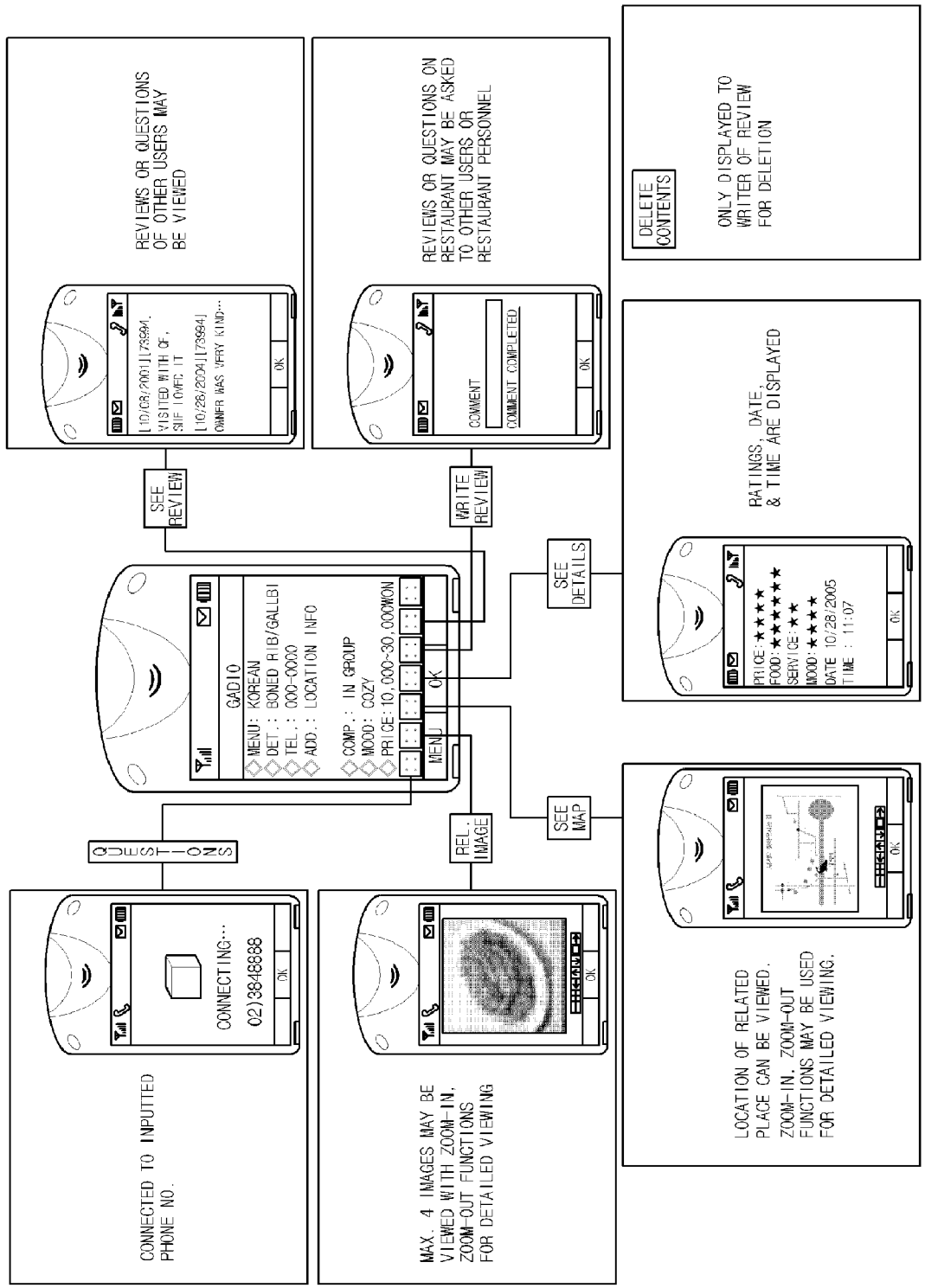
[Fig. 52]

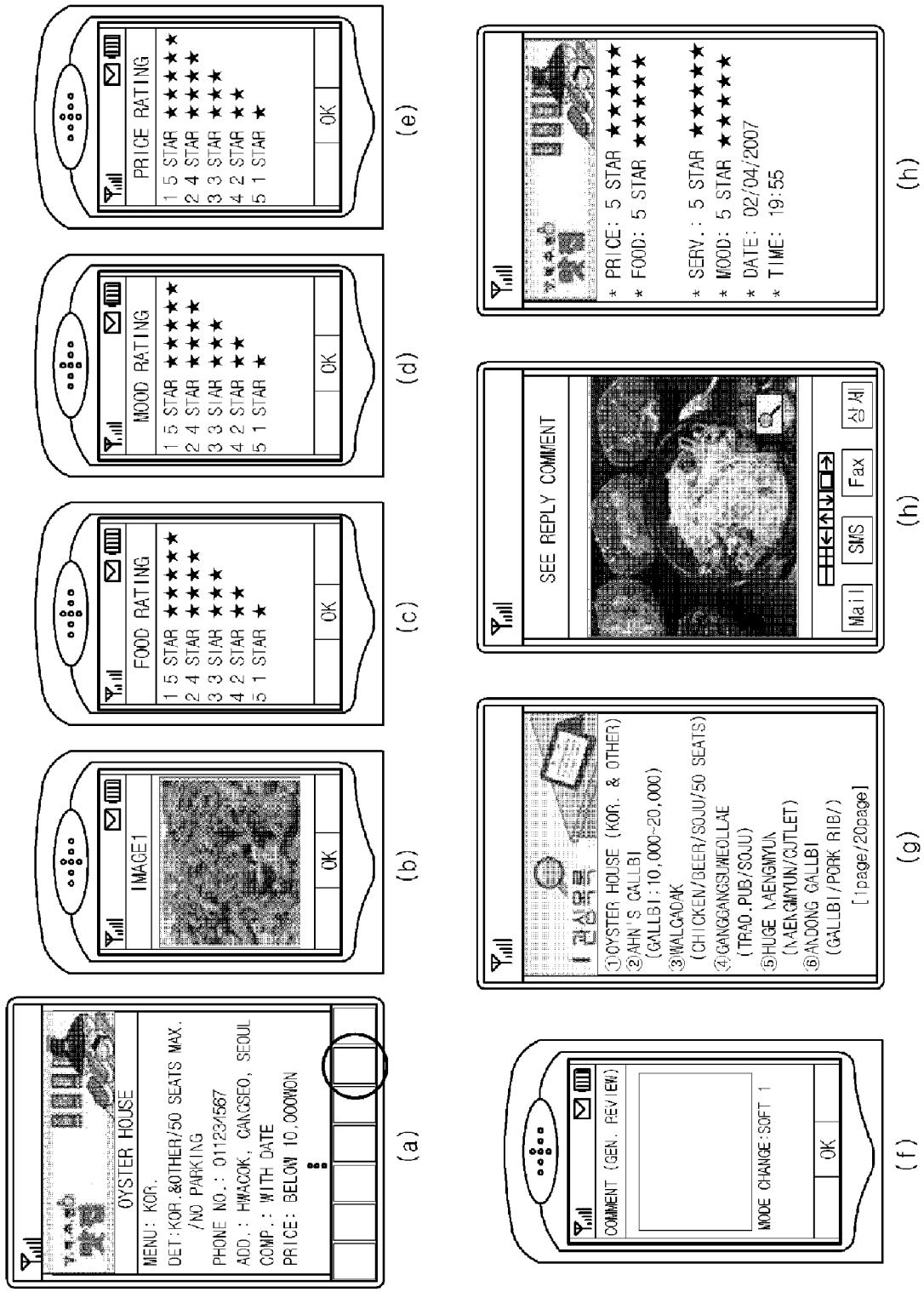
[Fig. 53]

[Fig. 54]

SMS

PHONE NO.

○ SEND LINK

○ SEND CONTENTS

SEND  CANC.

(a)

Email

Email:
TITLE:

SEND  CANC.

(b)

Fax

FAX NO.
TITLE:

SEND  CANC.

(c)

* SEND LINK : TRANSMITS URL LINK OF CURRENT PAGE FOR CALL-BACK
* SEND CONTENT: NAME, ADD, AND BEST MENUS ARE TRANSMITTED VIA SMS

[Fig. 55]
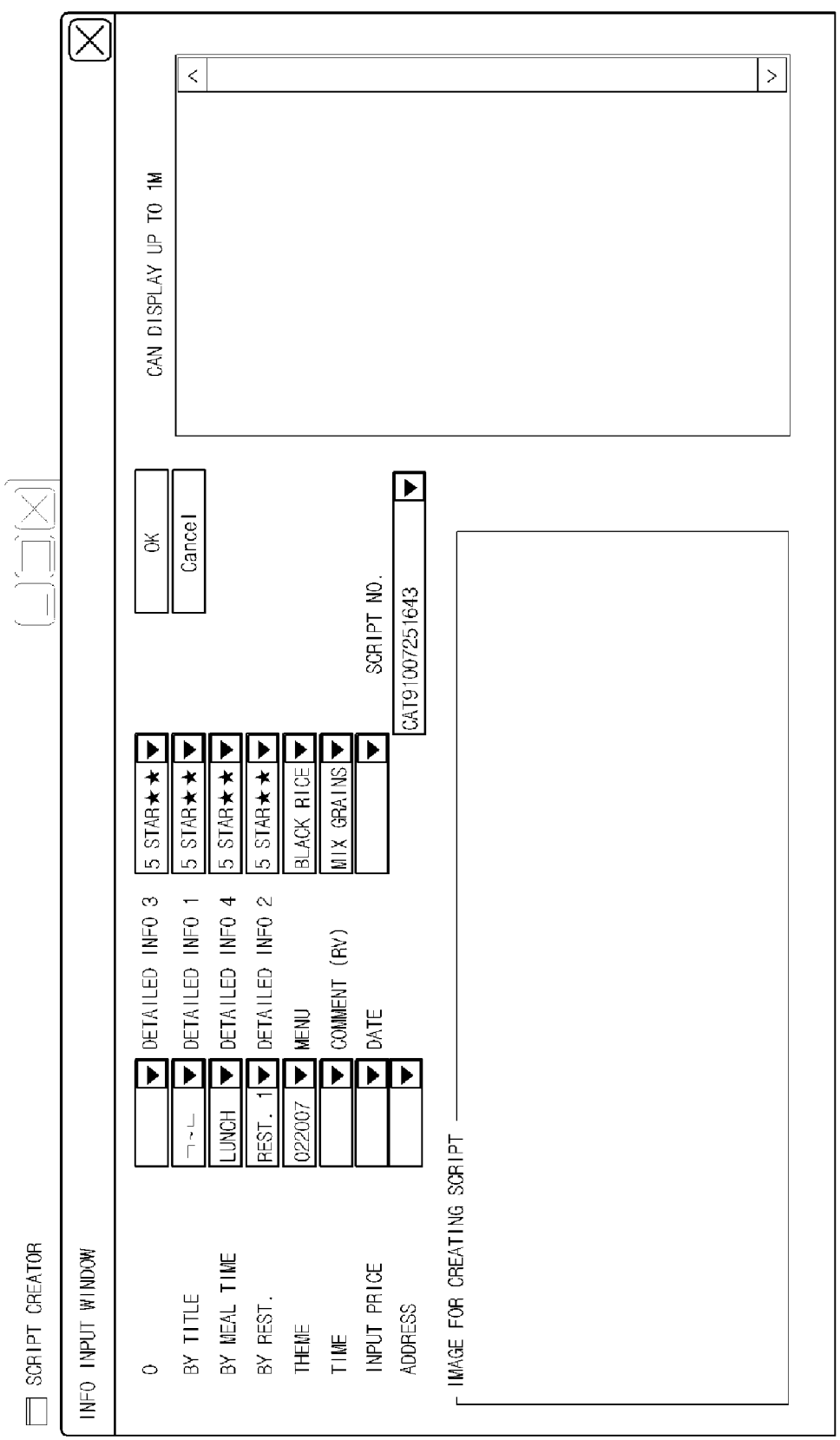

SYSTEM AND METHOD FOR CONTENTS UPLOAD USING A MOBILE TERMINAL

TECHNICAL FIELD

The present invention relates to a method for uploading contents or connecting to uploaded contents by using wireless or wired telecommunications and a system of the same.

BACKGROUND ART

Recently, a variety of functions including games, schedule planners, and contents for performing special operations is now being provided to mobile terminals due to upgrades in the functions of the various components equipped inside the mobile terminal, which used to be capable of only simple functions (i.e., receiving and transmitting calls). However, the general mobile terminals cannot provide functions of downloading new programs to the mobile terminal and executing the newly downloaded programs, such as when using a PC. Therefore, there are many limitations in easily expanding or modifying the functions of the software originally mounted inside the mobile terminal at the time of shipping the products.

A method of adding new functions to a mobile terminal includes a method of connecting the mobile terminal to a separate device and downloading a new program to the mobile terminal (i.e., an off-line downloading method), and a method of using a wireless data transmitting method, such as a WAP (Wireless Application Protocol), and downloading the new program to the mobile terminal (i.e., an on-line downloading method). Most particularly, due to the advantage that the recent mobile terminals may directly download specific contents from a service provider via a radio channel without having to use a separate device, the on-line downloading method is mostly used. Herein, among the on-line downloading method, a method of using a wireless Internet service, such as WAP, is mostly used.

A mobile terminal equipped with a WAP function may connect to a WAP server through a base station and the mobile terminal. Herein, the WAP server is embodied to be able to transmit the program configured in a WML (Wireless Application Protocol) script format. The mobile terminal analyzes the downloaded WML script so as to convert the downloaded WML script to a card data of a WAP document format, thereby transmitting the converted data to a MMI (Man-Machine Interface).

Herein, as a frame for transmitting data via WAP, a card data correspond to a unit for indicating an interaction with at least one user. The card may be configured of a text defined by WML, an image, a link, and an input text. A plurality of such cards is grouped to create a WML page, which is similar to a HTML page. When comparing the WML page with a conventional HTML web document, the conventional web document corresponds to grouping a plurality of frame unit documents so as to create a HTML webpage. In the WAP, each card is grouped to create a WML page. Therefore, an interface with the user is realized by a card, just as the conventional web document. More specifically, just as when web contents are displayed on the computer of the user or when the input of the user is transmitted to the server, in accordance with the contents of the web document, performs input/output functions of an input/output device in a MMI module. For example, the contents of the card are either displayed on a display unit or outputted through an audio unit, or inputted contents provided from an inputting means, such as a key panel, are transmitted to the WAP server. Therefore, when a user input exists or when the contents that are to be outputted are changed, a new set of card data is created from the WAP analyzer. Thereafter, the newly created card data are repeatedly transmitted to the MMI module.

However, the related art on-line downloading method should always be connected to the WAP server in order to download desired contents. Therefore, the user is required to make payments for communication charges each time he or she uses any additional function. The related art method is also disadvantageous in that in order to use an input/output device of the mobile terminal, a WAP analyzer is required to generate card data, which are then analyzed by the MMI module.

Also, the program being equipped in the mobile terminal is pre-programmed via software and is hard-coded into a memory of the mobile terminal. Therefore, a general user is unable to arbitrarily correct or modify the execution process of the corresponding program. Unlike the PC, the related art mobile terminal is unable to provide a function that can program particular contents. Also, when adopting the method of using a virture machine, unlike the system designer, the general user has difficulty understanding the characteristics of his or her own mobile terminal and the particular details of the virture machine. This leads to a limitation in the program, thereby being unable to program the contents executing particular functions that the user desires.

Furthermore, when using the related art mobile terminal, a series of continued (or consecutive) operations is required to be performed based solely upon manual manipulation of the mobile terminal in order to execute the particular functions. Therefore, the usage of the related art mobile terminal becomes inconvenient and difficult due to the complicated manipulation of numerous function keys. Eventually, the mobile terminal becomes difficult for elderly users or beginners to properly and correctly execute the particular functions. Therefore, there lies a problem in that, even though the user owns a mobile terminal equipped with a variety of functions, the user is only capable of executing the simplest functions, such as receiving or sending calls, and being deprived of the many conveniences the mobile terminal has been initially designed to provide to the users, due to the lack of skills in manipulating the communication device.

Generally, in order to register community data consisting of images and texts to webpages for community activity purposes (hereinafter referred to as "webpage", such as a blog or an on-line board by using the mobile terminal, the user takes a picture and then selects a transmit picture (or image) menu. Thereafter, the user inputs the address of the webpage to which he or she wishes to transmit the picture (or image) by typing each character (or letter) through the key pad, thereby transmitting the picture. Subsequently, in case of uploading a text, the user must type in each character (or letter) through the key pad, so as to upload the desired text.

However, the related art mobile terminal is disadvantageous in that the user is required to input each character one-by-one through the key pad, in order to register the community registration data to the webpage as described above. Additionally, the related art mobile terminal is also disadvantageous in that when registering the community registration data to the webpage as described above, an image and/or a text may be registered only one-by-one and only in a vertical direction, thereby displaying the community registration data in an extremely simple and dull configuration. More specifically, the related art mobile terminal is disadvantages in that it is difficult to display a variety of images and texts on the screen of a webpage or WAP page.

In case the user wishes to register a plurality of community registration data sets, such as a plurality of images, to the corresponding webpage, the variety of community registration data is sequentially registered in a vertical direction. In other words, the community registration data such as images are consecutively registered in a vertical direction. Therefore, in order to verify the registered data, the user is required to go through a disadvantage of using a mouse wheel or a click button to skip pages on the webpage.

Meanwhile, a method of providing data supplied to a server by using a wired/wireless channel to a mobile terminal user more easily and efficiently is yet to be provided. For example, the mobile terminal user connects to the server only to be able to view the webpage he or she wishes to search. More specifically, the related art mobile terminal is disadvantageous in that the user is unable to search through a plurality of webpages or to move to a different webpage by using a convenient method. Furthermore, a method of automatically and simultaneously generating (or creating) a wireless website, a cell phone (or mobile phone) program (script), and a database through the web is yet to be provided.

DISCLOSURE OF INVENTION

Technical Problem

An object of the present invention devised to solve the problem lies on providing a method of creating a wireless website on a server and using a mobile terminal either to upload contents on the created wireless website or to be connected to the wireless website, and a system of the same.

The object of the present invention can be achieved by providing, in a system registering contents on a webpage through a mobile terminal that can execute a macro function by using a wired/wireless terminal connected to an Internet network, which is interconnected to a mobile network, and a mobile network, a contents uploading system using a mobile terminal including a macro server providing macro registration contents for registering a macro function of a particular content to the wired/wireless terminal, creating a script for executing the macro function of the particular content based upon macro registration data inputted through the macro registration contents and transmitting the created script to the mobile terminal, and, when community registration data are composed onto the mobile terminal through the macro function executed by the transmitted script, receiving the composed community registration data from the mobile terminal, a DB server storing a plurality of contents required for realizing the macro registration contents, the macro registration data and community registration data inputted to and received by the macro server, scripts created from the macro server, and predetermined forms, and a registration server replacing particular contexts of the forms stored in the DB server with the community registration data, thereby registering the corresponding data to a designated webpage.

In another aspect of the present invention, provided herein, in a method for registering contents on a webpage through a mobile terminal that can execute a macro function by using a wired/wireless terminal connected to an Internet network, which is interconnected to a mobile network, and a mobile network, is a contents uploading method using a mobile terminal including a step of providing macro registration contents for registering macro function of a particular content to the wired/wireless terminal, a step of receiving macro registration data required for registering the macro function from the wired/wireless terminal through the macro registration contents, a step of creating scripts for executing macro function of the particular content by using the macro registration data, a step of transmitting the scripts to the mobile terminal, a step of receiving community registration data from the mobile terminal, when the community registration data are composed onto the mobile terminal through the macro function executed by the transmitted scripts, a step of merging the community registration data with the predetermined forms, when the community registration data are received, and a step of replacing a particular context of the form with the community registration data, thereby transmitting and registering the community registration data to the designated webpage.

In a further aspect of the present invention, provided herein, in a network system for providing a wireless website to a mobile terminal equipped with macro execution functions, is a contents providing system using a mobile terminal including at least one terminal device receiving contents information for the wireless website through a wired means or a wireless means, thereby transmitting the contents information or connecting to the wireless website, a macro server storing the wireless website created by using the contents information inputted from the terminal device, wherein the macro server includes scripts corresponding to the created wireless website, a database for storing information of the wireless website in a table form, and phone page information for displaying the wireless website, and an execution server searching the database so as to provide contents corresponding to each wireless website, in accordance with a connection of the terminal device.

Advantageous Effects

In the present invention, a macro providing shortcut key functions is executed from a mobile terminal so as to create a set of contents. Thus, the mobile terminal can not only easily create the corresponding contents but can also register the created contents to a designated webpage. More specifically, contents may be easily created from the mobile terminal, which may directly be registered to the designated webpage.

Also, by creating and providing a wireless website including scripts, data base, and phone page information, a wireless website user may only use the provided contents more easily but may also move to other wireless websites more easily.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 1 illustrates a block diagram showing an embodiment of a macro service providing system 100.

FIG. 2 illustrates a block diagram shown a memory structure of a mobile terminal according to the present invention.

FIG. 3 illustrates a block diagram showing an embodiment of a macro engine 300.

FIG. 4 illustrates a flow chart showing a process of registering Charac-X according to an embodiment of the present invention.

FIG. 5 illustrates a flow chart showing a process of executing Charac-X according to an embodiment of the present invention.

FIG. 6 illustrates a flow chart showing processes of decrypting a script and executing the script according to an embodiment of the present invention.

FIG. 7 illustrates a flow chart showing processes of registering and downloading the Charac-X for a facsimile transmission.

FIG. 8 illustrates a flow chart showing processes of executing the Charac-X.

FIG. 9 illustrates block view showing the structure of a contents registration system using a mobile terminal according to an embodiment of the present invention.

FIG. 10 and FIG. 11 illustrate flow charts showing community registration methods using the mobile terminal according to the present invention.

FIG. 12 to FIG. 22 illustrate examples of a data registration method by using the community data registration system according to the present invention.

FIG. 23 illustrates an example of the community registration data of FIG. 22 being registered to a webpage according to an embodiment of the present invention.

FIG. 24 illustrates an example of the community registration data of FIG. 22 being registered in a different format according to an embodiment of the present invention.

FIG. 25 illustrates an example of the community registration data of FIG. 22 being registered as a different subject matter according to an embodiment of the present invention.

FIG. 26 illustrates a process of registering community registration data corresponding to a gourmet restaurant of FIG. 25.

FIG. 27 illustrates a wireless webpage being registered to the community registration system of FIG. 9 by using the registration data.

FIG. 28 illustrates an example of a video file or an audio file being registered in the community registration data shown in FIG. 22.

FIG. 29 illustrates a block view of a network system according to an embodiment of the present invention.

FIG. 30 illustrates a flow chart showing the process of providing a wireless website according to an embodiment of the present invention.

FIG. 31 and FIG. 32 illustrate processes of a macro engine of the mobile terminal uploading data, such as images, on a wireless website by using registration scripts.

FIG. 33 illustrates an example of a process for receiving the data uploaded to the wireless website.

FIG. 34 and FIG. 35 illustrate a process of searching data uploaded on the wireless website.

FIG. 36 to FIG. 41 illustrate scripts creating page for creating a wireless website.

FIG. 42 illustrates performing real estate intermediary functions by using the wireless website as shown in FIG. 36 to FIG. 41.

FIG. 43 illustrates a method for providing real-time price comparing function according to an embodiment of the present invention.

FIG. 44 illustrates a method for providing real-time news according to an embodiment of the present invention.

FIG. 45 illustrates a method for providing mobile campus services according to an embodiment of the present invention.

FIG. 46 illustrates a method for managing a daycare center for younger children according to an embodiment of the present invention.

FIG. 47 illustrates a method for providing contents of the company catalogue according to an embodiment of the present invention.

FIG. 48 illustrates a process of searching a wireless website and using the contents in a mobile terminal receiving the script.

FIG. 49 illustrates a process of moving in wireless websites.

FIG. 50 illustrates a flow chart showing a process of registering address information.

FIGS. 51 to 55 are examples of a data registration according to the present invention.

BEST MODE FOR CARRYING OUT THE INVENTION

In a network system for providing a wireless website to a mobile terminal equipped with macro execution functions, a contents providing system using a mobile terminal includes at least one terminal device receiving contents information for the wireless website through a wired means or a wireless means, thereby transmitting the contents information or connecting to the wireless website, a macro server storing the wireless website created by using the contents information inputted from the terminal device, wherein the macro server includes scripts corresponding to the created wireless website, a database for storing information of the wireless website in a table form, and phone page information for displaying the wireless website, and an execution server searching the database so as to provide contents corresponding to each wireless website, in accordance with a connection of the terminal device.

Reference will now be made in detail to the preferred embodiments of the present invention, examples of which are illustrated in the accompanying drawings.

FIG. 1 illustrates a block diagram showing an embodiment of a macro service providing system 100. The macro service providing system 100 includes a plurality of mobile terminals 110a to 110c, a mobile communication network 120, a mobile server 130, a plurality of PCs 140a to 140C, an Internet network 150, a macro server 160, and a DB server 170. Herein, the macro server 160 includes a contents mall server 160a and a Charac-X downloading server 160b.

The macro service providing system 100 uses the mobile communication network 120 and the Internet network 150, and the mobile server 130 may include a WAP gateway that performs encoding and decoding functions on a particular set of data. Also, each of the mobile terminals 110a to 110c may execute a wireless Internet service and is equipped with a macro engine, which can execute a specific script. A memory of each mobile terminal 110a to 110c for using the macro service providing system 100 will be described in detail in a later process.

The macro server 160 is interconnected with the mobile server 130 and the Internet network 150. A macro function for automatically executing particular contents is provided to a specific user through a web browser or a WAP browser. Then, the macro server 160 creates and stores a script in accordance with the contents inputted by the user. Thereafter, the corresponding script is merged to an image file so that the corresponding image file is transmitted to a designated path, when download is requested. Subsequently, the macro server 160 performs a fee-charging process with respect to the downloading of the macro engine and the purchase of the contents and finalizes a payment process.

The macro server 160 includes the contents mall server 160a and the Charac-X downloading server 160b. The contents mall server 160a performs a web server function executing and transmitting commands requested from a user browser, a function of creating and transmitting scripts, and a function of processing fee-charging and finalizing payments. The Charac-X downloading server 160b performs a function of merging a script to an image file and a function of downloading scripts and image files. Herein, Charac-X represents a merged file including a script merged to an image file. Hereinafter, such merged file will be referred as a "Charac-X".

The DB server 170 is interconnected with the macro server 160. The DB server 170 stores diverse data (e.g., contents, image, script, etc.) and performs a managing function of extracting the corresponding data in accordance with a request from the macro server 160 and transmitting the extracted data to a designated path. The DB server 170 includes a member information DB 170a for storing and managing a variety of information (e.g., ID, password, name, address, mobile phone number, telephone number, e-mail information, etc.) on users subscribed to the macro service providing system 100, a contents DB 170b for storing and managing a variety of contents in which macro functions are to be implemented, a script DB 170c for storing and managing scripts directing operations that are designated in accordance with specific contents and data inputted by the user with respect to the corresponding contents, an image DB 170d for storing and managing diverse image files, an individual Charac-X registration DB 170e for individually storing and managing Charac-X data in accordance with contents set-up by each registered user and data inputted by the user with respect to the corresponding contents, a mobile terminal information DB 170f for storing and managing detailed information on the mobile terminal to which each registered user is to receive the requested services, a log information DB 170g for managing a user's log information, and a format DB 170h for managing particular forms of documents that are to be transmitted.

Herein, the detailed information on the mobile terminal is automatically stored once the user inputs the model type of his or her mobile terminal. The detailed information on the mobile terminal that are stored in the mobile terminal information DB 170f include information on name and number of the mobile phone, size of memory available for programming, size of LCD, number of represented colors, presence of a camera function, number of polyphonic tones in sound source chip, type of software platform (e.g., WIPI, WITOP, BREW, etc.). The detailed information on the mobile terminal are recorded in order to set-up different types of contents that are respectively provided to the mobile terminal of each registered user. For example, contents requiring digital camera functions are managed so that the content are provided only to the terminals equipped with a digital camera, and not to the terminals that do not have any digital camera functions. More specifically, in the macro service providing system 100 according to the present invention, the type of contents being provided varies depending upon the specification of a user's mobile terminal, and event the same type of contents may be provided differently depending upon the specification of a user's mobile terminal.

Meanwhile, the facsimile server 180 is interconnected with the Internet network 150 and performs facsimile transmissions of corresponding files to a designated path based upon the facsimile information provided from the macro server 160.

FIG. 2 illustrates a block diagram shown a memory structure of a mobile terminal according to the present invention. In order to execute a particular Charac-X, a macro engine, which is a program for executing the script included in the corresponding Charac-X, should be equipped in the mobile terminal. The macro engine should be separately downloaded after connecting to the macro service providing system 100 and paying a certain amount of money.

A memory 200 of the mobile terminal stores a variety of data and variables, and the memory 200 extracts corresponding data, when requested from an outside body, and transmits the extracted data to a designated path. The memory 200 includes a ROM area and a RAM area. It is preferable that a flash memory is used as the ROM equipped in the mobile terminal.

The ROM area 210 includes a coding area 211 and a data area (embedded files system (EFS)). Execution programs related to the mobile terminal and a virture machine (e.g., WIPI, WITOP, BREW, etc.), which loads a particular file so as to execute a corresponding code, are stored in the coding area 211. The downloaded Charac-X, a macro engine extracting and reading a script from the Charac-X so as to execute a particular operation, and known data are stored in the data area EFS 212. In addition, the RAM area includes a variable area 221, wherein a variety of variables that may occur while executing a program are stored.

FIG. 3 illustrates a block diagram showing an embodiment of a macro engine 300. The macro engine 300 includes a script extractor 310, a buffer memory 320, a script analyzer 330, a stack 340, a calculation processor 350, a definition statement memory 360, and an interface unit 370.

The script extractor 310 reads the Charac-X stored in the data area 212 of the memory 200, shown in FIG. 2, and then extracts only the script. The buffer memory 320 is connected to the script extractor 310. The buffer memory 320 reads the script extracted from the script extractor 310 and temporarily stores line by line.

The script analyzer 330 is connected to the buffer memory 320. The script analyzer 330 analyzes the script stored in the buffer memory 320 so as to generate a token that can be processed by the mobile terminal. The token is classified as data (e.g., character, numbers, character string, matrix, etc.), calculation commands (e.g., arithmetic operators, mobile terminal-related command, character string operation command, condition processor, definition statement operator, etc.), and definition statements. Herein, a definition statement is set to replace an arbitrary definition language with a particular content, and the definition statement includes a name field and a content field.

The stack 340 is connected to the script analyzer 330. The stack 340 temporarily stores the token classified as data (e.g., character, numbers, character string, matrix, etc.) among the tokens created by the script analyzer 330. The calculation processor 350 is connected to the script analyzer 330 and the stack 340. The calculation processor 350 calculates the calculation commands (e.g., arithmetic operators, mobile terminal-related command, character string operation command, condition processor, definition statement operator, etc.) among the tokens created by the script analyzer 330, definition statements other than the calculation command are transmitted to a designated path (e.g., the definition statement memory 360). When the name of a particular definition statement is transmitted while decrypting the script, in a later process, the calculation processor 350 extracts the contents of the corresponding definition statement from the designated path (e.g., the definition statement memory 360) and, then, transmits the extracted contents to the script analyzer 330. More specifically, the calculation processor 350 calculates the script to be processed into a command that can be executed by the mobile terminal.

The definition statement memory 360 is interconnected with the calculation processor 350. The definition statement memory 360 stores the definition statement provided by the calculation processor 350. Then, based upon a request from the calculation processor 350, the definition statement memory 360 extracts and transmits the content field of a specific definition statement.

The interface 370 is interconnected with the calculation processor 350. The interface 370 interfaces a format of input/output data and a timing of operation. More specifically, the interface 370 interfaces a calculation process command provided from the calculation processor 350 and transmits the interfaced command to a designated output means (e.g., LCD, speaker, etc.). Then, the interface 370 interfaces data provided by an input means (e.g., key panel) and transmits the interfaced data to the designated path.

The operation and process steps of the macro service providing system and method of a mobile terminal using image files including scripts will now be described in detail.

FIG. 4 illustrates a flow chart showing a process of registering Charac-X according to an embodiment of the present invention. A manager registers contents for executing a macro function of the mobile terminal, and image files and scripts for executing the contents to a macro server (S405). The contents, image files, and the corresponding script registered by the manager are respectively stored and managed in the contents DB, the image DB, and the script DB within the DB server. A user who wishes to execute the macro function connects to the macro server and registers as a user-member, thereby providing his or her mobile terminal information (S410). The macro server stores and manages diverse registered user-member information (e.g., ID, password, name, address, mobile phone number, telephone number, e-mail information, etc.) in a user-member information DB. The macro server also stores and manages the mobile terminal information of each user-member name and number of the mobile phone, size of memory available for programming, size of LCD, number of represented colors, presence of a camera function, number of polyphonic tones in sound source chip, type of software platform (e.g., WIPI, WITOP, BREW, etc.) in a mobile terminal information DB.

The macro server determines whether the user-member selected a particular set of contents (S415). If the user-member did not select the contents, the macro server remains on stand-by. However, if the user-member selected the specific contents, the macro server sequentially displays a series of designated input screens (e.g., various criteria related to the execution of the contents, a path for downloading the contents, etc.) required for executing the corresponding contents (S420). Thereafter, the macro server determines whether the input is completed (S425). If the input is not complete, the process moves back to the previous step (S420) so as to display the corresponding input screens. On the other hand, if the input is complete, the macro server determines whether a script corresponding to the contents selected by the user-member is created (S430). Thereafter, if the script is desired, the script corresponding to the selected contents is created, and the created script is merged with the image file corresponding to the selected contents so as to complete the Charac-X, thereby storing the completed Charac-X to the individual Charac-X registration DB (S435).

Then, the macro server determines whether the user-member wishes to download the corresponding Charac-X to a designated path (i.e., mobile terminal number) (S440). If the user-member wishes to download the corresponding Charac-X, the macro server transmits a SMS (e.g., "Do you wish to download the Charac-X requested by Hong Kil-Dong? Press the Enter key, if you wish to download." or "To download the Charac-X, type in the authorization number shown below." verifying whether the user-member wishes to download the corresponding Charac-X to a designated path (S445).

Subsequently, the macro server determines whether a download authorization signal is transmitted from the designated path (S450). Then, if the download authorization signal is transmitted, the corresponding Charac-X is downloaded (S455). Thereafter, the macro server determines whether download is complete (S460). If the download is not complete, the macro server returns to the previous step (S455) so as to continue the downloading process. Then, when downloading is complete, the entire process is ended.

Herein, a method of using call-back signals and a method of issuing an authorization number may be used for the download authorization signal. When adopting the method of using a call-back signal, a URL for executing the download of the designated Charac-X is included in the call-back signal. Therefore, when the call-back signal is transmitted, the Charac-X is directly and automatically downloaded to the designated path. Alternatively, when adopting the method of issuing an authorization number, the desired (or designated) Charac-X is downloaded by using a file name (e.g., an authorization number such as "790" of the designated Charac-X. Herein, an already-known number such as the mobile phone number of the individual may also be used as the authorization number.

FIG. 5 illustrates a flow chart showing a process of executing Charac-X according to an embodiment of the present invention. The mobile terminal for executing the Charac-X is equipped with a virture machine and a macro engine. The user executes the virture machine equipped in the mobile terminal and operates the macro engine (S510). Then, the macro engine determines whether Charac-X is stored in the data area of the memory (S520). If the Charac-X is stored in the data area, the macro engine displays a contents list (S530) and determines whether the user selected a specific set of contents (S540). If the user selects a specific set of contents, the macro engine extracts and decrypts a script from the Charac-X corresponding to the specific contents (S550) and executes the corresponding script (S560). Thereafter, the macro engine determines whether the decrypting of the script is complete (S570). If the decrypting process is not complete, the macro engine returns to the above step (S550) to repeat the subsequent steps. Then, when the decrypting of the script is complete, the macro engine ends all processes. Hereinafter, the steps of decrypting and executing the script will be described in detail with reference to FIG. 6.

FIG. 6 illustrates a flow chart showing processes of decrypting a script and executing the script according to an embodiment of the present invention.

The downloaded script is configured of a plurality of statements, wherein the statements include data, definition statements, and calculation commands. Herein, each of the statements refers to each of the lines configuring the entire script. And, the macro engine decrypts and executes the script line by line (i.e., statement by statement).

First of all, a first statement L of the script is defined as 1 (S605). The macro engine reads the $L^{th}$ statement of the corresponding script through the EFS and, then, temporarily stores the read $L^{th}$ statement to the buffer memory (S610). The script analyzer decrypts the statements stored in the buffer memory so as to create a token for each statement (S615). As described above, the token consists of data (e.g., character, numbers, character string, matrix, etc.), calculation commands (e.g., arithmetic operators, mobile terminal-related command, character string operation command, condition processor, definition statement operator, etc.), and definition statements.

Subsequently, the script decryptor determines whether the created token corresponds to data (S620). If the created token corresponds to data, the token is temporarily stored in the stack (S625). Alternatively, if the created token does not correspond to data, the token is transmitted to the calculation processor. The calculation processor determines whether the created token corresponds to a definition statement (S630) and, then, determines whether the definition statement corresponds to a definition statement registered in the definition statement memory (S635). If the definition statement corresponds to a registered statement, the corresponding definition statement is transmitted to the script decryptor, and the script decryptor decrypts the corresponding definition statement so as to create a respective token (S640). The process then returns to a previous step (S620) so as to repeat the subsequent steps. In Step 635, if the definition statement does not correspond to a definition statement registered in the definition statement memory, the statement is processed as an error (S645).

In Step 630, if the created token does not correspond to a definition statement, the script decryptor determines whether the created token corresponds to a calculation command (S650). If the created token does not correspond to a calculation command, the corresponding token is processed as an error (S645). If the created token corresponds to a calculation command, the calculation processor decrypts the corresponding calculation command so as to process the calculation, thereby executing the corresponding token (S655). Subsequently, the macro engine determines whether there are more tokens to process (S660). If more tokens to be processed remain, an earlier step (S620) is performed so as to repeat the subsequent process steps. If tokens to be processed no longer remain, the macro engine determines whether the corresponding statement is the last statement of a specific script (S665). If the corresponding statement is not the last statement, the subsequent statement is defined as an $L+1^{th}$ statement (S670), and the macro engine returns to Step 610 to repeat the subsequent process steps. On the other hand, if the corresponding statement is the last statement, then the process is ended.

FIG. 7 illustrates a flow chart showing processes of registering and downloading the Charac-X for a facsimile transmission. The manager registers the contents for executing the macro function of the mobile terminal, and the image files and the contents for executing the script to the macro server. Then, the manager assumes that the user has completed a form for a set of contents (e.g., a cost estimate, a business registration certificate, etc.) that may be selected and that the user registered the completed form to a contents mall server. Herein, the contents, image files, and the corresponding script registered by the manager are respectively stored and managed in the contents DB, the image DB, and the script DB within the DB server.

A user who wishes to perform the macro function connects to the macro server so as to select a contents form he or she wishes to register. Then, the user inputs the required information in the selected form (S710). The macro server creates a script corresponding to the contents selected by the user. Then, the image file corresponding to the contents is merged with the created script so as to complete Charac-X (S720), thereby storing the completed Charac-X to the individual Charac-X registration DB (S730).

Then, the macro server determines whether the user wishes to download the corresponding Charac-X to a designated path (i.e., mobile terminal number) (S740). If the user-member wishes to download the corresponding Charac-X, the macro server transmits a SMS (e.g., "Do you wish to download the Charac-X requested by Hong Kil-Dong? Press the Enter key, if you wish to download. or "To download the Charac-X, type in the authorization number shown below.") verifying whether the user wishes to download the corresponding Charac-X to a designated path (S750). Herein, the method for verifying whether the Charac-X has been downloaded may include a method of uniformly using SMS, and also a method of indicating a Charac-X creation status and download method on a PC screen so that the user can acknowledge and select downloading options.

Subsequently, when a download authorization signal is transmitted from the designated path, the macro server downloads the corresponding Charac-X and determines whether the download is complete (S760). If the download is not complete, the macro server returns to Step 750 to continue the downloading process. Then, when the download is complete, the macro server ends the entire process. Herein, a method of using call-back signals and a method of issuing an authorization number may be used for transmitting the download authorization signal. When adopting the method of using call-back signal, a URL for executing the download of the designated Charac-X is included in the call-back signal. Therefore, when the call-back signal is transmitted, the Charac-X is directly and automatically downloaded to the designated path. Alternatively, when adopting the method of issuing an authorization number, the desired (or designated) Charac-X is downloaded by using a file name (e.g., an authorization number such as "1190" corresponding to "www.phonemacro.co.kr/image/1190.jpg") of the designated Charac-X. Herein, an already-known number, such as the mobile phone number of the individual, may also be used as the authorization number.

FIG. 8 illustrates a flow chart showing processes of executing the Charac-X. The mobile terminal for executing the Charac-X is equipped with a virture machine and a macro engine. The user executes the virture machine equipped in the mobile terminal and operates the macro engine (S810). Then, the macro engine determines whether Charac-X is stored in the data area of the memory (S820). If the Charac-X is stored in the data area, a contents list is displayed (S830). If the Charac-X is not stored in the data area, an instruction message describing how to download the Charac-X is outputted (S825).

If the Charac-X is stored in the data area, the macro engine displays a contents list (S830) and determines whether the user selected a specific set of contents (S840). If the user selects a specific set of contents, the macro engine extracts and decrypts a script from the Charac-X corresponding to the specific contents (S850) and executes the corresponding script (S860). Thereafter, the macro engine determines whether a message for transmitting a facsimile is created after the script is executed (S870). If the message is not created, the process returns to Step 850 so as to repeat the subsequent steps.

If the message for transmitting a facsimile is created, the created message information is transmitted to the macro server (S880). Thereafter, the macro server copies log information (e.g., date of usage, etc.) of the corresponding user based upon the decrypted information, and then the macro server transmits the facsimile information (e.g., location of data, location of facsimile transmission, etc.) to the facsimile server (S890). The facsimile server transmits the corresponding data (or information) to a designated path based upon the transmitted facsimile transmission (S895).

FIG. 9 illustrates block view showing the structure of a contents registration system using a mobile terminal according to an embodiment of the present invention. Hereinafter, a community data registration system will be given as an example of the contents registration system.

Referring to FIG. 9, the community data registration system according to an embodiment of the present invention includes a macro server 50 for exchanging data with a wired/ wireless terminal (PC) and a mobile terminal (MT); a DB server 60 for exchanging data with the macro server 50; and a registration server 70 for receiving data transmitted from the DB server 60. At this point, the above-described wired/wireless terminal (PC) is connected to an Internet network (NW), which is inter-connected with the mobile network (MN), as shown in FIG. 9. Also, the above-described mobile terminal (MT) uses the mobile network (MN) through a mobile server (MS) having a WAP gateway, as shown in FIG. 9. The mobile terminal (MT) also includes a virture machine for loading a specific file so as to execute a code, and a macro engine for decrypting a script on a specific set of contents so as to execute the script. More specifically, the mobile terminal (MT) is able to execute a macro function by using the virture machine and the macro engine. The community data registration system according to an embodiment of the present invention having the above-described structure will now be described in more detail.

First of all, the above-described macro server 50 provides macro registration contents for macro registration of a specific set of contents to the wired/wireless terminal (PC). The macro server 50 also creates a script for executing a macro based upon the macro registration data that are inputted through the macro registration contents and then transmits the created script to the mobile terminal (MT). Then, when community registration data are created by executing the transmitted script, the macro server 50 receives the created community registration data through the mobile terminal (MT).

Subsequently, the above-described DB server 60 stores a variety of contents, the above-described macro registration data and community registration data, the above-described script, and predetermined forms.

Thereafter, the above-described registration server 70 replaces specific subject matter of the predetermined form files stored in the above-described DB server 60 with the community registration data, thereby registering the community registration data to a designated webpage.

Herein, the above-described macro server 50 may, for example, include a contents provider 52 for providing macro registration contents to the above-described wired/wireless terminal (PC), a script creator 54 for creating a script by using macro registration data being inputted through the macro registration contents, which are provided by the contents provider 52, a transmitter 56 for transmitting the scripts created by the script creator 54 to the above-described mobile terminal (MT), and a receiver 58 for receiving community registration data, which are created by the above-described mobile terminal (MT) through the macro of the specific set of contents executed by the transmitted script, from the mobile terminal (MT).

Also, the above-described DB server 60 may, for example, include a user information DB 61 for storing user information on the macro registration contents included in the macro registration data, which are inputted to the above-described macro server 50, a contents DB 62 for storing macro registration contents provided by the above-described macro server 50, a script DB 63 for storing the script created by the above-described macro server 50, a community registration data DB 66 for storing the community registration data received from the above-described macro server 50, and a form DB 67 for storing a variety of forms used in the above-described registration server 70. The DB server 60 provides the data stored in the DBs 61 to 67 to the above-described macro server 50.

The operating process of the community data registration system using the mobile terminal according to an embodiment of the present invention is described as follows with reference to FIG. 9. At this point, it is assumed that the above-described DB server 60 stored the variety of contents and forms through a manager or client. Furthermore, in order to avoid confusion of providing double description of the present invention, reference numerals shown in FIG. 10 will hereinafter be indicated in parentheses.

First of all, a contents provider 52 of the above-described macro server 50 uses contents stored in a contents DB 62 of the above-described DB server 60, so as to provide macro registration contents for registering macro functions of a particular set of contents in the above-described wired/wireless terminal (PC). (S1 of FIG. 10) Accordingly, the macro server 50 receives the macro registration data from the wired/wireless terminal (PC) through the macro registration contents. (S2 of FIG. 10) Herein, the above-described macro registration data include contents required for the macro registration (e.g., contents to be inserted in a script statement, which will be described in a later process, a webpage address, etc.) and user information using the macro registration contents (e.g., log information, personal information, etc.).

As described above, when the macro registration data are inputted from the wired/wireless terminal (PC), the user information DB 61 of the DB server 60 stores the information on the user. Then, the script creator 54 of the macro server 50 uses the contents required for the macro registration from the macro registration data, thereby creating a script. (S3 of FIG. 10) Subsequently, the transmitter 56 of the macro server 50 transmits the script stored in the script DB 65 of the DB server 60 to the mobile terminal (MT) in accordance with the request of the mobile terminal (MT). (S4 of FIG. 10) Evidently, the script is transmitted to the mobile terminal (MT) through the Internet network (IN) interconnected with the mobile network (MN). At this point, the macro server 50 may be configured to transmit a SMS (e.g., If you wish to download the script, press the authorization code below.), verifying whether the user wishes to download the script stored in the script DB 65, to the mobile terminal (MT) through the transmitter 56. Then, when an authorization signal (e.g., receiving a call-back signal, receiving an authorization code, etc.) is transmitted from the mobile terminal (MT), a payment procedure with respect to the usage of the script is processed, thereby transmitting the corresponding script. Evidently, the above-described mobile terminal (MT) corresponds to a model equipped with the above-described virture machine and macro engine so as to be able to execute the macro function.

Thereafter, when the script is transmitted to the mobile terminal (MT), the user operates the virture machine and the macro engine of the mobile terminal (MT) so as to execute the script. Accordingly, a particular set of contents having a macro function is realized in the mobile terminal (MT). As the particular set of contents is realized, the user uses the macro function of the particular set of contents to create (or compose) community registration data configured of images or characters (or text) (e.g., recording the image of a subject or selecting a set of desired characters by using the macro function).

Then, when the composition of the community registration data is completed, the composed (or created) community registration data are transmitted through the mobile terminal (MT). Therefore, the receiver 58 of the macro server 50 receives the community registration data transmitted from the mobile terminal (MT). (S5 of FIG. 10) At this point, the community registration data DB 66 of the DB server 60 stores the community registration data received by the receiver 58. When the community registration data are stored in the community registration data DB 66 as described above, a merging unit 72 of the registration server 70 merges the stored community registration data and the stored in the form DB 67. (S6 of FIG. 10) At this point, the merging unit 72 merges the data and the form, so that the community registration data are inserted in predetermined sections of the form in accordance with the contents of the community registration data. More specifically, if the contents of the community registration data correspond to images, the merging unit 72 merges the data and the form, so that the community registration data fit into image (or picture) sections of the form. Alternatively, if the contents of the community registration data correspond to characters, the merging unit 72 merges the data and the form, so that the community registration data fit into sections for characters within the form.

As described above, if the community registration data are merged with the registration form, an uploading unit 74 of the registration server 70 transmits the community registration data merged with the registration form to a designated webpage and registers the merged data. (S7 of FIG. 10) Therefore, the community registration data merged with the registration form are registered to the designated webpage and displayed on the screen. Evidently, the community registration data are formalized and registered in accordance with the merging of the data with the registration form.

Meanwhile, a community data registration system using a mobile terminal according to an embodiment of the present invention may further include a Charac-X creator 54a, an image DB 63a, and a Charac-X DB 63b, as shown in FIG. 9. At this point, the Charac-X creator 54a may be formed in the macro server 50 as described above. And, the image DB 63a and the Charac-X DB 63b may be formed in the DB server 60. The embodiment of the present invention having the above-described structure will now be described in detail with reference to the accompanying drawings.

Referring to FIG. 9, the above-described Charac-X creator 54a merges an image to the script created by the above-described script creator 54, so as to generate a Character for eXecution (Charac-X). More specifically, the Charac-X is a script merged with an image. As the Charac-X is merged with an image, as described-above, a macro function having an image being displayed is provided. Therefore, the mobile terminal (MT) is capable of executing a macro function having an image being displayed.

Referring to FIG. 9 and FIG. 11, in the community data registration system using a mobile terminal having the above-described structure, when the script creator 54 creates a script as described above, the Charac-X creator 54a merges the script with the image stored in the image DB 63a, so as to create a Charac-X. (S3a of FIG. 11) Then, the Charac-X DB 63b of the DB server 60 individually stores the created Charac-X.

Accordingly, when the Charac-X is stored as described above, the transmitter 56 of the macro server 50 transmits the Charac-X stored in the Charac-X DB 65 of the DB server 60 in accordance with a request of the mobile terminal (MT). (S4a of FIG. 10) Therefore, the mobile terminal (MT) uses the Charac-X to execute the macro function. Accordingly, the user composes a set of community registration data through the macro being executed on the mobile terminal (MT) and transmits the composed set of community registration data to the macro server 50. Evidently, the community registration data are first received by the receiver 58 of the macro server 58 as described above and, then, formatized by the registration DB 70 so as to be registered in a designated webpage.

Meanwhile, the community data registration system using a mobile terminal having the above-described structure may further include a position tracking server 80, as shown in FIG. 9. The position tracking server 80 tracks the position of the above-described mobile terminal (MT) and, then, transmits the position data of the tracked mobile terminal (MT). Therefore, an address or a map included in the community registration data is automatically posted on the designated webpage. More specifically, the position tracking server 80 transmits the address or map to the registration server 70, so that the address or map can be automatically registered without having to be individually inputted each time in the mobile terminal (MT). At this point, the registration server 70 merges the position data being transmitted from the position tracking server 80 with the document form file and the community registration data both being transmitted from the above-described DB server 60, thereby registering the merge data to the designated webpage. Therefore, the address or map is automatically posted on the webpage.

Herein, the above-described position tracking server 80 may include a position tracker 82 tracking the position of the mobile terminal (MT), as shown in FIG. 2, and a position data transmitter 84 transmitting the position tracked by the position tracker 82. At this point, it is preferable that the position tracker 82 uses a base station or a GPS function to track the position of the mobile terminal (MT). Such position tracking server 80 is required to further include a mapping unit 86 for mapping the position of the mobile terminal (MT) tracked by the position tracker 82 on a map. Herein, the mapping unit 86 is operated when posting a map on the corresponding webpage. At this point, the mapping unit 86 may be configured to store and use the map on its own. Conversely, the mapping unit 86 may also be configured to be interconnected with a separate regional information server (not shown) providing professionally created maps. Evidently, having the mapping unit 86 either to store and use a map on its own or to use a regional information server is apparent to those skilled in the art. Therefore, a detailed description of the same will be omitted for simplicity.

Meanwhile, the community data registration system using a mobile terminal having the above-described structure may further a statistics server 90, as shown in FIG. 9. Among the variety of community registration data received by the macro server 50, the statistics server 90 groups the data having similar contents (i.e., data corresponding to similar fields) and calculates the statistics for each corresponding field. Thereafter, the calculated statistics are provided to the user through the registration server 70 or the macro server 50. For example, if a plurality of community registration data sets related to fishing is provided, each set of community registration data is marked with a general review on the fishing place (i.e., rating levels of each fishing place). Therefore, the statistics server 90 supervises the plurality of general reviews, so as to sequentially calculate the statistics for each fishing place starting from the most highly rated fishing place. Subsequently, the calculated statistics are provided to the wired/wireless terminals (PCs) or mobile terminals (MTs) of the users through the registration server 70 or the macro server 50. Evidently, the users are able to easily select one of the most excellent fishing places based upon the statistics provided by the statistics server 90.

Such statistics server 90 may, for example, include a field-specific managing unit 92 and a statistics calculator 94. At this point, the field-specific managing unit 92 collectively manages the plurality of community registration data sets composed (or created) for each field. The statistics calculator 94 calculates and outputs the statistics of specific contents from the plurality of community registration data sets that is managed by each field by the field-specific managing unit 92. Evidently, the registration server 70 may also receive the calculated statistics from the statistics calculator 94 and register the received statistics to the corresponding webpage.

Also, the macro server 50 may be configured to transmit the statistics to the wired/wireless terminals (PCs) or mobile terminals (MTs) through the transmitter 56. The above-described structure is apparent to those in the art. And so, a detailed description of the same will be omitted for simplicity. FIG. 12 to FIG. 22 illustrate embodiments of the present invention being applied with actual example to facilitate the understanding of the community data registration system using a mobile terminal according to the present invention. The examples given herein are related to fishing communities. Detailed description of the same will now be described with reference to the accompanying drawings.

Herein, FIG. 12 to FIG. 15 illustrate macro registration contents provided by the community data registration system of FIG. 9.

Figure 23:
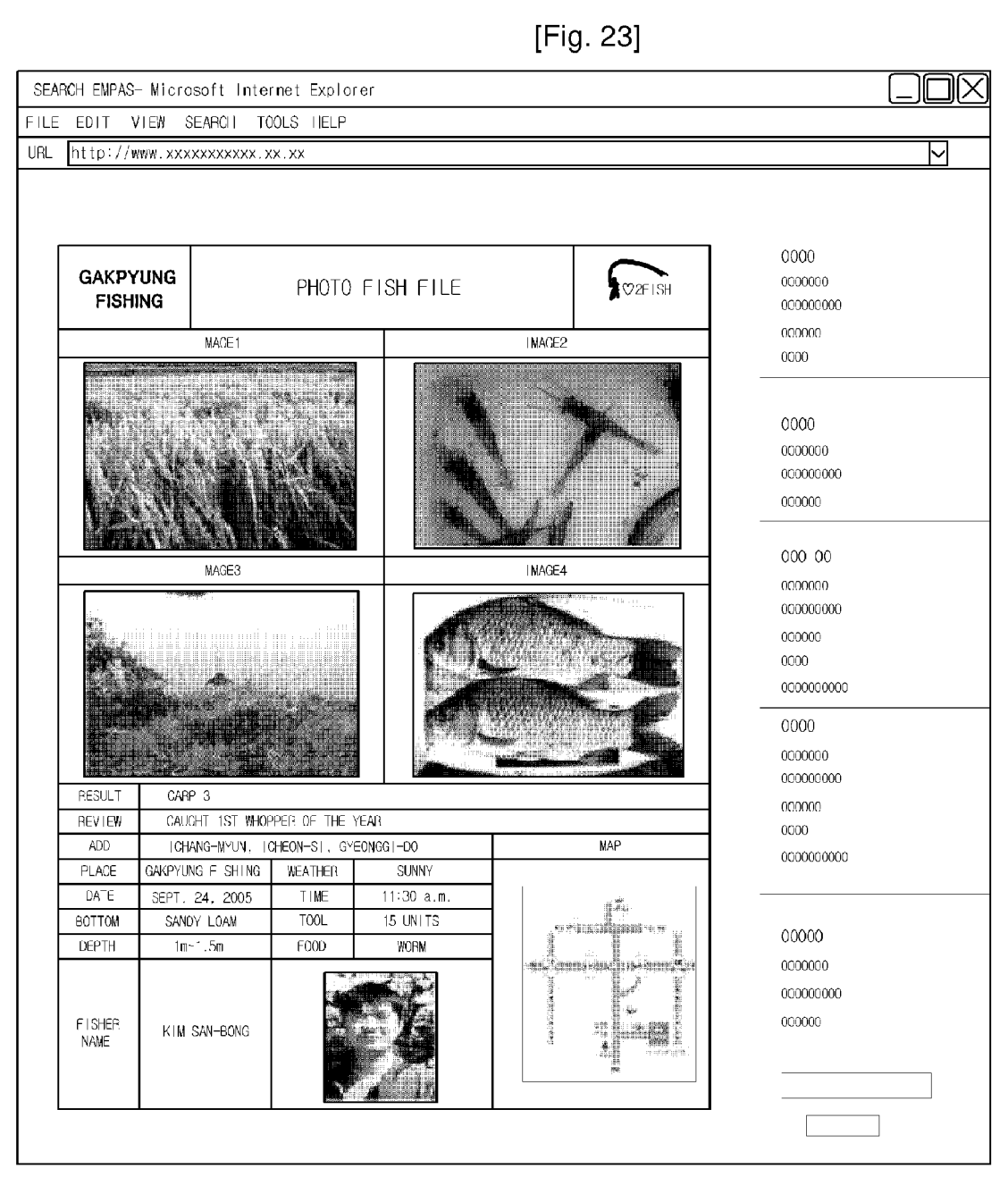

Meanwhile, FIG. 16 to FIG. 18 illustrate statements creating scripts in the community data registration system, and FIG. 19 to FIG. 21 illustrate mobile terminal screens executing the macro function through the community data registration system of FIG. 9. Finally, FIG. 22 illustrates the community registration data that are to be registered in the community data registration system of FIG. 9, and FIG. 23 illustrates an example of the community registration data of FIG. 22 being registered on the webpage.

First of all, referring to FIG. 12 to FIG. 15, the macro registration contents provide data input cells for inputting macro registration data. Therefore, users connected to the macro registration contents to register the macro functions of a specific set of contents (i.e., contents related to fishing) input the macro registration data (i.e., desired contexts) to the corresponding data input cells. At this point, the macro registration contents provide data input cells for inputting contexts related to fishing, such as user phone number, user name, type of bait used for fishing, type of fish, depth of water, weather conditions, type of surface, name of fishing place, title of general review, fishing results, and URL corresponding to the webpage address, as shown in FIG. 12 to FIG. 15. Accordingly, the user inputs desired contexts within the provided data input cells as shown in the drawings. Most particularly, the user may input a wide range of context in accordance with the title of each cell. More specifically, as shown in the example of FIG. 12, a variety of context such as paste bait or worm, corn kernel, soybean may be inputted in the input data cell related to bait.

At this point, a macro screen that is displayed on the mobile terminal may be provided on the right side of the data input cell, as shown in FIG. 12, in order to indicate how the contexts inputted to the macro registration contents are displayed on the mobile terminal. More specifically, the contexts inputted to the data input cell are displayed on the mobile terminal in the same format as the screen displayed on the right side of the data input cell. Herein, the contexts being inputted to the data input cells correspond to the macro registration data for executing the macro function.

As described above, when the input of the desired context to the data input cell is completed, the user clicks on a Submit button, shown in FIG. 12 to FIG. 15, in order to register the inputted macro registration data. Accordingly, the inputted macro registration data are converted to scripts as the inputted macro registration data are inserted in script statements, as shown in FIG. 16 to FIG. 18, which are then stored in the script DB of the above-described DB server. The stored script is then transmitted to the mobile terminal in accordance with the request of the mobile terminal. Evidently, the script is transmitted through the transmitter of the above-described macro server.

Herein, the above-described macro registration contents may provide data input cells for inputting information on the address of the fishing place, map, and type of fishing gear, etc., which are not shown. The data input cells may be diversely set up through the macro registration contents, and the macro registration contents display the selected data input cells. Evidently, the above-described data input cells may be set up through wired/wireless terminals that are connected to the macro server. Conversely, the data input cells may be set up through mobile terminals with Internet functions. In other words, the user may not only connect to the macro registration contents through the mobile terminal to set up the data input cells but also input data into the cells. Accordingly, the user may create a script through the mobile terminal.

At this point, since it is substantially impossible to input a large amount data contents through the mobile terminal, it is preferable to configure the data input cells so that only the most simple and indispensable information, such as the URL of a designate web page or a telephone/mobile phone number, are inputted. Also, the phone number of the mobile terminal or the user information may be configured to be inputted to the corresponding data input cells as the data pre-stored in the mobile terminal are transmitted to the macro server.

Meanwhile, the contents of the data input cells are provided to the mobile terminal in the form of SMS texts and inputted to the data input cells through the mobile terminal. At this point, it is preferable to use a pre-arranged code at the beginning of the SMS text so as to indicate that the context of the SMS text corresponds to a portion of the data input cell.

In addition, referring to FIG. 19 to FIG. 21, FIG. 19(*a*) illustrates an example of executing a platform, such as WIPI, on an initialization screen of the mobile terminal having the above-described Charac-X transmitted thereto. FIG. 19(*b*) illustrates an example of operating the macro engine of the mobile terminal. FIG. 19(*c*) illustrates an example of various specific contents with macro functions being displayed on the macro screen by means of a script. At this point, when the contents are displayed on the macro screen by means of the Charac-X, an image merged with a script is displayed on a portion of the macro screen, as opposed to what is shown in FIG. 19(*c*). If such image corresponds to the illustrated fishing contents, the image may correspond to the image of a fish and may be displayed as a small image in a vacant space at the upper or lower portion of the screen.

FIG. 19(*d*) illustrates an example of selecting a particular set of contents related to fishing among the many specific contents displayed on the macro screen. FIG. 19(*e*) and FIG. 20(*l*) illustrate examples of exhibiting and transmitting an image file through the macro function of the fishing contents that is being executed. FIG. 20(*m*) illustrates an example of displaying a macro screen through which the map of the fishing place can be selected. Also, FIG. 20(*n*) and FIG. 20(*o*) illustrate examples of selecting and transmitting the fishing place map. And, FIG. 20(*p*) illustrates an example of a screen for inputting the name of the fishing place through the macro screen.

Furthermore, FIG. 21(*q*) to FIG. 21(*v*) illustrate examples of inputting information on type of fish, number of fishes caught, depth of the water, ground condition, type of bait, and weather condition through the macro screen. FIG. 21(*w*) illustrates an example of inputting a general review (or ratings) on the corresponding fishing place through the macro screen. At this point, the inputted general review corresponds to a '라'('La' in Korean) level. Finally, FIG. 21(*x*) illustrates an example of the macro screen displaying all of the contexts inputted, as shown in FIG. 21(q) to FIG. 21(w), so as to allow the user to have a quick overview on the corresponding fishing event. At this point, in order to transmit the inputted contexts, the user selects the "SEND" key. Accordingly, the inputted contexts are transmitted to the macro server.

At this point, the above-described contexts of the information on the image, fishing place map, name of fishing place, type of fish, number of fishes caught, depth of the water, ground condition, type of bait, and weather condition correspond to the community registration data that are to be registered and displayed in the webpage.

Subsequently, as shown in FIG. 22, the community registration data inputted from the mobile terminal and transmitted to the macro server are merged with a pre-determined document form. Therefore, as the community registration data are merged in a document form, the images of the community registration data shown in FIG. 19(e) to FIG. 20(l) are inserted in corresponding image boxes at the upper portion of the document form. The map and name of the fishing place, as shown in FIG. 20(m) to FIG. 20. (p), are inserted in designated portions in the mid-portion and lower right portion of the document form. And, information on type of fish, number of fishes caught, depth of the water, ground condition, type of bait, weather condition, and general review, as shown in FIG. 21(q) to FIG. 21(x) are inserted in the lower mid portion of the document form. More specifically, the community registration data transmitted from the mobile terminal are automatically inserted in each corresponding box within the document form. Therefore, the various contexts transmitted from the mobile terminal are clearly arranged in each corresponding box of the data table within the document form.

At this point, the date and time of fishing, and the picture of the information provider may be pre-configured to be registered in the community registration contents. Alternatively, the date and time of fishing, and the picture of the information provider may also be configured to be registered through the mobile terminal. Particularly, information on the date and time of the fishing event may be arranged so that the date and time information, which are received through the mobile terminal on realtime, are automatically transmitted and registered to the webpage.

The address and map of the fishing place may be prearranged to be automatically registered by tracing the position of the mobile terminal. Evidently, in order to trace the location of the mobile terminal, the above-described position tracking server is used. At this point, the position of the mobile terminal may be traced either by using a base station, or by equipping the mobile terminal with a GPS receiver. Thus, the traced position information is transmitted to the registration server through the position tracking server.

Accordingly, the registration server merges the transmitted position data with the above0described document form, thereby registering the merged document form to the designated webpage. Subsequently, referring to FIG. 23, the community registration data of FIG. 22 that are merged with the document form are registered to the webpage, as shown in FIG. 23, through the above-described registration server. Therefore, anyone viewing the webpage will be able to have a clear overview on the various contents displayed on the webpage. At this point, the registration server transmits the community registration data that are merged with the document form to the URL designated by the macro registration contents, as shown in FIG. 15, thereby registering the transmitted data.

Figure 24:
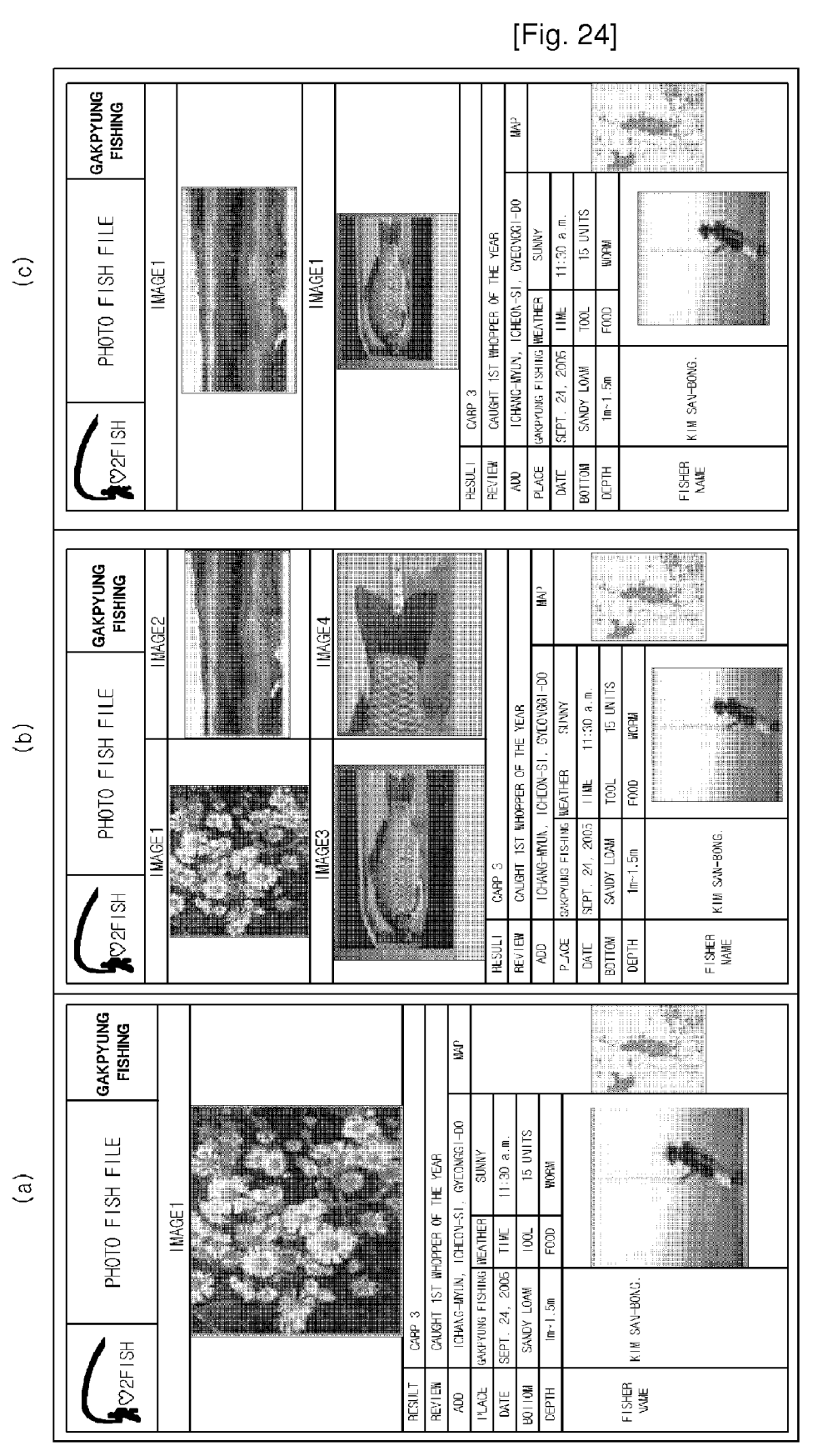

Meanwhile, FIG. 24 illustrates an example of adopting a different form for the community registration data of FIG. 22.

Herein, the above-described community registration data on fishing are modified to the user s preference. Herein, (a) illustrates an example of setting up the document form to display one image. (b) illustrates an example of setting up the document form to display four images. And, (c) illustrates an example of setting up the document form to display two images. In other words, FIG. 24 illustrates various examples of setting up the form of the community registration data to the user s preference.

Also, FIG. 25 illustrates a process of registering a set of community registration data on gourmet restaurants shown in FIG. 22. Herein, FIG. 25(c) illustrates the process of registering the community registration data on a gourmet restaurant. Herein, (a) to (k) illustrate examples of registering community registration data contents on the gourmet restaurant according to the same method shown in FIG. 19 to FIG. 21. Also, (l) illustrates an example of the community registration data being merged with the document form.

Herein, (h) illustrates an example of a screen providing a menu through which a gourmet restaurant may be selected by pre-defined categories. (h) illustrates an example of selecting the restaurant based on the type of company of the user. In this case, as shown in the drawing, the categories may include "1. with kids", "2. with group", "3. with foreigner", "4. with date", and "5. alone". The content of such menu may be registered by the user of the mobile terminal through the macro server.

However, this may also be provided by a community data registration system according to the present invention having a statistics server 90 of FIG. 9 included therein. More specifically, the community data registration system according to the present invention categorizes the contents on the gourmet restaurant calculated and outputted from the statistics server 90. Then, the categorized contents may be provided to the mobile terminal by category as shown in (h). Therefore, the mobile terminal user may select a desired menu option from the displayed menu, as shown in (h). Evidently, the above-described statistics server extracts only the community registration data on the gourmet restaurant among the entire community registration data being received by the above-described macro server. Thereafter, the statistics server categorizes the contents of the extracted data by particular characteristics and provides the categorized data contents to the mobile terminal through the transmitter of the macro server.

Also, FIG. 26 illustrates a process of registering a set of community registration data on gourmet restaurants shown in FIG. 25. Herein, FIG. 26(c) illustrates the process of registering the community registration data on a gourmet restaurant. Herein, (a) to (k) illustrate examples of registering community registration data contents on the gourmet restaurant according to the same method shown in FIG. 19 to FIG. 21. Also, (l) illustrates an example of the community registration data being merged with the document form.

Herein, (h) illustrates an example of a screen providing a menu through which a gourmet restaurant may be selected by pre-defined categories. (h) illustrates an example of selecting the restaurant based on the type of company of the user. In this case, as shown in the drawing, the categories may include "1. with kids", "2. with group", "3. with foreigner", "4. with date", and "5. alone". The content of such menu may be registered by the user of the mobile terminal through the macro server.

However, this may also be provided by a community data registration system according to the present invention having a statistics server 90 of FIG. 9 included therein. More specifically, the community data registration system according to the present invention categorizes the contents on the gourmet restaurant calculated and outputted from the statistics server 90. Then, the categorized contents may be provided to the mobile terminal by category as shown in (h). Therefore, the mobile terminal user may select a desired menu option from the displayed menu, as shown in (h). Evidently, the above-described statistics server extracts only the community registration data on the gourmet restaurant among the entire community registration data being received by the above-described macro server. Thereafter, the statistics server categorizes the contents of the extracted data by particular characteristics and provides the categorized data contents to the mobile terminal through the transmitter of the macro server.

FIG. 27 illustrates an example of a mobile terminal screen showing a different type of macro function being executed by the community registration data of FIG. 22. Herein, FIG. 27 illustrates an example of a screen of the mobile terminal executing the macro function by using a WML script of a WAP method and not an HTML script. More specifically, the community data registration system according to the present invention may provide the macro function through the WML script.

Herein, the above-described HTML script is designed to provide contents on a large screen such as a PC monitor, whereas the above-described WML script is designed to provide contents on small screens such as a mobile terminal screen. Therefore, as shown in FIG. 27, the WML script is displayed on the screen by grouping a plurality of small screens into a menu structure. Also, when one of the menus listed on the screen is selected, the macro function corresponding to the selected menu is executed. For example, without having to manipulate a keypad of the mobile terminal to input the words "see map" or "see related (rel.) image", when "① see map" is selected as shown in (c), a map is displayed as shown in (d). And, when "② see rel. image" is selected as shown in (c), a related image is displayed as shown in (e). And, when "☎ for questions" is selected as shown in (f), a phone number is displayed as shown in (g). At this point, the displayed screen corresponds to a search screen related to a restaurant (i.e., a gourmet restaurant). Referring to FIG. 27, (a) corresponds to a main screen, and (b) corresponds to a screen that follows the main screen when the option "① see list" is selected. Also, (h) corresponds to when the option "④ detailed search" is selected, (i) corresponds to a screen displaying contents related to the option "④ detailed search" is selected, and (j) corresponds to a screen displaying a data input cell allowing the user to input a desired context by using the keypad of the mobile terminal.

*As described above, the method of applying the WML script to the document form file may differ from the method applying the HTML script, which is configured of a plurality of screens in accordance with a plurality of asp files that are provides, and which provides a single document form file, the aspect of using a form DB is the same as the HTML method. As described above, a markup language that configures a wireless server within the mobile terminal includes the WML script as well as mHtml and HDML. More specifically, a plurality markup language types that configures the wireless server within the mobile terminal exists, in addition to the WML script. Therefore, the macro function may be provided to the mobile terminal not only through the above-described WML script according to the present invention, but also through other markup languages used in mobile terminals.

Finally, FIG. 28 illustrates an example of video (or moving picture) files or audio files being registered in the community registration data shown in FIG. 22. Referring to FIG. 28, the community data registration system using the mobile terminal according to the present invention may be configured to transmit video files or audio files, as well as images (i.e., photos or drawings) and texts (or characters). More specifically, the above-described community registration data includes video files or audio files, as well as images (i.e., photos or drawings) and texts (or characters). Therefore, video files or audio files, as well as images (i.e., photos or drawings) and texts (or characters) may be uploaded and displayed on the webpage. Herein, the above-mentioned video file may insert, for example, the following context to the HTML script providing the document form: "<EMBED SRC="MMS://IP address/>" More specifically, when the above-mentioned context is inserted in the HTML script, the video file may be inserted to the document form as shown in FIG. 28.

FIG. 29 illustrates a block view showing an exemplary structure of a network system according to the present invention. A wireless website provider uses a wired network to connect to the macro server, or connects to the macro server through a wireless network, thereby creating and storing a wireless website. Hereinafter, an example of a wireless website provider connecting to the macro server 13 by using a wired network, such as a PC 11, so as to create and provide a wireless website.

When a wireless website provider connects to a macro server to create a wireless website, a script, DB, and a phone page corresponding to the wireless website are created and stored. More specifically, in a webpage, only the contents created by the webpage designer are displayed on the webpage. However, in the wireless website, each of the contents being created by the wireless website provider is managed in the form a single website. Therefore, a plurality of webpage-type contents is managed in the form of a directory, and related DB and scripts may be stored herein. More specifically, the macro server 13 extracts necessary information from the contents created by the wireless website provider, so as to configure and store a DB, thereby storing the scripts therein.

The wireless website user uses the mobile terminal 16 to connect to an execution server 14 through a mobile server 18, which acts as a mobile network 17 and a WAP gateway. The execution server 14 uses the DB and scripts of the macro server 13 to provide wireless website contents to the connected mobile terminal 16 and to provide functions with registration functions. Therefore, the mobile terminal searches the wireless websites differentiated by category and may connect to any one of the searches wireless websites so as to use the necessary contents.

FIG. 30 illustrates a low chart showing the process of providing a wireless website according to the present invention. The wireless website user must download a script corresponding to the website that is provided in order to use the contents provided by the wireless website. FIG. 2 illustrates the process steps starting from configuring such wireless website to downloading the script.

Referring to FIG. 30, the wireless website provider uses the PC 11 or the mobile terminal to connect to the macro server 13, thereby transmitting information related to creating a wireless website (S21). The information related to creating a wireless website includes the types of wireless websites and the contents that are to be provided through the wireless website. The macro server 13 creates and stores the script, DB table, and phone page from the information transmitted by the wireless website provider (S22). The macro server 13 transmits a wireless website identifier to the PC 11 or mobile terminal of the wireless website provider (S23). The wireless website identifier may be indicated by numbers, character, or a combination of numbers and characters. And, the wireless website identifier may be transmitted in the form of short message services (SMS) or e-mails.

The wireless website provider transmits the website identifier to the mobile terminal 16 of the wireless website user (S24). In this case, the wireless website provider transmits a SMS to the mobile terminal of the wireless website user so as to notify the website identifier. Meanwhile, instead of directly transmitting to the mobile terminal, an e-mail may be transmitted to the wireless website user. Also, by posting a wireless website identifier on his or her own website, the wireless website provider may inform the wireless website user visiting his or her website of the wireless website identifier.

The wireless website user who has acquired the wireless website identifier must download a macro engine in order to execute the script. Therefore, the wireless website user uses the mobile terminal 16 to request a macro engine download from the engine download server 19 (S25). In accordance with this request, the mobile terminal 16 of the wireless website user having downloaded the macro engine from the engine download server 19 (S26), operated the macro engine and inputs the wireless website identifier of the website to which the user wishes to be connected (S27). Herein, depending upon the operation of the macro engine, the wireless website identifier, which is stored in the mobile terminal 16 in the form of a SMS, may be automatically searched by the engine and then inputted.

If the wireless website identifier is inputted, the macro engine requests the macro server 13 to transmit a script corresponding to the site identifier to the mobile terminal 16 (S28). In accordance with the request for a script, the macro server 13 transmits the requested script, and the mobile terminal 16 receives the script being transmitted from the macro server 13 (S29). In accordance with the script, the functions of registering the wireless website and its contents, searching wireless websites by region or by category, and moving to a different wireless website may be executed.

FIG. 31 and FIG. 32 illustrate examples showing the process steps of uploading data, such as images, to the wireless website from the macro engine of the mobile terminal by using the script used for registration.

Meanwhile, FIG. 33 illustrates a process step of receiving the data that are uploaded to the wireless website. For example, when data are uploaded to the wireless website according to the process steps shown in FIG. 31 and FIG. 32, the mobile terminal may be used to verify the contents as shown in FIG. 33. Herein, the data sets of the wireless website are connected in a menu tree structure, wherein the pre-stored data are provided in the forms of image (or photo), text, voice, and video under a single theme. Herein, the user may move to another wireless website by using a navigation key.

Meanwhile, FIG. 34 and FIG. 35 illustrate examples showing process steps of searching the data uploaded to the wireless website. For example, when the user searches for a gourmet restaurant through his or her mobile terminal, the mobile terminal executes a script with a searching function so as to search the data configured during the registration process, thereby displaying the searched contents.

The search keywords and categorizing items of FIG. 34 are provided to the wireless website user through the information inputted through the processes shown in FIG. 36 to FIG. 38. And, the finally searched data are based upon the information inputted during the process step shown in FIG. 32.

Meanwhile, FIG. 35 illustrates an example of a process of searching for data by using addresses. Most of the data inputted to the mobile terminal, including information on gourmet restaurants, include location-based data. Therefore, by using the longitude and latitude data of the mobile terminal, without having to separately input any location data at the time of registering the corresponding data, the desired information may be categorized based upon geographical locations.

Therefore, the address may be searched step by step, and a searching function based upon the location of the current mobile terminal may also be provided. According to the present invention, each wireless website is identified by similar types of category and stored in the database accordingly. Therefore, when performing a search, the search operation is not only performed on the wireless website connected to the current mobile terminal but also performed on all similar database based upon the corresponding category of the wireless website. Then, the searched results are displayed onto the screen.

FIG. 36 to FIG. 41 illustrate examples showing script creating pages for creating a wireless website. The wireless website provider inputs the corresponding information to each field of the script creating page. For example, as shown in FIG. 36, a website creation number and contact number of the mobile terminal that is to receive the SMS are inputted, and the keywords for searching and categorizing data are respectively inputted in accordance with the purpose of the wireless website. Herein, the website creation number may be automatically generated without having to be inputted by the wireless website provider.

Also, as shown in FIG. 37 and FIG. 38, detailed information may be inputted in accordance with the keywords and the location-based category and price range-based category, which are automatically provided to FIG. 36. Meanwhile, as shown in FIG. 39, common phrases that may be frequently used in the wireless website to be created may be decided. In the common phrases, upper-level criteria are first displayed, then, in accordance with the selection of the user, lower-level criteria corresponding to the primarily selected criterion are displayed.

FIG. 40 illustrate an example of information being inputted for displaying phrases that are shown on the wireless website, when the user is connected to the wireless website through the mobile terminal. FIG. 41 illustrates a page for inputting wired website information, when the wireless website provider uses a wired website to create the wireless website. The data for creating the wireless website may be inputted through the page shown in FIG. 41.

As described above, when all information are inputted to the respective field of the script creating page, and when a transmission command is requested to the server, the information for creating the wireless website are transmitted to the server.

FIG. 42 illustrates an example of a method for intermediating real estate sales by using the wireless website, which is created in accordance with the process steps shown in FIG. 36 to FIG. 41. As shown in FIG. 42, when information on the real estate (or article) that is to be sold is registered to the wireless website, a buyer may verify the article for sale by connecting to the wireless website of the intermediary.

In addition to the real estate information shown in FIG. 36 to FIG. 42, the function of providing information using a wireless website may also be diversely applied as shown in Table 1 below.

TABLE 1

| Criteria | Detail | Search Keywords |
| --- | --- | --- |
| Gourmet Restaurant | Allows the manager of a gourmet restaurant website to manage a wireless website, and members personally upload information on gourmet restaurants | Categorized by company, by price, by ambience, by menu |
| Real Estate Articles for Sale (Input Art. for sale) | Real estate broker inputs sales article information through cell phone and displays info to buyers through cell phone, PC, digital screen | Sales article info(apartment, shopping, woodland), price range, pyeong size, administrative district |
| Travel Information | Inducing travel info website manager to manage a wireless website. Members can personally upload travel info. | Category (mountain, beach), by theme (a day's trip by bus, all-nighter trip by bus, a day's trip by train, all-nighter trip by train), package trip (couple PKG, family PKG, honeymoon PKG, pension PKG), leisure sports |
| Used Car Information | Used car dealer inputs used car info through cell phone and displays info to clients through cell phone or PC | Manufacturer, year of fabrication, model name, traveled distance |
| Fan Clubs | Members pursuing fan club activities film events related to particular celebrities and upload and provide their contents via wired/wireless website | Name of celebrity |
| Sports Match | Members film memorable moments during a sports match and provide the info via wired/wireless website | |
| Personal Notes | Personal notes are stored and safe-kept to allow user to verify the notes through the cell phone whenever desired. Personal notes are classified by business cards, web-surfed documents, memos on a daily basis | |
| Company E-Catalog | Images of company products are taken so as to create catalogs whenever required, thereby using the catalog through the cell phone for business purposes | Category, price range |
| Photo Album | Used as a means to store personal or group photos. Photos used to keep parenting diaries, couple photos | |
| Fishing Status | Inducing manager of fishing file website to manage a wireless website, wherein members may personally upload useful fishing info | Info by fishing place, by price range, by fish type |
| Hair-Style Related | User views his or her own past hair style contents or contents uploaded by other users prior to styling his or her hair though cell phone and digital screen to decide how to change his or her hairstyle. | Date, customer |
| Managing Wireless Website of Company | Get-together clubs and meetings including group picnics (e.g., SK Telecom) | |
| Real-time news | Uploading contents and images of on-site news footage in real-time through cell phone regardless of time and place | |
| Real-Time Price Comparison | Customers inputs price info on particular products in each visited store, share the price info, thereby allowing other users to use and refer to the provided into. Thus, the price of a particular product displayed in a store may be immediately compared to the price of the same product sold in another store. | |
| Mobile Advertisements | An event for taking pictures of drinking Baekseju and transmitting the pictures via cell phone may be held as part of an advertising event | |
| Automated Manufacturing and | Work automation of mobile office in construction/work sites (construction | |

TABLE 1-continued

| Criteria | Detail | Search Keywords |
| --- | --- | --- |
| Work Status | and engineering), reporting work status | |
| Surveillance | in provincial factories to headquarters | |
| Hotel/Motel | Inputting and searching hotel review information performed by the general public. | |
| Education (Univ./Day Care Center/D-to-D Teaching) | Door-to-door teaching sessions, mobile sessions, and managing door-to-door clients and their curriculum | |
| Adult/Cartoon | Contents provided by user | |
| Adult/Cartoon | Contents provided by user | |

FIG. 43 illustrates an example showing the process steps of providing a real-time price comparison function by using the present invention. As shown in FIG. 43, the website information provider connects to a wireless website and registers the information on an article to the website. Then, a website information user connects to the wireless website and uses a cell phone price information searched in accordance with a categorizing word so as to purchase the product. Herein, a user who has registered information to the wireless website more than once is awarded with an opportunity to connect to the website and search for product information free of charge.

FIG. 44 illustrates an example showing a method of transmitting real-time news by using the present invention. As shown in FIG. 44, the website information provider connects to a wireless website and registers a variety of news information. Then, in accordance with the management of the service manager, the registered news is first inspected and verified for any copyright infringement and, then, provided as news contents.

FIG. 45 illustrates an example of providing a mobile university campus service by using the present invention. As shown in FIG. 45, the wireless website of the present invention is used to create a mobile university campus. Herein, users can share information on club activities, information on exhibitions, and questions and opinions on difficult or problematic issues.

FIG. 46 illustrates an example of providing a method of managing a day-care center by using the present invention. As shown in FIG. 46, the day-care center periodically registers development status on a child s behaviors and activities to the wireless website, so as to allow the parents of the corresponding child to use the wireless website to check on their child s behavior-based development status whenever desired. Also, opinions and suggestions on the day-care center may also be registered to the wireless website. And, accordingly, the day-care center may refer to such opinions and suggestions to improve the management of its facilities.

FIG. 47 illustrates an example of a method for providing an E-catalog of a company by using the present invention. As shown in FIG. 47, a variety of product information of the products of a particular company is registered to the wireless website by using the mobile terminal or PC. Then, when required, users connect to the wireless website to view a wide range of useful information on the products, including categorizing system and article code.

FIG. 48 illustrates an example of showing the process of searching the wireless website by using the mobile terminal having received the script and using the searched contents. Each of the wireless websites is classified by a variety of categories in accordance with a DB table provided to the macro server 13. FIG. 48 illustrates an example when the wireless website user is currently connected to a 'gourmet Restaurant' category.

When the wireless website user uses a website moving (or transfer) menu of the mobile terminal to select a website moving command, the mobile terminal displays a selection screen of broader areas, as shown in FIG. 48. When a particular city or province is selected from the broad area menu, district menus corresponding to the selected city or province are displayed. FIG. 48 illustrates an example of displaying district menus when Seoul city is selected from the broad area menu.

Herein, a broad area script classifier and a district script naming rule may be set as shown in FIG. 9. And, when a particular district is selected from the district menu, a category menu classifying the wireless website by respective categories is displayed, as shown in FIG. 8d. When the user selects any one of the categories, as shown in FIG. 8e, a wireless website list associated with the selected category is searched. When any one of the options is selected from the wireless website list, the user is connected to the wireless website, as shown in FIG. 3f, so as to be provided with a variety of related contents.

FIG. 49 illustrates an example showing the process of moving (or transferring) to a different wireless website. As shown in FIG. 49, when a current wireless website user is connected to a wireless website corresponding to the gourmet restaurant information category, the user may easily and quickly move to another category (e.g., real estate information category) by using left/right navigation keys.

FIG. 50 illustrates a flow chart showing the process steps of registering address information. When the wireless website user selects a contents registration function from the menu of the mobile terminal 16 (S51), the mobile terminal 16 executes a command to acquire location information when executing the corresponding script (S52). According to this command, the mobile terminal 16 acquires the information on its current location (S53). Herein, the location information of the mobile terminal 16 uses the GPS system including a base station based system provided within the mobile terminal 16 to recognize the current latitude and longitude values, thereby acquiring the values.

When the mobile terminal 16 transmits the current location information to a location information server 15 (S54), the location information server 15 transmits a list of addresses corresponding to the location of the mobile terminal 16 in a table format to the mobile terminal 16 after passing through the execution server 14 and the mobile network 17. Then, the mobile terminal 16 displays the received list of addresses to the selection screen in the form of a table.

When the wireless website user selects a particular address from the selection menu displayed in the form of a table (S56), the mobile terminal 16 inputs the address information to the keyword corresponding to the address in the document form and transmits the information to the execution server 14 (S57). The document form is selected by the user, as shown in the example of FIG. 6e. More specifically, the above-mentioned form is selected from a wide range of wireless website forms. In other words, the form of the wireless website corresponds to a wireless website program consisting of a plurality of directories and files (WML, ASP, etc.). However, a specific code is assigned to articles that can be modified by the user. Thereafter, when the user transmits data through the mobile terminal, the transmitted data are replaced with the specific codes, thereby completing the web program.

Meanwhile, in the final step of registering data in the execution server, a step of determining whether the data inputted by the user are accurate and correct. Herein, the accuracy of the data may be verified by the following method. First of all, the accuracy may be verified by a program. More specifically, when a server arbitrarily inputs and registers fields required by the user, additional points for accuracy are automatically assigned to a lower level. Meanwhile, if the accuracy of the information is lowered based upon the feedback received from the user searching the contents, the accuracy level of the information is automatically degraded. Eventually, if the accuracy of the information is enhanced, then the level is automatically upgraded. Furthermore, a monitoring process may be performed by a contents supervisor.

FIG. 51 and FIG. 52 illustrate examples showing the methods of displaying data uploaded to the wireless website by using the present invention. The user may proceed to a subsidiary menu from the main menu, and, at this point, other various functions provided by the browser of the cellular phone may be performed. The drawings illustrate examples of displaying menus on gourmet restaurants and personal memos. However, a variety of forms may be used herein. In case of uploading photos or images, a function of enlarging or decreasing the photo or image may be provided. And, in case of uploading audio data, voice or sound may be outputted from the corresponding page.

FIG. 53 illustrates a flow chart showing the process steps of the user uploading photos (or images) and reply comments to the wireless website by using the present invention.

Since the browser of the cellular phone does not have the function of directly controlling the camera provided in the cellular phone, the user browses the registered wireless page through the browser and, then, controls the camera by executing the macro engine. In cellular phone of the related art, only character strings could be uploaded. However, in the cellular phone according to the present invention, various forms of reply comment contents, such as photos, texts (or characters), and audio (or voice) may also be uploaded.

First of all, the user verifies the wireless page, and when the user decides to upload a reply comment, the user displays a mark for uploading a photo comment (i.e., register wish-list menu, the user presses the remark icon of FIG. 54($a$)). Then, the execution server inputs and adds the phone number of the user, a dirlink (URL) value of the original text to which a reply comment is to be added, and a candidate mark on a photo reply verification field to the DB table in order to store the wish-list menu designating information to the server.

The user may immediately upload a reply comment. Alternatively, as in the case of a gourmet restaurant, the user may register in advance a plurality of restaurants to which he or she wishes to go in the wish-list menu. Then, the user may first visit the restaurant and return to upload the reply comment after acquiring information on the restaurant such as photos.

If the user wishes to immediately upload a reply comment, the user selects and carries out the upload reply menu from a plurality of scripts. Then, the user selects values corresponding to a picture-taking option and a review or rating option from a pre-designated list. The user also inputs text replies. More specifically, as shown in FIG. 54($b$) to FIG. 54($f$), a required screen is selected by a script, thereby receiving the input of the user. Then, the inputted reply data are transmitted to the server. Herein, the server outputs the wish-list menu (i.e., the contents of the cellular phone having the number matching the person who has uploaded the reply comment and having a candidate mark marked in the photo reply verification field) to the list (see FIG. 54($g$)). The user selects the item to which is reply comment is to be added. Then, in accordance with the selected result, the server stores the reply comment data to the DB table. Herein, the photo reply verification field is changed to a "photo comment" mode, which is also stored in the dirlink of the reply comment. Thereafter, the candidate mark of the "photo reply verification field" stored in an earlier process is deleted from the DB table. Subsequently, a reply comment completion screen is displayed on the cellular phone of the user. At this point, if the user pushes the OK button, the user is connected to the reply comment site, thereby enabling the user to verify the comment he or she has inputted.

When a reply comment screen is generated, a detailed screen may also be verified, as shown in FIG. 54($i$). However, what is more important is that the user may transmit his or her comment as well as the original contents via SMS text message, e-mail, and facsimile. More specifically, this may act as compensation to the user having uploaded the reply comment. However, since the user sends his or her comments as a means to recommend the corresponding gourmet restaurant, this may act as a means to ensure accurate photos and texts. In order to send a facsimile transmission, the user selects each respective function from the screen of FIG. 54($h$). FIG. 55($a$), ($b$), and ($c$) respectively illustrate the screens corresponding to transmitting the comment via SMS, e-mail, and facsimile. The connection between the reply comment and the original contents is an already-disclosed and well-known art. Herein, when the value corresponds to '0' by a "reply comment flag field" different types of reply comments may be classified by using increasing values in accordance with the order corresponding to $1^{st}$, $2^{nd}$, and $3^{rd}$ ranks.

The user may find icons corresponding to the "wish-list menu" and the "reply comment list" of the comments which the user has uploaded. Therefore, the required contents may be transmitted immediately via facsimile or other. Such reply comment method may be adopted in other categories, such as personal memos, other than gourmet restaurants, thereby enabling the user to share his or her data with other users.

In the above description, a method of registering data on a wireless website using a cellular phone is described. However, a cellular phone simulation program may be installed in a PC, which receives the required information corresponding to the information being inputted to the cellular phone. Then, once the PC transmits the same message to the execution server, the same function may be performed and executed from the PC as well.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention may be applied to industries related to mobile telecommunication terminals and networks.

The invention claimed is:

1. In a system registering contents on a webpage through a mobile terminal that can execute a macro function by using a wired/wireless terminal connected to an Internet network, which is interconnected to a mobile network, and a mobile network, a contents uploading system using a mobile terminal comprising:
    a macro server providing macro registration contents for registering a macro function of a particular content to the wired/wireless terminal, creating a script for executing the macro function of the particular content based upon macro registration data inputted through the macro registration contents and transmitting the created script to the mobile terminal, and, when community registration data are composed onto the mobile terminal through the macro function executed by the transmitted script, receiving the composed community registration data from the mobile terminal;
    a DB server storing a plurality of contents required for realizing the macro registration contents, the macro registration data and community registration data inputted to and received by the macro server, scripts created from the macro server, and predetermined forms; and
    a registration server replacing particular contexts of the forms stored in the DB server with the community registration data, thereby registering the corresponding data to a designated webpage.

2. The system of claim 1, further comprising: a location tracking server tracking a location of the mobile terminal, and transmitting location data of the tracked mobile terminal to the registration server, wherein the registration server replaces particular contexts of the forms stored in the DB server with the community registration data, thereby registering the location data of transmitted from the location tracking server to a designated webpage.

3. The system of claim 1, further comprising: a statistics server classifying particular contents of the various community registration data being received by the macro server to designated categories, so as to calculated and output statistics based upon a predetermined standard, and providing the calculated statistics to any one of the wired/wireless terminal and the mobile terminal.

4. The system of claim 1, wherein the macro server further creates an image-added script for executing the macro function of a particular image of a particular content on the created script, thereby transmitting the created scipt to the mobgile terminal.

5. In a method for registering contents on a webpage through a mobile terminal that can execute a macro function by using a wired/wireless terminal connected to an Internet network, which is interconnected to a mobile network, and a mobile network, a contents uploading method using a mobile terminal comprising:
    a step of providing macro registration contents for registering macro function of a particular content to the wired/wireless terminal;
    a step of receiving macro registration data required for registering the macro function from the wired/wireless terminal through the macro registration contents;
    a step of creating scripts for executing macro function of the particular content by using the macro registration data;
    a step of transmitting the scripts to the mobile terminal;
    a step of receiving community registration data from the mobile terminal, when the community registration data are composed onto the mobile terminal through the macro function executed by the transmitted scripts;
    a step of merging the community registration data with the predetermined forms, when the community registration data are received; and
    a step of replacing a particular context of the form with the community registration data, thereby transmitting and registering the community registration data to the designated webpage.

6. The method of claim 5, wherein the scripts are image-added scripts.

7. In a network system for providing a wireless website to a mobile terminal equipped with macro execution functions, a contents providing system using a mobile terminal comprising:
    at least one terminal device receiving contents information for the wireless website through a wired means or a wireless means, thereby transmitting the contents information or connecting to the wireless website;
    a macro server storing the wireless website created by using the contents information inputted from the terminal device, wherein the macro server includes scripts corresponding to the created wireless website, a database for storing information of the wireless website in a table form, and phone page information for displaying the wireless website; and
    an execution server searching the database so as to provide contents corresponding to each wireless website, in accordance with a connection of the terminal device.

8. The system of claim 7, further comprising:
    a location information server receiving information on a location of the terminal device that is connected to the wireless website, and providing information on surrounding areas of the location of the terminal device to the terminal device.

9. The system of claim 7, wherein the execution server searches the database to provide a moving function between wireless websites.

10. The system of claim 7, wherein, when a new wireless website is stored, the macro server performs a function of transmitting an identifier of the newly stored wireless website.

11. The system of claim 7, wherein the macro server performs a function of transmitting scripts of the wireless website corresponds to the wireless identifier.

12. The method of claim 7, further comprising:
    a step of receiving wireless website creating information from a first terminal;
    a step of creating the wireless website by using the wireless website creating information, and creating and storing scripts, database, and phone page corresponding to the created wireless website; and
    a step of transmitting a wireless website identifier to the first terminal, when the creation of the wireless website is completed.

13. The method of claim 12, further comprising:
    a step of receiving a request for a script corresponding to the wireless website identifier from a second terminal; and a step of transmitting the script of the wireless website corresponding to the wireless website identifier, in accordance with the request for the script.

14. The method of claim 13, wherein the second terminal is a terminal equipped with a macro engine for performing macro functions.

15. The method of claim 7, further comprising:

a step of downloading a macro engine for executing a macro function from an engine download server;

a step of receiving an identifier of the wireless website that is to be connected to;

a step of transmitting a connection request signal including the received wireless website identifier to the macro server; and a step of receiving scripts and database information on the wireless website from the macro server.

16. The method of claim 15, further comprising:

a step of performing macro execution by using the received scripts.

17. The method of claim 15, further comprising:

a step of receiving a moving command to a wireless website of a different category; and a step of connecting to the other wireless website by using database information on the wireless website.

* * * * *